(12) United States Patent
Zhang

(10) Patent No.: US 8,932,383 B2
(45) Date of Patent: Jan. 13, 2015

(54) COMPOSITIONS AND METHODS OF MAKING AND USING THE COMPOSITIONS FOR IMPROVING SOIL AND/OR PLANT GROWTH AND IMPROVED SOIL, IMPROVED PLANTS, AND/OR IMPROVED SEEDS

(76) Inventor: Jianmin Zhang, Beijing (CN)

( * ) Notice: Subject to any disclaimer, the term of this patent is extended or adjusted under 35 U.S.C. 154(b) by 195 days.

(21) Appl. No.: 13/177,208

(22) Filed: Jul. 6, 2011

(65) Prior Publication Data
US 2012/0144888 A1 Jun. 14, 2012

Related U.S. Application Data

(60) Provisional application No. 61/370,083, filed on Aug. 2, 2010.

(51) Int. Cl.
*C05F 11/00* (2006.01)
*C05F 3/00* (2006.01)
(Continued)

(52) U.S. Cl.
CPC ... *C05G 3/00* (2013.01); *C05G 1/00* (2013.01)
USPC .............. 71/23; 71/11; 71/14; 71/21; 71/31; 71/32; 71/54; 71/63

(58) Field of Classification Search
USPC .......................................................... 71/11–63
See application file for complete search history.

(56) References Cited

U.S. PATENT DOCUMENTS

| | | |
|---|---|---|
| 3,963,472 A | 6/1976 | Young |
| 5,545,442 A | 8/1996 | Van Savage et al. |

(Continued)

FOREIGN PATENT DOCUMENTS

| | | |
|---|---|---|
| CN | 85108881 A | 6/1987 |
| CN | 1088565 A | 6/1994 |

(Continued)

OTHER PUBLICATIONS

International Search Report and Written Opinion, issued by International Searching Authority, mailed Apr. 21, 2011, in International Application No. PCT/CN2010/075017 (12 pages).

(Continued)

*Primary Examiner* — Wayne Langel
(74) *Attorney, Agent, or Firm* — Finnegan, Henderson, Farabow, Garrett & Dunner, L.L.P.

(57) ABSTRACT

A composition comprising at least one nutrient element, wherein the at least one nutrient element possesses a relative energy-state value greater than the relative energy-state value of the at least one nutrient element in a preexisting state, the composition being effective, perhaps because of the greater energy-state value, to improve the ability of a soil, when combined with the composition, to support plant growth better than the soil, when not combined with the composition. Also a composition comprising at least one nutrient element, wherein the composition possesses an energy spectrum more positive than the energy spectrum of the composition in a preexisting state, the composition being effective, perhaps because of the more positive energy spectrum, to improve the ability of a soil, when combined with the composition, to support plant growth better than the soil, when not combined with the composition. Methods of making and using the same for improving soil, plants, plant growth, seeds, and/or plant products, including quality of plant products, are also disclosed, as well as improved soil, seeds, including quality of seeds, plants, and/or plant products, including quality of plant product.

20 Claims, 22 Drawing Sheets

(51) Int. Cl.
  *C05F 9/00* (2006.01)
  *C05D 9/00* (2006.01)
  *C05D 9/02* (2006.01)
  *C05B 17/00* (2006.01)
  *C05B 17/02* (2006.01)
  *C05C 11/00* (2006.01)
  *C05G 1/00* (2006.01)
  *C05G 3/00* (2006.01)

(56) References Cited

U.S. PATENT DOCUMENTS

| | | | |
|---|---|---|---|
| 5,762,678 A * | 6/1998 | Hiles | 71/23 |
| 5,985,944 A | 11/1999 | Ishizaki et al. | |
| 6,217,629 B1 * | 4/2001 | Kunin | 71/27 |
| 6,251,960 B1 | 6/2001 | Ishizaki et al. | |
| 2007/0006774 A1 | 1/2007 | Rogers et al. | |
| 2010/0035754 A1 | 2/2010 | Watanabe et al. | |
| 2010/0173780 A1 | 7/2010 | Kondo et al. | |
| 2010/0203159 A1 | 8/2010 | Tachiya et al. | |
| 2010/0326151 A1 * | 12/2010 | Madigan et al. | 71/8 |
| 2011/0259067 A1 * | 10/2011 | Lynch et al. | 71/24 |

FOREIGN PATENT DOCUMENTS

| | | |
|---|---|---|
| CN | 1100708 A | 3/1995 |
| CN | 1113222 A | 12/1995 |
| CN | 1115750 A | 1/1996 |
| CN | 1126191 A | 7/1996 |
| CN | 1140458 A | 1/1997 |
| CN | 1144788 A | 3/1997 |
| CN | 1036063 C | 10/1997 |
| CN | 1167100 A | 12/1997 |
| CN | 1167745 A | 12/1997 |
| CN | 1247845 A | 3/2000 |
| CN | 1254701 A | 5/2000 |
| CN | 1257518 A | 6/2000 |
| CN | 1292366 A | 4/2001 |
| CN | 1436202 A | 8/2003 |
| CN | 1664701 A | 9/2005 |
| CN | 1718673 A | 1/2006 |
| CN | 1887824 A | 1/2007 |
| CN | 101258196 A | 9/2008 |
| CN | 101381253 A | 3/2009 |
| CN | 101500422 A | 8/2009 |
| CN | 101541171 A | 9/2009 |
| CN | 101638339 | 2/2010 |
| CN | 101754679 | 6/2010 |
| CN | 101792497 A | 8/2010 |
| CN | 101828556 A | 9/2010 |
| CN | 101863703 A | 10/2010 |
| EP | 1952684 A1 | 8/2008 |
| FR | 2584709 A1 | 1/1987 |
| JP | 09-087108 | 3/1997 |
| JP | 11-060368 | 3/1999 |
| RU | 2103856 C1 | 2/1998 |
| RU | 2256635 C1 | 7/2005 |
| WO | WO 98/49214 A1 | 11/1998 |
| WO | WO 2005/073150 | 8/2005 |

OTHER PUBLICATIONS

International Search Report and Written Opinion, issued by International Searching Authority, mailed Oct. 13, 2011, in International Application No. PCT/CN2011/076707 (9 pages).

Zhongwu Pan, The study on the effect of Shanxi Juchuan Potassium ALA liquid fertilizer, *Serves of Agricultural Technology*, 25(10):56 (published online Dec. 23, 2008).

Ming Xu et al., Effects of exogenous 5-aminolevulinic acid on the growth and the yield of the tomato in sunlight greenhouse, *Journal of Northwest A & F University (Nat. Sci. Ed.)*, vol. 36, No. 9, pp. 128-132 (Sep. 2008), Abstract.

Guanghua Wang et al., The development and application of Japanese coated controlled release fertilizer, *Modern Agricultural Equipments*, Issue 3, pp. 66-67 (published online Apr. 2, 2007).

Xiumei Lu, The effect of drought-resistant compound fertilizer on summer tomato, *Journal of Anhui Agri. Sci.*, 33(4):637 (2005).

Xiankui Qiu et al., Effects of Different Fertilizing Treatments on Contents of Soil Nutrients and Soil Enzyme Activity, *Soil*, 42(2):249-255 (2010) Abstract.

What is ALA/Cosmo Seiwa Agriculture Co., Ltd., http://www.pentakeep-world.com/english/utility/index.html, accessed May 10, 2010.

Yu, "Fruits of a growing ambition," *China Daily*, published online at http://www.chinadaily.com.cn/bizchina/2010-07/12/content_10093491.htm, Jul. 12, 2010 (6 pages).

"What is ALA," published online at http://www.pentakeep-world.com/english/utility/index.html (3 pages).

Lu, "Magnetized Fertilizer," *Sulfur Phosphorus Design*, vol. 2, pp. 35-37 (2005).

Zhang et al., "The Research and Development Progress of Magnetized Fertilizer," *Electrical Alloy*, vol. 1, pp. 39-41 (2000).

Search Report Issued by State Intellectual Property Office of the P.R. China, dated Oct. 25, 2013, in Chinese Patent Application No. 2011800430216 (2 pages).

* cited by examiner

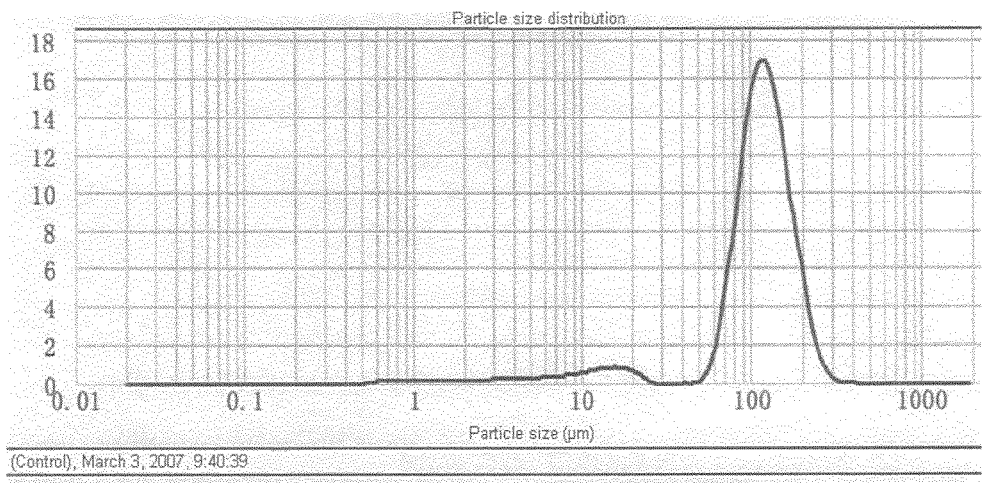
Figure 12A: Particle size distribution of sand/loamy sand not treated with BGA2
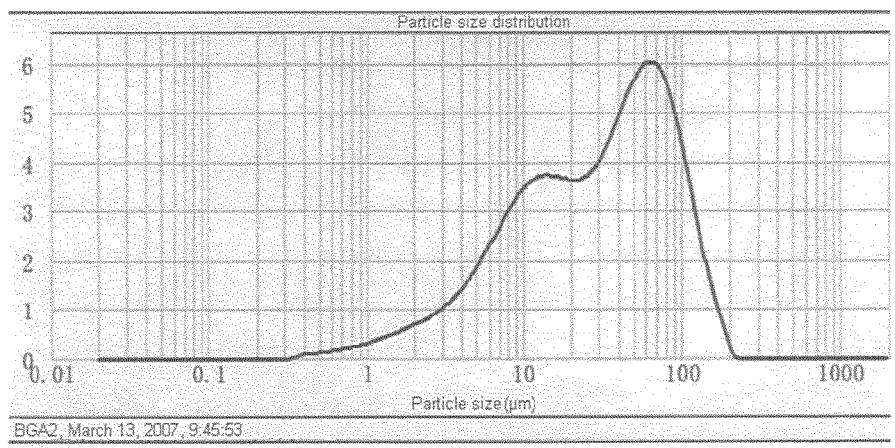
Figure 12B: Particle size distribution of sandy loam converted from sand/loamy sand treated with BGA2

COMPOSITIONS AND METHODS OF MAKING AND USING THE COMPOSITIONS FOR IMPROVING SOIL AND/OR PLANT GROWTH AND IMPROVED SOIL, IMPROVED PLANTS, AND/OR IMPROVED SEEDS

This application claims the benefit of priority under 35 U.S.C. §119 to PCT Application No. PCT/CN2010/075017, filed in China on Jul. 7, 2010, U.S. Provisional Application No. 61/370,083, filed on Aug. 2, 2010, and PCT Application No. PCT/CN2011/076707, filed in China on Jun. 30, 2011.

The disclosure relates to novel compositions and methods of making and using the composition for improving soil, plant growth, seeds, and/or quality of plant products, as well as improved soil, improved plants, improved seeds, and/or improved plant products.

Much of the earth provides soil that is not capable of either supporting growth of food-producing plants and other agricultural products or supporting sufficient growth for such plants and other products. Hence, lack of food and other agricultural products are world-wide problems. And there are parts of the world where sufficient water, particularly non-salted water, is unavailable for watering such plants and other products.

Conventionally, crop rotation and fertilizers are the main resources that humans utilize to improve the productivity of food-producing plants and other agricultural products. However, benefits accruing from crop rotation and fertilizers can be limited. For example, the amount of fertilizers applied to a field may need to be increased year by year to maintain productivity or excessive amounts of fertilizer may be used, both of which can be problematical in leading to, for example, soil hardening, salinization, pollution to the environment, such as soil, and decreased quality of the plant and products of the plant. And, of course, improving plant growth can be desirable pretty much universally, and particularly in areas where the demand for soil for producing agricultural products exceeds the supply.

The present inventor has discovered novel compositions of practical utility and methods of making and using the compositions, such as, in certain embodiments, for improving soil, plant growth, seeds, and/or quality of plant products to address at least one of the problems as set forth above. The present inventor has also discovered improved soil, including improved soil made by processes disclosed herein, improved plants, improved plants made by processes disclosed herein, improved seeds, improved seeds made by processes disclosed herein, and improved plant products, including improved quality of plant products, as well as improved plant products made by processes disclosed herein.

BRIEF DESCRIPTION OF THE DRAWINGS

FIG. 5 shows the relative energy-state values of N, P, and K comparing the effects of a composition according to the present disclosure and other traditional fertilizers.

In FIG. 5A, the particular absolute values are based on specific standards chosen. Such standards will vary from machine to machine. Hence, depending on the machine used, the absolute numbers may vary but the relative differences between the various substrates (soil, BGA1, etc.) should be similar. Again, in FIG. 5B, the particular absolute values are based on specific standards chosen. Such standards will vary from machine to machine. Hence, depending on the machine used, the absolute numbers may vary but the relative differences between the various substrates (soil, BGA1, etc.) should be similar. Again, in FIG. 5C, the particular absolute values are based on specific standards chosen. Such standards will vary from machine to machine. Hence, depending on the machine used, the absolute numbers may vary but the relative differences between the various substrates (soil, BGA1, etc.) should be similar.

Figure 6:
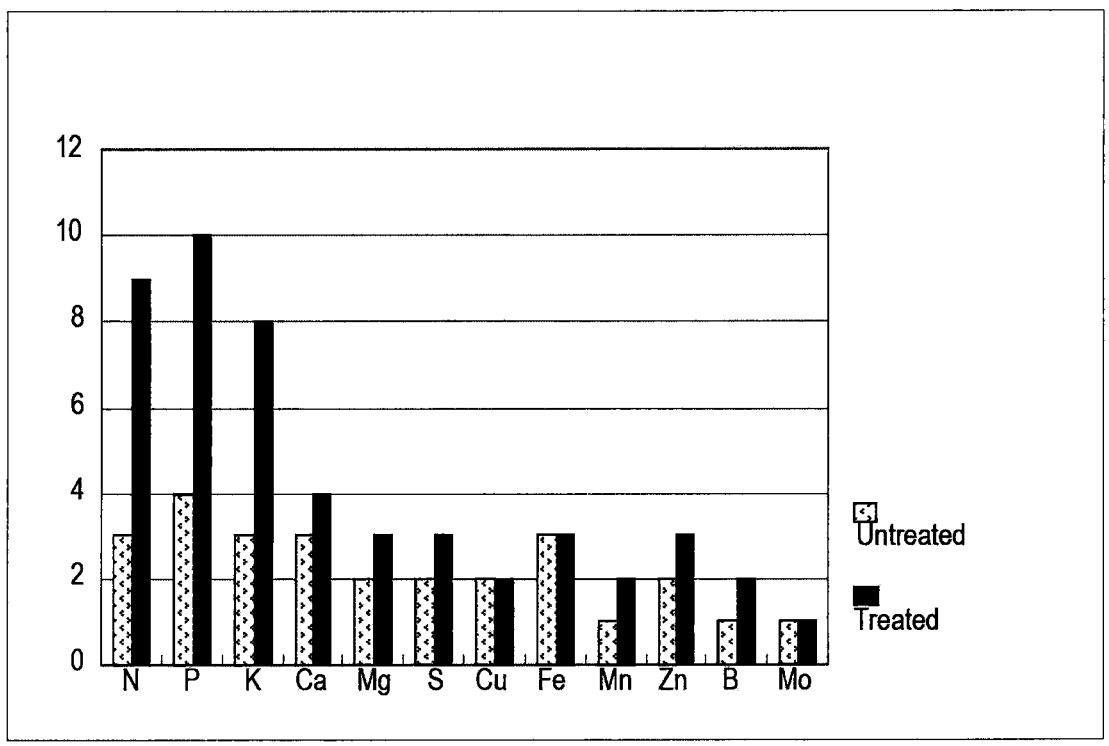
FIG. 6 shows the relative energy-state values of N, P, K, Ca, Mg, S, Cu, Fe, Mn, Zn, B, and Mo in a desert sand sample not treated with a composition according to the present disclosure (denoted as "untreated") and in a desert sand sample treated with a composition according to the present disclosure (denoted as "treated").

Again, in FIG. 6, the particular absolute values are based on specific standards chosen. Such standards will vary from machine to machine. Hence, depending on the machine used, the absolute numbers may vary but the relative differences between the various elements, such as N and P, should be similar.

Figure 7A:
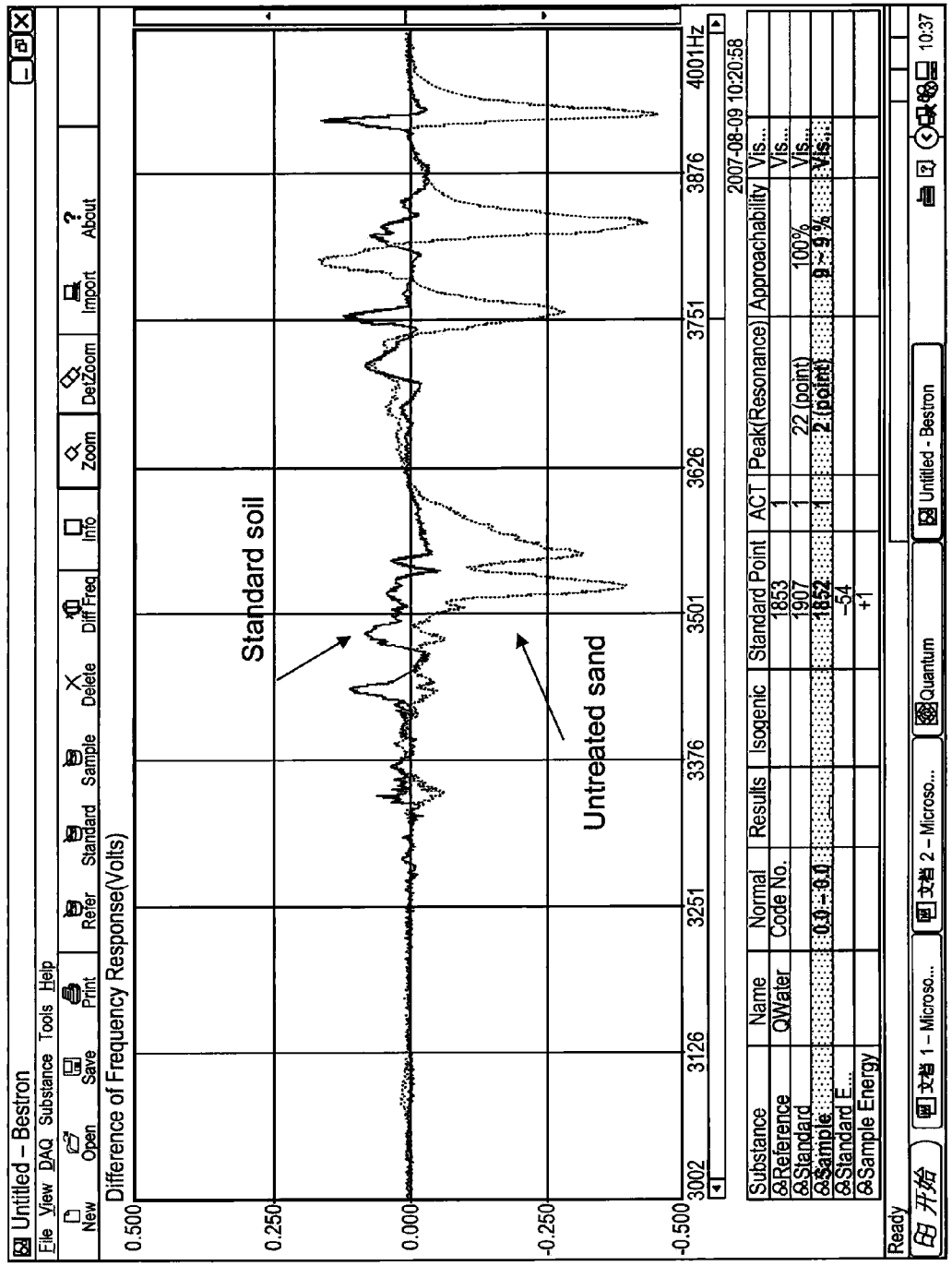
Figure 7B:
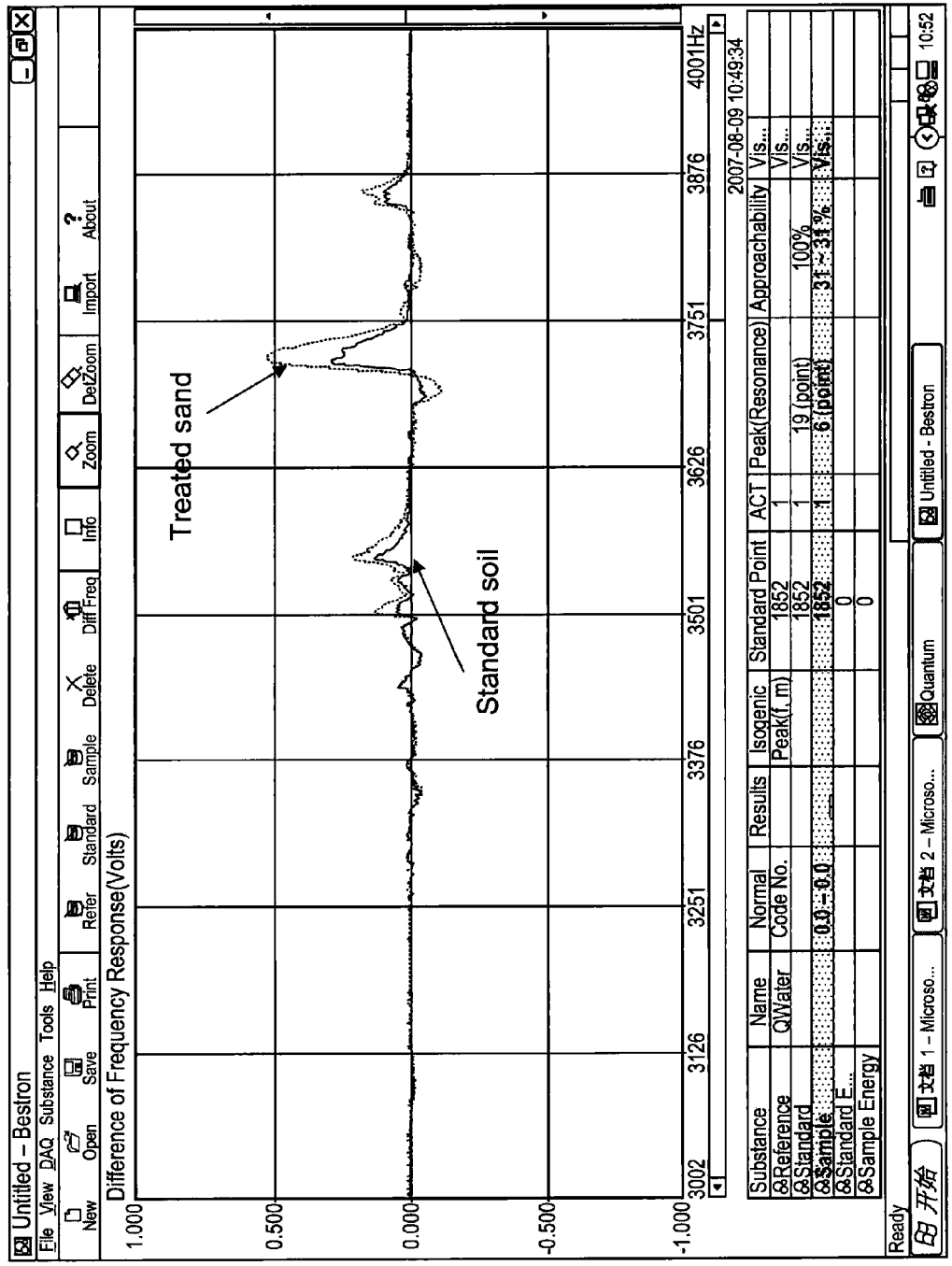

FIG. 7A shows the energy spectrum for a desert sand sample not treated with a composition according to the present disclosure. FIG. 7B shows the energy spectrum for a desert sand sample treated with a composition according to the present disclosure.

FIGS. 7A and 7B demonstrate that a treated soil in accordance with the disclosure possesses an energy spectrum wherein the treated soil has more "positive" area under the curve than the untreated soil. Of course, the particular absolute values of the area under the curves are based on specific standards chosen. Such standards will vary from machine to machine. Hence, depending on the machine used, the absolute values of the area under the curves may vary but the relative differences between treated and untreated soil should be similar.

Figure 8:
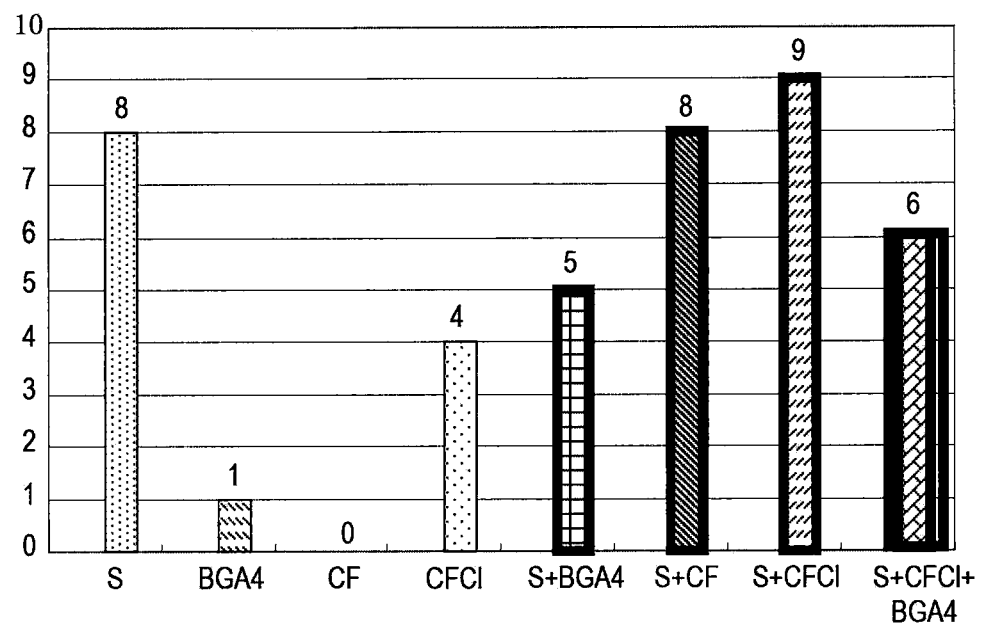

FIG. 8 shows the relative energy-state value of Cl in a saline alkaline soil sample (saline alkaline soil), a composition according to the present disclosure (BGA4), high concentration compound fertilizer without Cl (Sierte brand sulfur-based high concentration compound fertilizer, commercially available from Anhui Sierte Fertilizer Company, Ltd., China) (CF), high concentration compound fertilizer with Cl (Sierte brand chlorine-based high concentration compound fertilizer, commercially available from Anhui Sierte Fertilizer Company, Ltd., China) (CFCl), a 1:1 mixture by weight of a saline alkaline soil sample plus BGA4 (S+BGA4), a 1:1 mixture of a saline alkaline soil sample plus the high concentration compound fertilizer without Cl (S+CF), a 1:1 mixture by weight of a saline alkaline soil sample plus the high concentration compound fertilizer with Cl (S+CFCl), and a 1:1:1 mixture by weight of a saline alkaline soil sample plus the high concentration compound fertilizer with Cl and BGA4 (S+CFCl+BGA4).

Again, in FIG. 8, the particular absolute values are based on specific standards chosen. Such standards will vary from machine to machine. Hence, depending on the machine used, the absolute numbers may vary but the relative differences between the various substrates should be similar.

FIGS. 9A-9F show a commercially available apparatus complete with software used in the measurement of the relative energy-state values of nutrient elements, such as N, P, and K, as found in soil treated some ten years ago with BGA5 and as found in soil fertilized some ten years ago as described in Example 8.

Figure 10A:
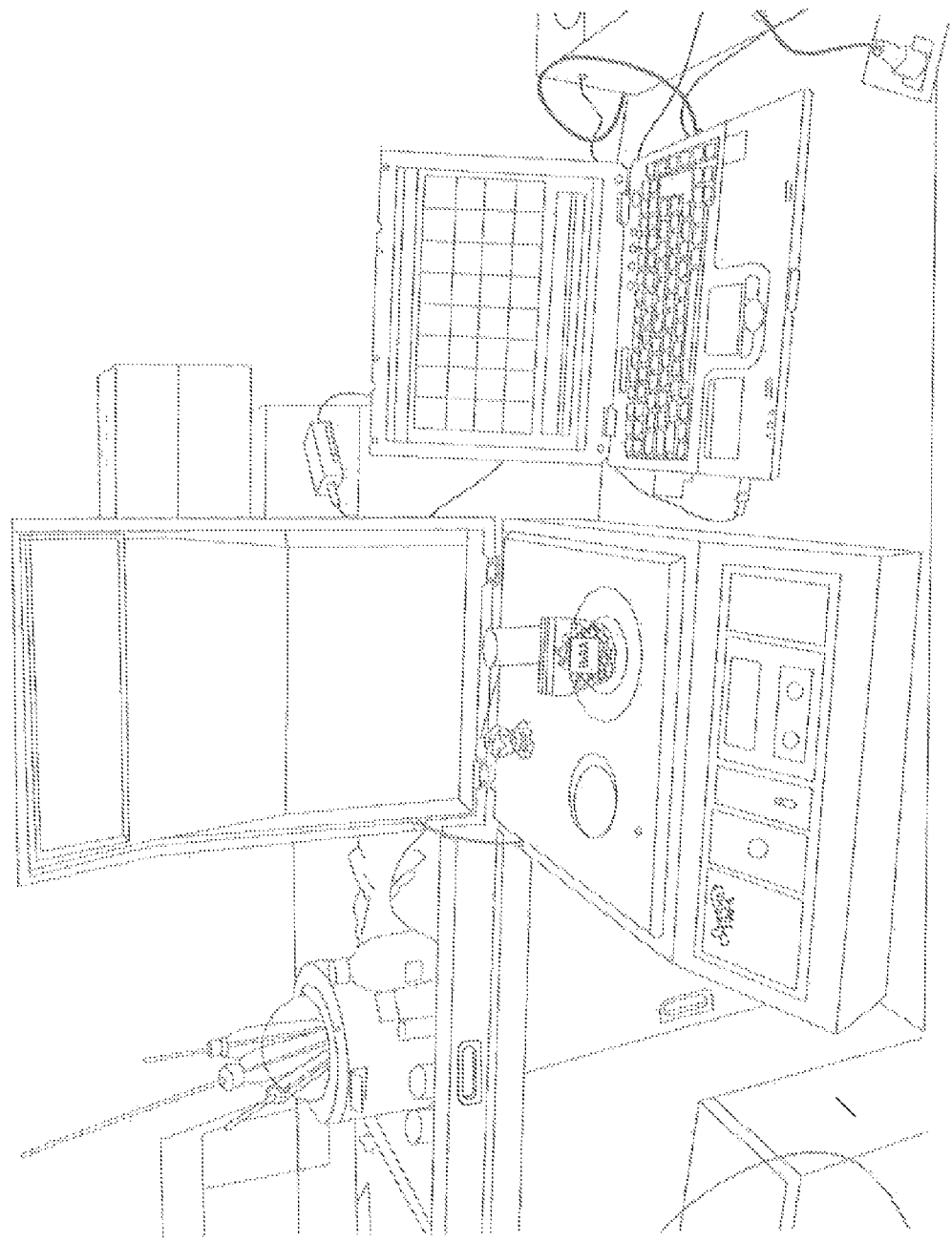
Figure 10B:
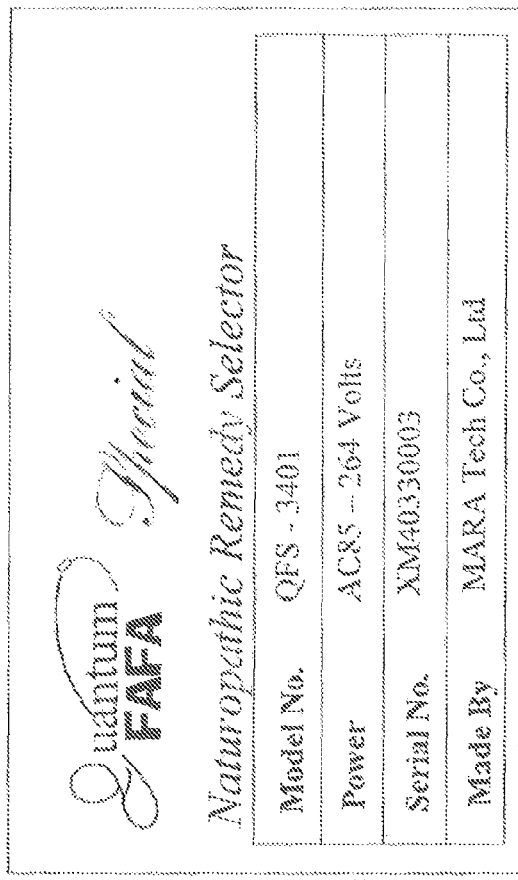

FIGS. 10A and 10B show a commercially available apparatus complete with software for measuring energy spectra of compositions, soil, and/or plants as disclosed herein.

Figure 11:
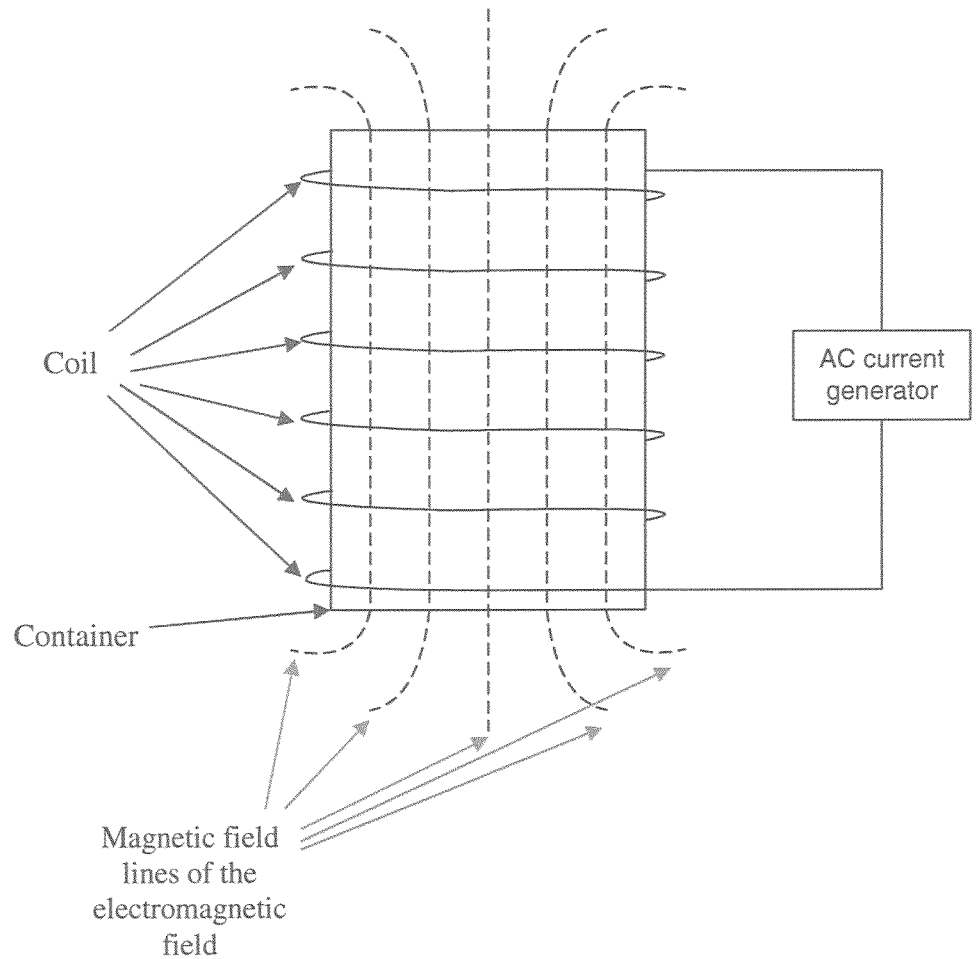

FIG. 11 schematically shows a coil wrapped around a container, where the coil is used to generate an electromagnetic field to treat at least one raw material in the container by flowing an AC current through the coil.

Figure 12C:
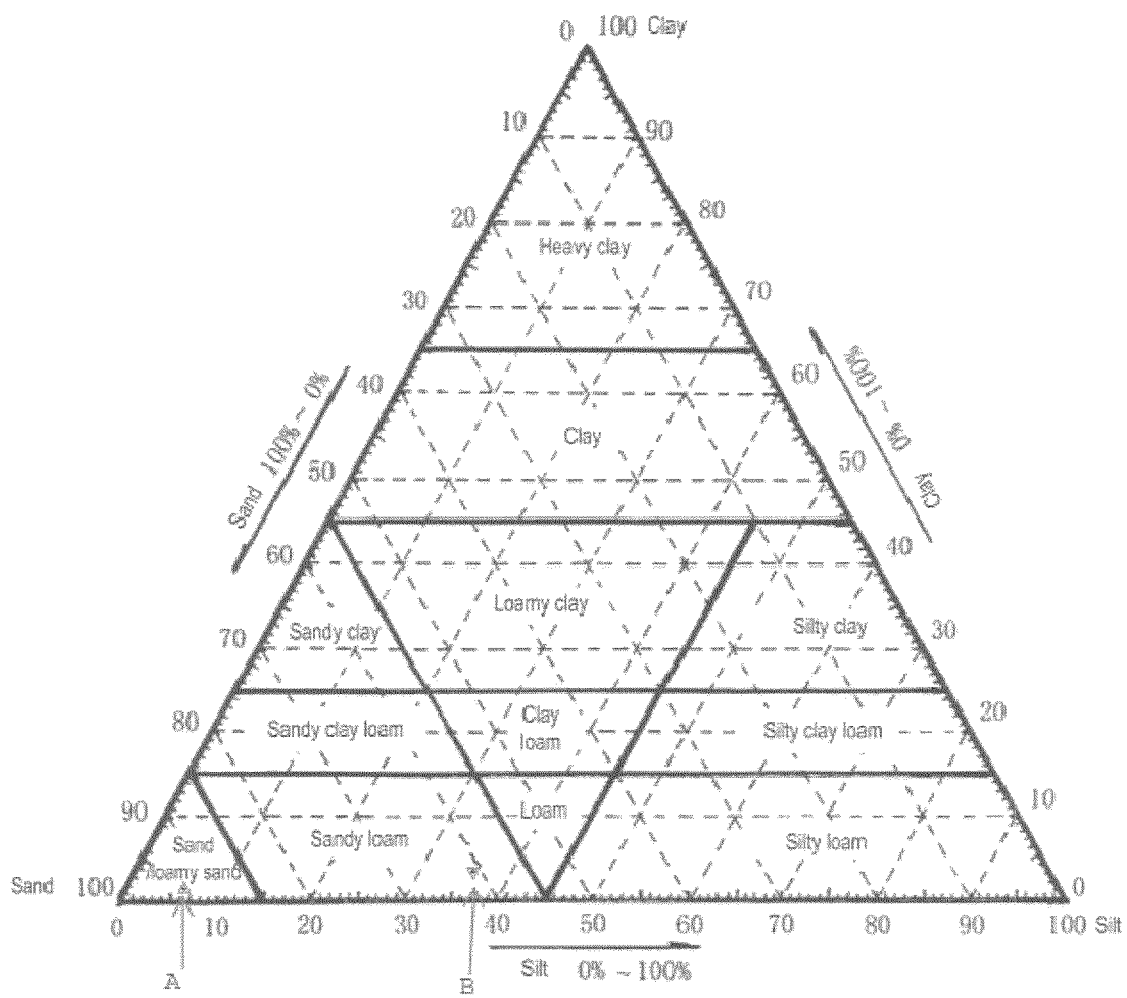

FIG. 12A shows particle size distribution of sand/loamy sand not treated with BGA2. FIG. 12B shows particle size distribution of sandy loam obtained by treating sand/loamy sand with BGA2. FIG. 12C shows, in the international soil texture triangle for soil classification, at point A the sand/loamy sand not treated with BGA2, and shows at point B the sandy loam obtained by treating sand/loamy sand with BGA2 Those Figures are associated with the experiment reported in Example 4.

In one aspect, the disclosure relates to compositions, such as, for example, compositions comprising at least one nutrient element; compositions comprising at least one photosensitive material comprising at least one nutrient element; compositions comprising at least one organic acidic material comprising at least one nutrient element; compositions comprising a first sub-composition comprising at least one organic acidic material and a second sub-composition comprising at least one photosensitive material, wherein at least one of the first sub-composition and the second sub-composition comprises at least one nutrient element; compositions comprising a first sub-composition comprising at least one organic acidic material comprising at least one first nutrient element, and a second sub-composition comprising at least one photosensitive material comprising at least one second nutrient element; and compositions comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition.

In some embodiments, at least one nutrient element in the compositions as disclosed herein possesses a relative energy-state value greater than that of the at least one nutrient element in those compositions in a preexisting state. Without being bound by theory, the greater relative energy-state value is sufficient, e.g., of sufficient value and retained for a time sufficient, to improve a soil, a plant, plant growth, seeds, quality of seeds, plant products, including improved quality of plant products. In some embodiments, without being bound by theory, the greater relative energy-state value is sufficient to make the composition capable of improving a soil, including a virgin soil, when combined with the composition, to support plant growth better than the soil, when not combined with the composition. In some embodiments, again, without being bound by theory, the greater relative energy-state value is sufficient to make the composition capable of converting a soil chosen from sand/loamy sand, such as river sand, heavy clay, clay, sandy clay, sandy clay loam, silty clay, silty clay loam, and silty loam, into an improved soil chosen from sandy loam, loamy clay, clay loam, and loam, when the soil is combined with the composition. In some embodiments, again, without being bound by theory, the greater relative energy-state value is sufficient to make the composition capable of improving the ability of a soil, when combined with the composition, to be watered by salted water in whole or in part to support plant growth, compared to the soil, when not combined with the composition.

In some embodiments (see Examples 1-14 utilizing energy treated compositions (e.g., BGA1-BGA6), energy treated fertilizers, including 15-15-15 fertilizer and urea), there is disclosed a method for treating a soil comprising contacting the soil with an effective amount of an energy treated composition, wherein the composition comprises at least one nutrient element, wherein the at least one nutrient element possesses a relative energy-state value greater than the relative energy-state value of the at least one nutrient element in a preexisting state, the composition being effective to improve the ability of the soil, when combined with the effective amount of the composition, to support plant growth better than the soil, when not combined with the composition.

In some embodiments, there is disclosed a method for treating a soil comprising contacting the soil with an effective amount of an energy treated composition, wherein the composition comprises at least one nutrient element, wherein the at least one nutrient element possesses a relative energy-state value greater than the relative energy-state value of the at least one nutrient element in a preexisting state, the composition being effective to improve the ability of the soil, when combined with the effective amount of the composition, to be watered by salted water in whole or in part to support plant growth, compared to the soil, when not combined with the composition.

In some embodiments, there is disclosed a method for treating a soil comprising contacting the soil with an effective amount of an energy treated composition, wherein the composition comprises a first sub-composition comprising at least one organic acidic material, a second sub-composition comprising at least one photosensitive material, wherein at least one of the first sub-composition and the second sub-composition comprises at least one first nutrient element, wherein the at least one photosensitive material is different from the at least one organic acidic material, and a third sub-composition comprising at least one organic base material optionally comprising at least one third nutrient element, the at least one organic base material being different from the at least one organic acidic material and the at least one photosensitive material, wherein the at least one first and third nutrient elements can be the same or different, and further wherein at least one of the first and third nutrient elements possesses a relative energy-state value greater than the relative energy-state value of the at least one of the first and third nutrient elements in a preexisting state, the composition being effective to improve the ability of the soil, when combined with the effective amount of the composition, to support plant growth better than the soil, when not combined with the composition.

In some embodiments, there is disclosed a method for treating a soil comprising contacting the soil with an effective amount of an energy treated composition, wherein the composition comprises a first sub-composition comprising at least one organic acidic material, a second sub-composition comprising at least one photosensitive material, wherein at least one of the first sub-composition and the second sub-composition comprises at least one first nutrient element, wherein the at least one photosensitive material is different from the at least one organic acidic material, and a third sub-composition comprising at least one organic base material optionally comprising at least one third nutrient element, the at least one organic base material being different from the at least one organic acidic material and the at least one photosensitive material, wherein the at least one first and third nutrient elements can be the same or different, and further wherein at least one of the first and third nutrient elements possesses a relative energy-state value greater than the relative energy-state value of the at least one of the first and third nutrient elements in a preexisting state, the composition being effective to improve the ability of the soil, when combined with the effective amount of the composition, to be watered by salted water in whole or in part to support plant growth, compared to the soil, when not combined with the composition.

In some embodiments, there is disclosed a method for treating a soil comprising contacting the soil with an effective amount of an energy treated composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the composition being effective to improve the ability of the soil, when combined with the effective amount of the composition, to support plant growth better than the soil, when not combined with the composition.

In some embodiments, there is disclosed a method for treating a soil comprising contacting the soil with an effective amount of an energy treated composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the composition being effective to improve the ability of the soil, when combined with the effective amount of the composition, to be watered by salted water to support plant growth, compared to the soil, when not combined with the composition.

In some embodiments, there is disclosed a method for improving the growth of a plant comprising contacting for a time sufficient the plant with an effective amount of an energy treated composition, wherein the composition comprises a first sub-composition comprising at least one organic acidic material comprising at least one first nutrient element, and/or a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state.

In some embodiments, there is disclosed a method for treating a soil comprising contacting the soil with an effective amount of an energy treated composition, wherein the composition comprises at least one nutrient element, and further wherein the composition possesses an energy spectrum more positive than the energy spectrum of the composition in a preexisting state, the composition being effective to improve the ability of the soil, when combined with the effective amount of the composition, to support plant growth better than the soil, when not combined with the composition.

In some embodiments, there is disclosed a method for treating a soil comprising contacting the soil with an effective amount of an energy treated composition, wherein the composition comprises at least one nutrient element, and further wherein the composition possesses an energy spectrum more positive than the energy spectrum of the composition in a preexisting state, the composition being effective to improve the ability of the soil, when combined with the composition, to be watered by salted water in whole or in part to support plant growth, compared to the soil, when not combined with the composition.

In some embodiments, there is disclosed a method for treating a soil incapable of supporting horticultural and/or agricultural plant growth, such as desert sand, to convert said soil into a soil capable of supporting horticultural and/or agricultural plant growth comprising contacting the soil incapable of supporting horticultural and/or agricultural plant growth with an effective amount of a composition, such as an energy-treated composition as disclosed herein, wherein the composition comprises at least one nutrient element, wherein the at least one nutrient element possesses a relative energy-state value greater than the relative energy-state value of the at least one nutrient element in a preexisting state, the composition being effective to convert the soil incapable of supporting horticultural and/or agricultural plant growth, when combined with the effective amount of the composition, to the soil capable of supporting horticultural and/or agricultural plant growth. The phrase "horticultural plant growth" as used herein refers, on a small scale, such as gardening, to plant propagation and cultivation and crop production, involving, for example, fruits, such as berries, nuts, vegetables, flowers, trees, shrubs, and turf, such as grass. The phrase "agricultural plant growth" as used herein refers, on a large scale, such as farming, to plant propagation and cultivation and crop production, involving, for example, rice, tobacco, wheat, barley, soybeans, potatoes, corn, beets, fruits, such as berries, watermelon, tomatoes, beans, cucumbers, nuts, other vegetables, flowers, trees, such as apple trees, orange trees, and banana trees, shrubs, and turf, such as grass. Horticultural and agricultural plant growth are to be distinguished from the growth of isolated volunteer plants, such as sage brush and cactus, that can randomly be found in soil incapable of supporting horticultural and/or agricultural plant growth, for example, desert sands.

In some embodiments, there is disclosed a method for treating a soil incapable of supporting horticultural and/or agricultural plant growth, such as desert sand, to convert said soil into a soil capable of supporting horticultural and/or agricultural plant growth comprising contacting the soil incapable of supporting horticultural and/or agricultural plant growth with an effective amount of a composition, such as an energy-treated composition as disclosed herein, wherein the composition comprises at least one nutrient element, and further wherein the composition possesses an energy spectrum more positive than the energy spectrum of the composition in a preexisting state, the composition being effective to convert the soil incapable of supporting horticultural and/or agricultural plant growth, when combined with the effective amount of the composition, to the soil capable of supporting horticultural and/or agricultural plant growth.

In some embodiments, the disclosed composition possesses an energy spectrum more positive than the energy spectrum of the composition in a preexisting state. Without being bound by theory, the more positive energy spectrum is sufficient, e.g., enough more positive and retained for a time sufficient, to improve a soil, plant growth, seeds, quality of seeds, a plant, and/or a plant product, including improved quality of plant products. In some embodiments, again, without being bound by theory, the more positive energy spectrum is sufficient to make the composition capable of improving a soil, including a virgin soil, when combined with the composition, to support plant growth better than the soil, when not combined with the composition. In some embodiments, again, without being bound by theory, the more positive energy spectrum is sufficient to make the composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the composition. In some embodiments, again, without being bound by theory, the more positive energy spectrum is sufficient to make the composition capable of improving the ability of a soil, when combined with the composition, to be watered by salted water in whole or in part to support plant growth, compared to the soil, when not combined with the composition. The disclosure also relates to compositions produced by performing an energy treatment, e.g., an electromagnetic treatment, on the compositions in a preexisting state to raise the relative energy-state value of at least one nutrient element in the compositions compared to that of the at least one nutrient element in the compositions in a preexisting state and/or to make the energy spectrum of the composition more positive than that of the composition in a preexisting state. Without being bound by theory, the increased relative energy-state value and/or the more positive energy spectrum is sufficient, e.g., enough more positive and retained for a time sufficient, to improve a soil, plant growth, seeds, quality of seeds, a plant, and/or plant products, including quality of plant products.

As discussed in further detail below, a "relative energy-state value" as used herein refers to a ratio of the magnetic induction intensity of at least one nutrient element in a sample being measured to the magnetic induction intensity of that same at least one nutrient element in a standard reference sample, such as standard reference samples found in commercially available machines to be described hereinbelow. A relative energy-state value of a nutrient element may be measured using, for example, a quantum resonance spectrometer (QRS). As also discussed in further detail below, an "energy spectrum" as used herein refers to a recording of the intensity of the electromagnetic wave measured on a sample versus frequency. An energy spectrum may be measured using, for example, a spectrum analyzer and/or QRS.

The disclosure also relates to methods for making compositions as disclosed herein by performing an energy treatment. Any energy means, such as electromagnetic, thermal, sound, and mechanical means, that is effective for treating compositions in a preexisting state, as described immediately above, to raise sufficiently the relative energy-state value of at least one nutrient element in the compositions compared to that of the at least one nutrient element in the compositions in a preexisting state and/or to make the energy spectrum of the composition sufficiently more positive than that of the composition in a preexisting state, may be used, perhaps because the raised relative energy-state values and/or the more positive energy spectrum are retained for a time sufficient to be effective. In some embodiments, the compositions are produced by performing an electromagnetic treatment on at least one raw material of the compositions. For example, electromagnetic treatment may be performed on at least one raw material of a composition disclosed herein by applying an electromagnetic field to a space, such as a container, in which the at least one raw material is placed. For example, the composition to be treated is placed in a space, such as a tunnel or an enclosed shielded space, such as an air permeable enclosed shielded space or an enclosed shielded space under vacuum conditions, be it a container or any other enclosing structure, such as a fully enclosed room, a vault, a barn or other outbuilding, such as a greenhouse, in order to contain within that space the energy generated; or in other words, in order to minimize the energy generated from leaking out from the space. The electromagnetic treatment may be performed by generating an AC current to flow through a treating device so as to generate an electromagnetic field in the space, or by generating a AC current to flow through the treating device so as to generate a magnetic field in the space, such as the enclosed space, further such as a container, in which the at least one raw material is placed. In some embodiments, the treating device may be in the form of a coil. The coil may be wrapped around the container containing the at least one raw material to be treated, which is schematically shown in FIG. 11. Or, the coil can be wrapped around an object, such as a support or carrier, that does not contain the at least one raw material to be treated, in the space so that electromagnetic energy is generated within the space and can treat the at least one raw material in the space even though that raw material is not located within the object, i.e. the raw material is located remotely in the space from the object. And a machine generating the electromagnetic field can be inside or outside the enclosed space. In FIG. 11, the dashed lines represent the magnetic field lines of the electromagnetic field generated by the AC current flowing through the coil as provided by an AC current generator. Electric field lines are not depicted. In some other embodiments, the treating device may be in the form of an antenna placed within the space, such as the enclosed space, such as the container, in which the raw material is placed. The antenna may also be inserted into the at least one raw material within the space, such as the enclosed space. In some embodiments, the electromagnetic treatment may be performed for a period of time sufficient on the at least one raw material so as to obtain a composition as disclosed herein.

In some embodiments, after obtaining a composition as disclosed herein by an energy treatment, e.g., an electromagnetic treatment, routine experimentation may be used to determine a suitable mixing ratio of the composition and a target soil, for example, by measuring the relative energy-state value of at least one nutrient element to see if a suitable relative energy-state value is obtained in the mixture and thus to see if the mixture of the composition and the target soil, i.e., the treated soil, is a good candidate for improving plant growth, seeds, and/or quality of plant products. In some embodiments, if the treated soil is a good candidate, the composition disclosed herein may be applied to a larger area of the target soil. And, of course, if soil, plant, plant growth, seeds, quality of seeds, and/or plant products, including improved quality of plant products, are improved by using the compositions as disclosed herein, then it matters not whether the improvement actually obtained is causally related to either increased relative energy-state values or more positive energy spectra. And of course, the energy treatment disclosed herein may be used on traditional fertilizers, including synthetic and organic fertilizers and mixtures thereof, and biofertilizers (substances which contain living microorganisms), to increase the relative energy-state value of at least one nutrient element in the fertilizer and/or to render more positive the energy spectrum of the fertilizer to achieve at least one of the objectives disclosed herein, such as improving the ability of a soil to support horticultural and/or agricultural plant growth. An additional advantage of such energy treatment of fertilizers can be that a lesser amount of fertilizer may be used, thus reducing environmental issues.

The disclosure also relates to methods for treating a soil comprising contacting the soil with an effective amount of a composition disclosed herein. The disclosure also relates to methods for treating a plant comprising contacting for a time sufficient the plant with an effective amount of a composition disclosed herein to improve plant growth, seeds, and/or quality of plant products.

The disclosure also relates to improved soils comprising at least one nutrient element and to improved soils treated with an effective amount of at least one composition disclosed herein. The disclosure also relates to improved plants produced by growing a plant in at least one improved soil disclosed herein and improved seeds, quality of seeds, plants, and/or improved plant products, including improved quality of plant products, produced from a plant grown in at least one improved soil disclosed herein and/or otherwise treated by a composition disclosed herein. The disclosure also relates to methods for producing the improved soils, improved plants, and improved seeds and/or improved plant products. The disclosure relates further to methods for using the compositions disclosed herein and to methods for treating a soil comprising contacting the soil with an effective amount of the compositions disclosed herein, as well as to methods for using the compositions disclosed herein to treat plants to produce improved plants, seeds, and/or improved plant products.

In some embodiments, the composition disclosed herein can increase the relative energy-state value of the at least one nutrient element in a soil when the composition is combined with soil in a ratio of 1:1 by weight, for example; or in any other ratio that can be evaluated to determine if it is effective, such as 1:5,000 to 1:1, further such as, for example, 1:2,500, 1:1,000, 1:800, 1:500, 1:250, 1:100, 1:90, 1:80, 1:70, 1:60, 1:50, 1:40, 1:30, 1:20, 1:10, or 1:1, in a sufficient amount, such as at least 10%, further such as at least 20%, and even further at least 30%, and still even further at least 40%, and yet even further at least 50%, in comparison with the relative energy-state value of the same nutrient element in a pre-existing state in the soil without combining with the composition disclosed herein, to improve the ability of the soil, to be watered by salted water to support plant growth, and/or to support plant growth better than the soil, when not combined with the composition. As a further example, the sufficient increase amount of the relative energy-state value of the at least one nutrient element could also be, for example, at least 60%, and further for example, at least 100%, and as an even further example at least 200%, still even further at least 400%, and yet even further at least 500%, and still yet even further at least 600%, in comparison with the relative energy-state value of the same nutrient element in a pre-existing state in the soil without combining with the composition disclosed herein.

In some embodiments, the composition disclosed herein can decrease the relative energy-state value of at least one harmful element in a soil when the composition is combined with soil in a ratio of 1:1 by weight, for example, or in any other ratio that can be evaluated to determine if it is effective, such as 1:5,000 to 1:1, further such as, for example, 1:2,500, 1:1,000, 1:800, 1:500, 1:250, 1:100, 1:90, 1:80, 1:70, 1:60, 1:50, 1:40, 1:30, 1:20, 1:10, or 1:1, in a sufficient amount, such as at least 2%, further such as at least 5%, even further such as at least 10%, and still even further at least 15%, in comparison with the relative energy-state value of the same harmful element in a pre-existing state in the soil without combining with the composition disclosed herein, to improve the ability of the soil, to be watered by salted water to support plant growth, and/or to support plant growth better than the soil, when not combined with the composition. As a further example, the sufficient decrease amount of the relative energy-state value of the at least one harmful element could also be, for example, at least 20%, and further could also be, for example, at least 50% and also at least 100%, and still yet even further, in comparison with the relative energy-state value of the same harmful element in a pre-existing state in the soil without combining with the composition disclosed herein. In fact, the relative energy-state value of the at least one harmful element may even be reduced to zero.

In some embodiments, the compositions as disclosed herein comprise at least one chemical means for absorbing energy, such as electromagnetic energy, in an amount sufficient and for a time sufficient to make the compositions capable of improving a soil, including a virgin soil, when combined with the composition, to support plant growth better than the soil, when not combined with the composition. In some embodiments, the absorbed electromagnetic energy is sufficient to make the composition capable of improving the ability of a soil, when combined with the composition, to be watered by salted water in whole or in part to support plant growth, compared to the soil, when not combined with the composition. In some embodiments, the absorbed electromagnetic energy is sufficient to make the composition capable, when combined with a soil, or when used to treat a plant directly, of improving plant growths, seeds, and/or quality of plant products.

"At least one nutrient element" as used herein may be any element that is useful for supporting plant growth and/or improving plant growth, seeds, and/or quality of plant products. For example, the at least one nutrient element may be chosen from nitrogen (N), phosphorus (P), potassium (K), calcium (Ca), magnesium (Mg), and sulfur (S), copper (Cu), iron (Fe), manganese (Mn), zinc (Zn), boron (B), molybdenum (Mo), and selenium (Se). As a further example, the at least one nutrient element may be chosen from N, P, and K.

For example, the total of N, P, and K may be present in an amount equal to or greater than 0.5% by weight relative to the total weight of the composition, such as, for example, up to 6% by weight, further such as up to 10% by weight, such as further up to 15% by weight, or even such as further up to 20% by weight, relative to the total weight of the composition. As a further example, each of N, P, and K may be present in an amount equal to or greater than 0.1% by weight relative to the total weight of the composition, such as, for example, up to 2% by weight, such as up to 5% by weight, further such as up to 8% by weight, or even such as up to 10% by weight, relative to the total weight of the composition. As an even further example, the total of N, P, and K may be an amount equal to or greater than 3% by weight relative to the total weight of the composition, such as, for example, up to 5% by weight, further such as up to 25% by weight, even further such as up to 30% by weight, or yet even further still up to 35% by weight, relative to the total weight of the composition. As an even further example, each of N, P, and K may be present in an amount equal to or greater than 0.1% by weight relative to the total weight of the composition, such as, for example, up to 1% by weight, further such as up to 12% by weight, up further still to 15% by weight, or even further still up to 20% by weight, relative to the total weight of the composition.

"At least one photosensitive material" as used herein may be any material that, at least for a period of time sufficient to be useful as disclosed herein, is capable of absorbing at least one photon and being excited to and maintaining a higher energy-state and/or a more positive energy spectrum for that sufficient time period. The "at least one photosensitive material" also includes any precursor that can be converted to a material that, at least for a period of time sufficient to be useful as disclosed herein, is capable of absorbing at least one photon and being excited to and maintaining a higher energy-state, and/or a more positive energy spectrum for that sufficient time period. For example, the at least one photosensitive material may absorb light at a wavelength of 350-800 nm. As another example, the at least one photosensitive material may absorb light at a wavelength of 350-500 nm. As a further example, the at least one photosensitive material may absorb light at a wavelength of 650-800 nm. As an even further example, the at least one photosensitive material may absorb light at a wavelength of 500-650 nm.

Representative examples of the at least one photosensitive material include a photosensitive precursor 5-ALA, which is commercially available, for example, from Beijing Yushenghong Chemical Company, Ltd., China; a rotary screen photosensitizer commercially available from Keqiao Photosensitive Material Factory, Shaoxing, China; photosensitizer 184 commercially available from Dafeng Xinyuanda Chemical Company, Ltd., Jiangsu Province, China; RGALA photosensitizer commercially available from Future Chemical Company, Ltd., Korea; and photosensitizer 1173 commercially available from Dafeng Xinyuanda Chemical Company, Ltd. As another representative example, the at least one photosensitive material may be an extract from plants. The extract from plants may, for example, be an extract from stamen. The extract may be of industrial grade.

Although the specific examples based on experimentation performed and reported herein utilize 5-ALA in combination with other identified raw materials to achieve at least one surprising and unpredictable result disclosed herein, one skilled in the art can, guided by the specification, perform routine experimentation to seek to identify other photosensitive materials, as defined herein, that can be used as the at least one photosensitive material alone or in combination with other raw materials to achieve at least one result disclosed herein.

One of ordinary skill in the art would also understand that otherwise suitable raw materials, for example, photosensitive materials, organic acidic materials, and organic base materials, that contain at least one harmful element, such as Cl, Al, lead, mercury, arsenic, cadmium, and chromium, may have adverse effects to a soil treated therewith and thus may not be suitable for use in the methods, compositions, and other embodiments disclosed herein.

The at least one photosensitive material may be any material that comprises at least one unsaturated bond, such as at least one conjugated double bond, that is not harmful to the soil and/or plants to be treated. As an example, the at least one photosensitive material may comprise at least one substituted or unsubstituted aromatic component, e.g., at least one carbocyclic aryl and/or heteroaryl component, either substituted or unsubstituted.

"Carbocyclic aryl" as used herein encompasses: 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. The carbocyclic aryl may be substituted or unsubstituted.

"Heteroaryl" encompasses: 5- to 7-membered aromatic, monocyclic rings containing one or more, for example, from 1 to 4, or in certain embodiments, from 1 to 3, ring heteroatoms selected from N, O, and S, with the remaining ring atoms being carbon; bicyclic heterocycloalkyl rings containing one or more, for example, from 1 to 4, or in certain embodiments, from 1 to 3, ring heteroatoms selected from N, O, and S, with the remaining ring atoms being carbon and wherein at least one heteroatom is present in an aromatic ring; and tricyclic heterocycloalkyl rings containing one or more, for example, from 1 to 5, or in certain embodiments, from 1 to 4, ring heteroatoms selected from N, O, and S, with the remaining ring atoms being carbon and wherein at least one heteroatom is present in an aromatic ring. The heteroaryl may be substituted or unsubstituted.

For example, heteroaryl includes a 5- to 7-membered heterocycloalkyl, aromatic ring fused to a 5- to 7-membered cycloalkyl or heterocycloalkyl ring. For such fused, bicyclic heteroaryl ring systems wherein only one of the rings contains one or more heteroatoms, the point of attachment may be at either ring. Examples of heteroaryl groups include, but are not limited to, (as numbered from the linkage position assigned priority 1), 2-pyridyl, 3-pyridyl, 4-pyridyl, 2,3-pyrazinyl, 3,4-pyrazinyl, 2,4-pyrimidinyl, 3,5-pyrimidinyl, 2,3-pyrazolinyl, 2,4-imidazolinyl, isoxazolinyl, oxazolinyl, thiazolinyl, thiadiazolinyl, tetrazolyl, thienyl, benzothiophenyl, furanyl, benzofuranyl, benzoimidazolinyl, indolinyl, pyridazinyl, triazolyl, quinolinyl, pyrazolyl, and 5,6,7,8-tetrahydroisoquinolinyl. Other examples of heteroaryl groups include, but are not limited to, isoquinolinyl, isoxazol-3-yl, and isoxazol-5-yl.

As a further example, the at least one photosensitive material may be chosen from alkyl spiro-pyrans, trienes, dienes, and azo compounds. Azo compounds may comprise any compound bearing the functional group R—N=N—R, in which R and R' can be independently chosen from H, aryl, heteroaryl, alkyl, alkenyl, and alkynyl. For example, the azo compounds may comprise HN=NH, diphenyldiazene, and/or diethyldiazene.

"Alkyl" as used herein encompasses substituted and unsubstituted, straight-chain and branched-chain saturated hydrocarbons having the indicated number of carbon atoms, usually 1 to 20 carbon atoms, for example 1 to 8 carbon atoms, such as 1 to 6 carbon atoms. For example, C1-C6 alkyl encompasses both straight- and branched-chain alkyls having 1 to 6 carbon atoms.

"Alkenyl" as used herein encompasses substituted and unsubstituted, branched- and straight-chain hydrocarbon groups having at least one carbon-carbon double bond. The group may be in either the cis or trans configuration about the double bond(s). Exemplary alkenyl groups include, but are not limited to, ethenyl; propenyls such as prop-1-en-1-yl, prop-1-en-2-yl, prop-2-en-1-yl (allyl), prop-2-en-2-yl; butenyls, such as but-1-en-1-yl, but-1-en-2-yl, 2-methyl-prop-1-en-1-yl, but-2-en-1-yl, but-2-en-1-yl, but-2-en-2-yl, buta-1,3-dien-1-yl, and buta-1,3-dien-2-yl.

"Alkynyl" as used herein encompasses substituted and unsubstituted, branched- and straight-chain hydrocarbon groups having at least one carbon-carbon triple bond. Exemplary alkynyl groups include, but are not limited to, ethynyl; propynyls such as prop-1-yn-1-yl, prop-2-yn-1-yl; and butynyls, such as but-1-yn-1-yl, but-1-yn-3-yl, but-3-yn-1-yl.

As an even further example, the at least one photosensitive material may be a terpene. Terpenes can either be synthetically made or extracted from plant sources. Examples of terpenes include but are not limited to geraniol, limonene, terpineol, farnesenes, farnesol, retinol, retinal, phytol, cafestol, kahweol, cembrene taxadiene, geranylfarnesol, and squalene.

The at least one photosensitive material may, for example, be present in a composition in an amount up to about 15%, such as, in the range of about 0.00001% to about 10%, about 0.0001% to about 5%, about 0.001% to about 3.5%, and about 0.01% to about 2.5% by weight relative to the total weight of the composition. In some embodiments, the amount of the at least one photosensitive material may be more conveniently disclosed in units of parts per million ("ppm") relative to the total weight of the composition. Thus, as a further example, the at least one photosensitive material may be present in a composition disclosed herein in the range of about 0.1 ppm to about 100 pm, such as about 0.5 ppm to about 10 ppm, about 1 ppm to about 5 ppm, about 1.5 ppm to about 2 ppm, by weight relative to the total weight of the composition. As another example, the at least one photosensitive material may be present in a composition in the range of about 0.15 ppm to about 0.4 ppm by weight relative to the total weight of the composition. As a further example, the at least one photosensitive material may be present in a composition in the range of about 0.2 ppm to about 0.3 ppm by weight relative to the total weight of the composition.

"At least one organic acidic material" as used herein may be any organic material, at least part of which can donate a hydrogen ion (proton) and/or a composite hydrogen ion, broadly such as R.H+, wherein R is an organic base, such as NH4+ or NH3C2H5+. For example, the at least one organic acidic material may comprise at least one functional group chosen from carboxylic groups, sulphonic groups, enol groups, phenol groups, and sulfhydryl groups, and such functional groups that are chemically modified in well-known ways, such as esterification in the case of carboxylic groups. As another example, the at least one organic acidic material may be chosen from humic acids and alginic acid (also called algin or alginate). As a further example, the at least one organic acidic material may be chosen from nucleic acids, amino acids, and fatty acids. Amino acids may be chosen from amino acids that are beneficial for plant growth, seeds, and/or quality of plant products. For example, amino acids may be agricultural grade amino acids, e.g., a mixture of amino acids commonly used for agricultural purposes. For example, agricultural grade amino acids comprising 47% to 51% of a mixture of 17 amino acids are commercially available from Penghengbo Biochemical Company in Nanhe County, Hebei Province, China. As a further example, amino acids can be chosen from the some 20 naturally occurring amino acids and synthetically modified amino acids. As an even further example, the amino acids may be comprised in a protein hydrolysate, i.e., a mixture of amino acids and/or peptides, for example, a protein hydrolysate derived from soy protein. Nucleic acids may be any nucleic acid additives suitable for fertilizers or plant food. Fatty acids may be any linear or branched fatty acids. For example, fatty acids may comprise at least one chain comprising from 4 to 28 carbons. As another example, fatty acids may comprise at least one chain of 4 to 18 carbons, such as 8 to 16 carbons. The at least one chain may be saturated or unsaturated. As another example, fatty acids may be chosen from hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, stearic acid (octadecanoic acid), nonadecanoic acid, eicosanoic acid, myristoleic acid, palmitoleic acid, sapienic acid, oleic acid, linoleic acid, α-linolenic acid, α-linolenic acid, arachidonic acid, and eicosapentaenoic acid.

Although the specific examples based on experimentation performed and reported herein in the disclosure utilize stearic acid and/or agricultural grade amino acids in combination with other identified raw materials to achieve at least one surprising and unpredictable result disclosed herein, one skilled in the art can, guided by the specification, perform routine experimentation to seek to identify other organic acidic materials, as defined herein, that can be used as the at least one organic acidic material alone or in combination with other raw materials to achieve at least one result disclosed herein.

The at least one organic acidic material may, for example, be present in a composition in the range of about 0.1% to about 25% by weight relative to the total weight of the composition. For example, the at least one organic acidic material may be present in an amount ranging from about 0.1% to about 5%, 0.5% to about 4%, 1% to about 3%, about 1% to about 10%, about 2% to about 9%, about 3% to about 8%, about 4% to about 7%, about 5% to about 6%, about 8% to about 25%, about 10% to about 22%, about 12% to about 20%, about 15% to about 18% by weight relative to the total weight of the composition.

"At least one organic base material" as used herein may be any organic material that can provide carbon. The at least one organic base material may be fermented or non-fermented. The at least one organic base material may be chosen from organic residues from the food, beverage, and chemical industries, such as substituted and unsubstituted furans, and distiller's grains, and residues from the processes of making monosodium glutamates and/or flavor essences. For example, the at least one organic base may be obtained from any plant such as crops and grass, or any parts of a plant, such as barks, roots and leaves. As another example, the at least one organic base material may be chosen from straw powders, wood shavings, sawdusts, and Chinese herb medicine residues. As a further example, the at least one organic base material may be obtained from yard clippings, such as grass and shrub clippings, leaves, hay, straw, shredded bark, whole bark nuggets, sawdust, shells, wood chips, paper waste, such as shredded newspaper and cardboard, animal manure, compost, food waste, whole trees, tree branches or twigs, and/or tree stumps. In at least some embodiments, the organic base material differs from the photosensitive material and/or the organic acidic material.

The at least one organic base material may be present in a composition in the range of about 60% to about 90% by weight relative to the total weight of the composition. For example, the at least one organic base material may be present in an amount ranging from about 65% to about 85%, about 65% to about 75%, or about 70% to about 80% by weight relative to the total weight of the composition.

In some embodiments, the compositions disclosed herein may comprise, for example, about 0.0001% to about 5% by weight of at least one photosensitive material, about 10% to about 20% by weight of the at least one organic acidic material, and about 75% to about 90% by weight of the at least one organic base material, relative to the total weight of the composition.

As an example, for the compositions disclosed herein, a first sub-composition may be present in the range of about 5% to about 20% by weight relative to the total weight of the composition. A second sub-composition may be present in the range of about 5% to about 20% by weight relative to the total weight of the composition. A third sub-composition may be present in the range of about 60% to about 90% by weight relative to the total weight of the composition.

For various compositions disclosed herein, a first sub-composition may further comprise at least one material, other than the at least one organic acidic material, chosen from photosensitive materials, organic base materials, minerals, polysaccharides, water absorbents, proteins, non-proteinaceous enzymes, and traditional chemical fertilizers. A second sub-composition may further comprise at least one material, other than the at least one photosensitive material, chosen from organic acidic materials, organic base materials, colloids, minerals, polysaccharides, and water absorbents.

"Colloids" as used herein may be chosen from organic, inorganic, and organic-inorganic composite colloids. For example, the colloids may be formed from pectin, which is a heteropolysaccharide. As a further example, the colloids may be chosen from agar, carrageenan, and gelatin.

"Minerals" as used herein include any appropriate forms of minerals and can be chosen from mineral salts and mineral complexes chosen from silicates, carbonates, sulfates, oxides, phosphates, oxalates, mellitates, citrates, acetates, formates, and hydrocarbons. For example, the minerals may be chosen from manganese sulfate, zinc sulfate, copper sulfate, ferrous sulfate, ammonium molybdate, and borax (i.e., sodium borate). The minerals may be in a form of any type of rocks suitable for improving a soil, plant growth, seeds, and/or quality of plant products. For example, the minerals may be chosen from phosphate rocks, potassium rocks, shell rocks, and zeolites. As a further example, the minerals may be chosen from bone meal such as fish bone meal, lime, and glacial rock dust. The minerals may be ground into particles of appropriate sizes suitable for improving a soil, plant growth seeds, and/or quality of plant products. For example, the minerals may be broken into particles having a size not greater than about 5 mm. As another example, the minerals may be broken into particles having a size not greater than about 3 mm. The "size" of the particles as used herein means that the particles can pass through a sieve having meshes of that size.

The minerals may, for example, be present in a composition in an amount of from about 0.1% to about 10%, for example, from about 0.5% to about 8%, from about 0.8% to about 5%, from about 1% to about 4%, from about 1% to about 3%, and from about 1% to about 2%, by weight relative to the total weight of the composition.

"Polysaccharides" as used herein may be chosen from polymeric carbohydrates. For example, polysaccharides may be chosen from starch, glycogen, cellulose, and chitin. Starch may, for example, be obtained from any plant. In some embodiments, starch may be obtained from foods such as beans, potatoes, wheat, corn, and rice. As a further example, polysaccharides may be chosen from peptidoglycans, lipopolysaccharides, capsules, exopolysaccharides, dextran, agarose, hyaluronic acid, dermatan sulfate, keratan sulfate, chondrotin sulfate, heparin, and proteoglycans. Some polysaccharides may form colloids, and the term "polysaccharide" also encompasses oligosaccharides.

The polysaccharides may, for example, be present in an amount of from about 0.1% to about 10%, for example, from about 0.5% to about 8%, from about 0.8% to about 5%, from about 1% to about 4%, from about 1% to about 3%, and from about 1% to about 2%, by weight relative to the total weight of the composition.

"Water absorbents" as used herein may be chosen from any materials that can absorb and/or can retain water. For example, the water absorbents may be chosen from water-absorbing silica gel and polymers capable of absorbing water, such as APP, commercially available from Beijing Gaojing Resin Company, China. As a further example, the water absorbents may be chosen from hydrogels composed of crosslinked polymers (e.g., polyethylene oxide and polyvinylpyrrolidone), silicone hydrogels, and polyacrylamides. Of course, any of the other materials in the composition disclosed herein may also have certain water absorbing properties. For example, pectin, which can be a colloid, can also act as a water absorbent.

The water absorbents may, for example, be present in a composition in an amount of less than or equal to about 10% by weight relative to the total weight of the composition, for example, less than or equal to about 7%, as a further example, less than or equal to about 5%, such as for example less than or equal to about 4%, such as further less than or equal to about 3%, and such as even further less than or equal to about 2. %, and further still less than or equal to about 1%.

"Non-proteinaceous enzymes" as used herein may be chosen from co-enzymes. The co-enzymes may be chosen from vitamins and non-vitamin co-enzymes. For example, co-enzymes may be chosen from thiamin, biotin, folic acid, coenzyme A, ascorbic acid, riboflavin, coenzyme B, and coenzyme Q.

As an example, for the compositions disclosed herein, a first sub-composition may, for example, comprise about 50-80% by weight of straw powders, about 8-20% by weight of phosphate rock particles, about 5-20% by weight of agricultural grade amino acids, less than or equal to about 7% by weight of fatty acids, such as stearic acid, about 3-10% by weight of starch, such as corn or potato starch, less than or equal to about 5% by weight of water absorbents, about less than or equal to 2% by weight of manganese sulfate, about less than or equal to 2% by weight of zinc sulfate, about less than or equal to 1.5% by weight of copper sulfate, about less than or equal to 4% by weight of ferrous sulfate, about less than or equal to about 1% by weight of ammonium molybdate, and less than or equal to about 1.2% by weight of borax, relative to the total weight of the first sub-composition. As used herein, the phosphate rock particles are commercially available and could be purchased from, for example, Yi Chang Fu Lin Chemicals (Group) Co. Ltd. in Hubei province, China.

A second sub-composition may, for example, comprise about 50-80% by weight of straw powders, about 8-20.% by weight of phosphate rock particles, about 5-20% by weight of agricultural grade amino acids, less than or equal to about 7% by weight of fatty acids, about 3-10% by weight of starch, such as corn or potato starch, less than or equal to about 7% by weight of water absorbents, about less than or equal to 2% by weight of manganese sulfate, less than or equal to 2% by weight of zinc sulfate, about less than or equal to 1.5% by weight of copper sulfate, about less than or equal to 4% by weight of ferrous sulfate, less than or equal to about 1% by weight of ammonium molybdate, and less than or equal to about 1.2% by weight of borax, relative to the total weight of the second sub-composition and further comprises about 1-3 ppm by weight of 5-ALA relative to the total weight of the second sub-composition.

In some embodiments, the compositions disclosed herein may comprise about 10% by weight of the first sub-composition, about 20% by weight of the second sub-composition, and about 70% by weight of the at third sub-composition, relative to the total weight of the composition. For clarity purposes, those compositions are denoted as "Compositions A." A Composition A, such as one that has been energy treated, as disclosed herein, may be suitable for treating various types of soils, for example, saline and/or alkaline soils, to make them more suitable for plant growth.

In some embodiments, the compositions disclosed herein may comprise about 15% by weight of the first sub-composition, about 15% by weight of the second sub-composition, and about 705% by weight of the third sub-composition, relative to the total weight of the composition. For clarity purpose, those compositions are denoted as "Compositions B." A Composition B, such as one that has been energy treated, as disclosed herein, may be suitable for treating various types of soils, for example, dry soils, such as desert sand soil, to make them more suitable for plant growth.

In some embodiments, a Composition A and a Composition B, for example, wherein one or both of Compositions A and B is energy treated, as disclosed herein, may be combined. e.g., in a 1:1 ratio by weight, to form another composition, denoted as "Composition C." In some embodiments, depending on the raw materials and as long as the Composition C is suitable to achieve at least one result disclosed herein, Composition A and Composition B may be combined in a ratio ranging from 0.01:1 to 1:0.1 by weight, such as for example, 0.1:1, 0.25:1, 0.5:1, 0.75:1, 1:1, 1:0.75, 1:0.50, or 1:0.25. Composition C may be suitable for treating various types of soils, for example, dry, saline, and/or alkaline soils, to make them more suitable for plant growth.

For the compositions disclosed herein, the first, second, and third sub-compositions may or may not be in contact with one another. For example, the first sub-composition, the second sub-composition, and the third sub-composition can be stored in separate places, such as in three different containers, e.g., avoiding light, without being in physical contact with one another. As another example, the first sub-composition, the second sub-composition, and the third sub-composition are separately packaged, and then mixed together to form a mixture before contacting a soil and/or plant. As a further example, at least two of the first, second, and third sub-compositions are combined. As an even further example, the first sub-composition and the second sub-composition are mixed together and packaged, while the third sub-composition is separately packaged. The third sub-composition may then be added to the mixture of the first and second-sub compositions to form another mixture. As an even further example, the first, the second, and the third sub-compositions are not combined, even when being placed in contact with a soil and/or plant. For example, the first sub-composition may be sprayed or spread on the leaves of a plant, the second sub-composition may be sprayed or spread on the stems of the plant, and the third sub-composition may be contacted with the root of the plant and/or the soil where the plant grows. Alternatively, each of the first, second, and third sub-compositions may be applied to the soil to be treated.

The compositions disclosed herein may be solids, liquids, or semi-liquids. For example, the compositions may be in a form of slurry. As another example, at least one of the first and second sub-compositions may be in a liquid form. When the compositions disclosed herein are solids, the solid may be in powder form. When the compositions disclosed herein are applied to soil and/or plants, the compositions can be mixed with at least one material chosen from seeds and soil in various shapes and forms. For example, the composition can be mixed with seeds and/or soil and wrapped in a suitable water permeable material such as a straw bag and then implanted in the target soil, such as in a virgin soil. The compositions disclosed herein can also be formed into bricks containing, in addition to the composition, seeds and/or soil, and then the bricks can be implanted in the target soil. The composition can also be used to form a pellet with soil and/or seeds and can be applied to the soil in various ways, such as crop dusting using an airplane.

The compositions disclosed herein may comprise particles. For example, the particles may have a size not greater than about 5 mm. As another example, the particles may have a size not greater than about 3 mm. As noted above, the "size" of the particles as used herein means that the particles can pass through a sieve having meshes of that size.

The disclosure also relates to compositions, referred as herein as "water soluble compositions," comprising at least one nutrient element, wherein any water insoluble substance in the composition is in the amount of no more than about 5% by weight at room temperature and atmospheric pressure, relative to the total weight of the composition. For example, the insoluble substance in the composition may be in an amount of no more than about 2% by weight, relative to the total weight of the composition at room temperature and atmospheric pressure. "Water soluble composition" can be a composition in which at least 95% by weight of the composition dissolves in water at room temperature and atmospheric pressure. In some embodiments, at least one nutrient element in the water-soluble compositions as disclosed herein possesses a relative energy-state value greater than that of the at least one nutrient element in those compositions in a preexisting state. Without being bound by theory, the greater relative energy-state value is sufficient, e.g., sufficient in value and retained for a time sufficient, to improve a soil, a plant, plant growth, seeds, quality of seeds, and/or plant products, including improved quality of plant products. In some embodiments, without being bound by theory, the greater relative energy-state value is sufficient to make the water soluble composition capable of improving a soil, including a virgin soil, when combined with the water soluble composition, to support plant growth better than the soil, when not combined with the water soluble composition. In some embodiments, again, without being bound by theory, the greater relative energy-state value is sufficient to make the water soluble composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the water soluble composition. In some embodiments, again, without being bound by theory, the greater relative energy-state value is sufficient to make the water soluble composition capable of improving the ability of a soil, when combined with the water soluble composition, to be watered by salted water to support plant growth, compared to the soil, when not combined with the water soluble composition.

In some embodiments, the disclosed water soluble composition possesses an energy spectrum more positive than the energy spectrum of the water soluble composition in a preexisting state. Without being bound by theory, the more positive energy spectrum is sufficient, e.g., enough positive and retained for a time sufficient, to improve a soil, plant growth, seeds, quality of seeds, a plant, and/or a plant product, including improved quality of plant products. In some embodiments, again, without being bound by theory, the more positive energy spectrum is sufficient to make the water soluble composition capable of improving a soil, including a virgin soil, when combined with the water soluble composition, to support plant growth better than the soil, when not combined with the water soluble composition. In some embodiments, again, without being bound by theory, the more positive energy spectrum is sufficient to make the water soluble composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the water soluble composition. In some embodiments, again, without being bound by theory, the more positive energy spectrum is sufficient to make the water soluble composition capable of improving the ability of a soil, when combined with the water soluble composition, to be watered by salted water to support plant growth, compared to the soil, when not combined with the water soluble water soluble composition.

For example, as seen in FIG. 7B, the area under the curve of an energy treated composition, or an energy treated water soluble composition, or a soil combined with an energy treated composition may have a total positive area under the curve more than 10%, such as more than 20%, such as more than 30%, such as more than 40%, such as more than 50%, such as more than 60%, such as more than 70%, such as more than 80%, such as more than 90%, and such as more than 100%, relative to the total positive area under the curve of a composition not so treated, or a water soluble composition not so treated, or a soil not so combined.

For example, a water soluble composition may comprise ingredients that supply major nutrient elements such as N, P, and K. As another example, a water soluble composition may comprise ingredients that supply trace nutrient elements such as Zn, Cu, and Fe. As a further example, a water soluble composition may comprise a humic acid. As an even further example, a water soluble composition may comprise amino acids. As an even further example, a water soluble composition may comprise alginate. Water soluble compositions may be made in a solid form or liquid form. Water soluble compositions in a solid form may be directly applied to a soil or any part of a plant, or may be dissolved in water before application. The liquid form may, for example, be a solution, a suspension, or a slurry. Water soluble compositions in a liquid form may be directly applied to a soil or any part of a plant.

The disclosure also relates to methods of applying water soluble compositions as disclosed herein, comprising contacting a water soluble composition with a soil, or any part of a plant. For example, the water soluble compositions may be applied to a soil or plant by conventional methods such as spraying, dripping, irrigation, and/or dipping.

For example, a water soluble composition may comprise:

50 $kg/m^3$-300 $kg/m^3$ (e.g., 100 $kg/m^3$ to 300 $kg/m^3$, 150 $kg/m^3$ to 300 $kg/m^3$, 200 $kg/m^3$ to 300 $kg/m^3$, and 220 $kg/m^3$ to 270 $kg/m^3$) agricultural grade amino acid, 5 $kg/m^3$ to 50 $kg/m^3$ (e.g., 10 $kg/m^3$ to 40 $kg/m^3$, and 10 $kg/m^3$ to 30 $kg/m^3$) copper sulfate, 10 $kg/m^3$ to 100 $kg/m^3$ (e.g., 20 $kg/m^3$ to 80 $kg/m^3$, 30 $kg/m^3$ to 70 $kg/m^3$, and 40 $kg/m^3$ to 60 $kg/m^3$) zinc sulfate, 5 $kg/m^3$ to 80 $kg/m^3$ (e.g., 10 $kg/m^3$ to 70 $kg/m^3$, 10 $kg/m^3$ to 50 $kg/m^3$, and 20 $kg/m^3$ to 40 $kg/m^3$) manganese sulfate, 5 $kg/m^3$ to 50 $kg/m^3$ (e.g., 10 $kg/m^3$ to 40 $kg/m^3$, and 10 $kg/m^3$ to 30 $kg/m^3$) boric acid, 5 $kg/m^3$ to 50 $kg/m^3$ (e.g., 10 $kg/m^3$ to 40 $kg/m^3$, and 10 $kg/m^3$ to 30 $kg/m^3$) potassium sulfate, and 0.5 $g/m^3$ to 10 $g/m^3$ (e.g., 0.5 $g/m^3$ to 8 $g/m^3$, 1 $g/m^3$ to 6 $g/m^3$, 1.5 $g/m^3$ to 5 $g/m^3$, and 1.5 $g/m^3$ to 3 $g/m^3$) 5-ALA, all by weight relative to the total volume of the composition.

Those ingredients are commercially available from Shunyi Agricultural Materials Company, Beijing, China.

In one embodiment, a water soluble aqueous composition comprises about about 250 $kg/m^3$ agricultural grade amino acid, about 20 $kg/m^3$ copper sulfate, about 50 $kg/m^3$ zinc sulfate, about 30 kg/m³ manganese sulfate,
about 20 kg/m³ boric acid,
about 20 kg/m³ potassium sulfate, and about 2 g/m³ 5-ALA, all by weight relative to the total volume of the composition, balanced to 100% with water.

As mentioned above, the present inventor has discovered novel compositions of practical utility and methods of making and using the compositions, such as, in certain embodiments, for improving soil, plant growth, seeds, and/or quality of plant products to achieve at least one result as disclosed herein. The present inventor has also discovered improved soil, including improved soil made by processes disclosed herein, improved plants, improved plants made by processes disclosed herein, improved seeds, including improved quality of seeds, improved seeds, including improved quality of seeds made by processes disclosed herein, improved plant products, including improved quality of plant products, and/or improved plant products, including improved quality of plant products, made by processes disclosed herein.

Figure 1:
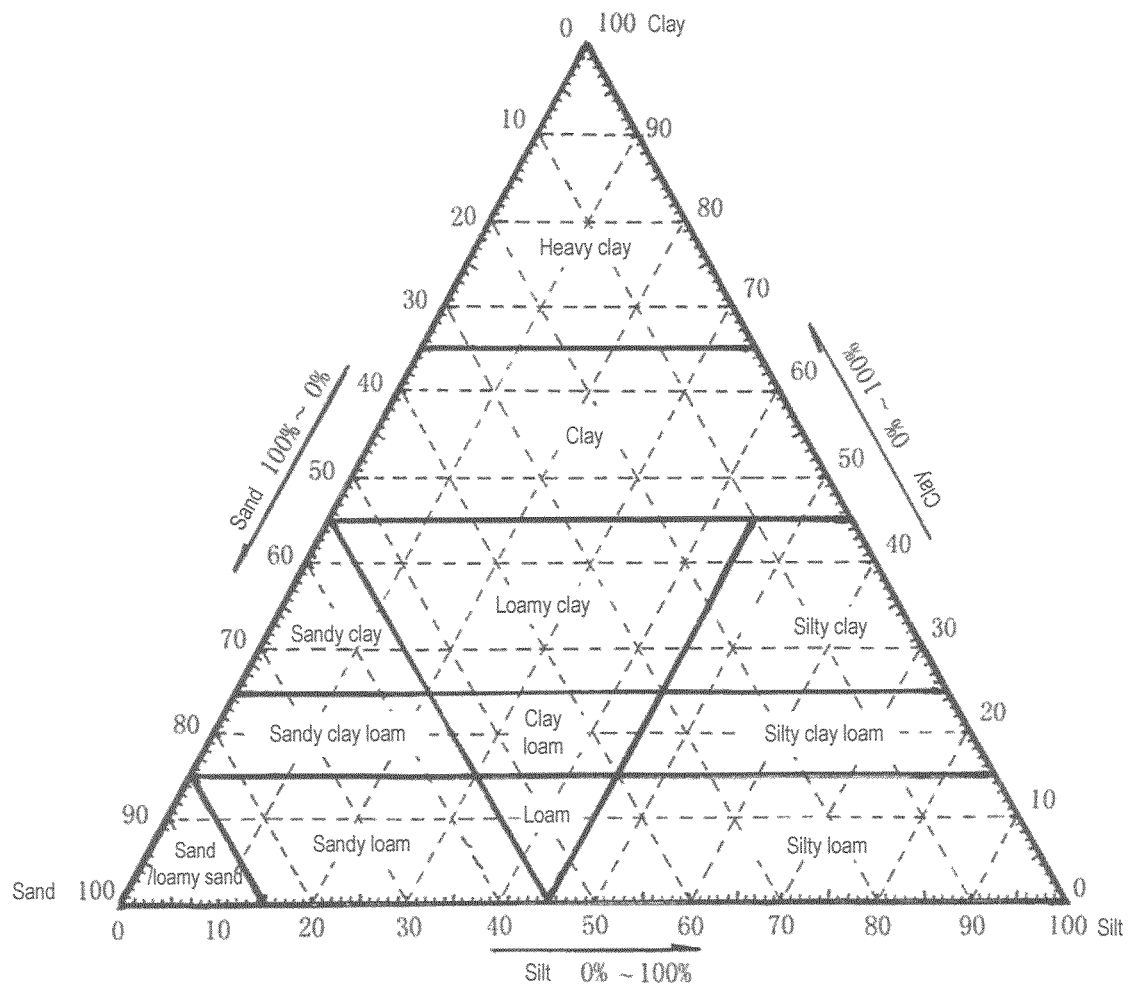
FIG. 1 shows an international soil texture triangle for classification of some soil types.

"Soil" as used herein may broadly refer to any solid and/or semi-solid part of the upper layer of the earth, including soil as normally referenced, as well as compositions that are not normally referenced soil, such as desert sand. For example, a soil may be a soil suitable for plant growth, or a soil, such as sand, not suitable for plant growth. As another example, a soil may be a soil where plants have been grown. As a further example, the soil may be a virgin soil, i.e., a soil where plants have not been grown, such as, for example, a soil that is not suitable for plant growth, such as very alkaline or desert soil. In some embodiments, the virgin soil may be chosen from sand, such as desert sand. Some, but not all, soils may be classified by the international soil texture triangle classification system as shown in FIG. 1 into twelve types, such as heavy clay, clay, sandy clay, loamy clay, silty clay, sandy clay loam, clay loam, silty clay loam, sand/loamy sand, sandy loam, loam, and silty loam.

A soil that can be treated with a composition as disclosed herein may be chosen from a virgin soil, such as sand, e.g., desert sand. A soil that can be treated with a composition as disclosed herein may also be chosen from sand/loamy sand, heavy clay, clay, sandy clay, sandy clay loam, silty clay, silty clay loam, and silty loam. For example, the soil to be treated may be chosen from sand/loamy sand, heavy clay, clay, sandy clay, and silty clay. As a further example, the soil to be treated may be chosen from sand/loamy sand. As an even further example, the soil to be treated may be chosen from sand, such as desert sand. Significantly, even an excellent silty loam may be improved for plant growth and/or the ability to be watered with salted water, by at least one of the processes and/or compositions disclosed herein.

As another example, the compositions as disclosed herein may decrease the relative energy-state value of at least one harmful entity in a soil, when the soil is treated with the compositions disclosed herein. A soil may comprise at least one harmful entity that is not beneficial to plant growth. The "at least one harmful entity" as used herein may be chosen from harmful elements such as Cl, Al, lead, mercury, arsenic, cadmium, and chromium, harmful substances such as bacteria toxins, salty substances, alkaline substances, and organisms such as harmful worms, bacteria, and viruses.

In some embodiments, an improved soil comprises a composition as disclosed herein, or an altered form of the composition as disclosed herein. For example, before and/or after a soil is treated with a composition as disclosed herein, certain ingredients in the composition may undergo chemical or physical changes, and thus the composition may exist in a chemically or physically altered form that is different from the form of the composition after energy treatment and/or prior to the combination with the soil and possibly also the form may continue to be altered after energy treatment and before combination with the soil, as well as after initial combination with the soil. An improved soil may comprise at least one nutrient element that possesses a relative energy-state value sufficient, e.g., of a value and retained for a time sufficient, to make the improved soil capable of improving plant growth, seeds, and/or quality of plant products better than the soil before treatment. In another embodiment, an improved soil may comprise at least one nutrient element that possesses a relative energy-state value sufficient, e.g., of a value and retained for a time sufficient, to make the improved soil capable of being watered by salted water in part or in whole to improve plant growth, seeds, and/or quality of plant products. As a further example, an improved soil may possess an energy spectrum sufficiently more positive and for a sufficiently long amount of time, to support plant growth better than the soil did before treatment. As an even further example, an improved soil may possess an energy spectrum sufficiently positive for a time sufficient to be watered by salted water in part or in whole to support plant growth, whereas the untreated soil could not be so watered.

Soil that is to be treated in accordance with the present disclosure and improved (sometimes referenced as "soil to be improved" or "target soil") may be chosen from sand/loamy sand, heavy clay, clay, sandy clay, sandy clay loam, silty clay, silty clay loam, silty loam, sandy loam, loamy clay, clay loam, and loam. For example, the soil to be improved may be chosen from sand/loamy sand, heavy clay, clay, sandy clay, sandy clay loam, silty clay, and silty clay loam. For another example, the soil to be improved may be chosen from sand/loamy sand, heavy clay, clay, sandy clay, and silty clay. For yet another example, the soil to be improved may be sand/loamy sand. For yet another example, the soil to be improved may be chosen from sandy clay loam, silty clay loam, silty loam, sandy loam, loamy clay, clay loam, and loam. For yet another example, the soil to be improved may be chosen from sandy loam, loamy clay, clay loam, and loam. As a further example, the soil to be improved may be chosen from sandy loam and loam. As an even further example, the soil to be improved may be loam.

A "plant" as used herein means any plant, including agricultural and horticultural plants as defined above. Such a plant may be a food-producing plant, such as wheat, rice, potatoes, beans, such as soy beans, tomatoes, raspberry bushes, grape vines, pineapple plants, fruit trees, such as banana, orange, apple, and pear trees, and corn crops, or a plant, such as hay, that itself can be used for food, such as for animals, or a plant that can be used as a source of at least one oil, including agricultural oil or industrial oil, such as sesame oil derived from sesame, or a castor oil plant or a jatropha curcas, and further such as palm oil, coconut oil, and palm kernel oil derived from the fruit of palm trees, rapeseed oil/canola oil, olive oil derived from the fruit of olive trees, corn oil derived from corn, or a plant that can produce a commodity, such as a cotton tree, a fruit tree, etc. Such a plant may also be tobacco, wherein the leaves are used to make products such as cigarettes. Such plants may also include plants not grown for food-production purposes, for example, trees, shrubs, bushes, flowers, and/or grass that may be grown, for example, for aesthetic, environmental, or even sporting purposes. As a further example, such plants may include grass grown, for example, for a lawn or a golf course, an international football pitch, or an American football field.

"Plant growth" as used herein includes growth of agricultural and horticultural plants, as referenced above. Plant growth may include growth of any part of a plant, such as, roots, leaves, stems, stalks, branches, seeds, and/or flowers. Plant growth may be agricultural plant growth. For example, plant growth may include increased yield of a plant product, including, e.g., increased numbers of fruits, nuts, and/or vegetables produced per unit plant, and/or increased biomass, e.g., fruit, nuts, leaves, stems, roots, and any other part of the plant that may be of economic value. For another example, the plant growth can improve food yield, such as improving quantitatively production of various grains or vegetables per unit plant. For another example, plant growth include growth increase in size of the plant, rate of plant growth, and number of plants grown per acre. As another example, plant growth includes increased seed yield and/or size such as increased number of seeds, increased weight of seeds, and/or increased number of filled seeds. For a further example, plant growth includes increased disease resistance, increased pest resistance, increased drought tolerance, increased low-temperature tolerance, and increased stress tolerance. In some other embodiments, the plant growth is chosen from, for example, growth of grass, such as, for a lawn or for a golf course, growth of trees, or growth of flowers.

"Improved plant" as used herein refers to a plant that experiences improved plant growth, the improved plant also possessing at least one other improved characteristic, as described immediately above.

"Improved seeds" as used herein refers to seeds that will produce a plant that possesses at least one improved characteristics as described above, and/or improved quality, e.g., taste, nutrition, germination rate, time for generation, time from planting to harvest, increased shelf life of the seeds, and/or appearance. "Improved quality of seeds" as used herein, is an improved seed, the seed being additionally further improved in at least one characteristic, such as stronger, capable of producing a higher yield of plant, increased disease resistance, increased pest resistance, increased drought tolerance, increased low-temperature tolerance, increased stability regarding decomposition and/or decay, and increased stress tolerance.

"Improved plant products" as used herein refers to any products obtained from any part of a plant, e.g., fruits, leaves, stems, vegetables, nuts, roots, and/or seeds, having improved quality in, e.g., taste, nutrition, size, such as increased height, size of leafs, structural characteristics, such as stalks of improved strength, and/or appearance. "Improved quality of plant products" as used herein, is an improved plant product, the plant product being additionally further improved in at least one characteristic of the plant product, such as texture, taste, color, increased nutritional value, increased disease resistance, increased pest resistance, increased drought tolerance, increased low-temperature tolerance, increased stability regarding decomposition and/or decay, and increased stress tolerance.

"Improved soil" as used herein refers to a soil that has been improved such that the soil is capable of improving plant growth, seeds, and/or quality of plant products compared to the soil that has not been improved, or, as a further example, refers to a soil that has been improved such that plants grown therein can be watered in whole or in part by salted water. For instance, at least one of the physical, chemical, and biological characteristics of soil can be improved in a balanced way, such as the humidity of the soil can be improved, the air permeability of the soil can be improved, and the gaseous portion of the soil can be improved. For instance, a soil can be improved to have, for example, a combination of 3 to 5% gaseous phase, such as 5%, 45 to 70% solid phase, such as 60%, and 30 to 35% liquid phase, such as 35%. And in some embodiments, when at least one of the physical, chemical, and biological characteristics of a soil is improved in a balanced way, at least one of those improvements can be maintained over a prolonged period, such as 2 to 10 years. And in some target soil, such as desert sand, plant growth basically cannot be supported at all. That soil improved in accordance with the present disclosure can be a soil that can support such growth. And in some target soil, plant growth cannot be supported hardly at all if salted water is used for watering such plants. That soil improved in accordance with the present disclosure can be a soil that can be watered at least partially or even exclusively with salted water in part or in whole to sustain plant growth.

As mentioned above, in some embodiments, the electromagnetic treatment may be performed for a period of time sufficient to increase the relative energy-state value of the at least one nutrient element in the at least one raw material. The greater relative energy-state value is sufficient, e.g., of such a value and retained for a sufficient time, to make the composition capable of improving the ability of a soil, when combined with the composition, to be watered by salted water to support plant growth, compared to the soil, when not combined with the composition. In some embodiments, the electromagnetic treatment may be performed for a period of time sufficient to make the energy spectrum of the composition sufficiently more positive, e.g., enough more positive and retained for a sufficient time, than that of the composition in a preexisting state to make the composition capable of improving the ability of a soil, when combined with the composition, to be watered by salted water to support plant growth, compared to the soil, when not combined with the composition.

"Salted water" as used herein may be an aqueous solution, suspension, or slurry containing one or more salts, for example, containing at least one salt chosen from sodium, magnesium, calcium, potassium, chlorine, sulfur, and bromine. For example, salted water may be seawater, as found in the Atlantic, Indian, and Pacific Oceans, and the Mediterranean Sea, or water from inland sources of salted water.

As previously mentioned, in some embodiments, the electromagnetic treatment may be performed for a period of time sufficient to increase the relative energy-state value of at least one nutrient element in the at least one raw material so as to obtain the composition as disclosed herein.

"Relative energy-state value" as used herein refers to a ratio of the magnetic induction intensity of an element in a sample being measured to the magnetic induction intensity of that same element in a standard reference sample, such as those standard reference samples found in commercially available machines to be described hereinbelow. The magnetic induction intensity of an element may be represented by an electrical signal output from an apparatus, and the apparatus may amplify the signal as needed. For any particular element, the standard reference sample may be the same or different for different comparison sets of examples. In other words, different machines with different standard reference samples for various elements can be used. When different standards are used in different comparison sets, i.e., possibly arising from using different machines, the ratios obtained for a given sample may be different for different elements, but the relative trend of those ratios for the given sample should be the same. However, in a single comparison set of the samples, i.e., when a single machine is used as described herein for a given sample, the standard reference sample for each particular element is a single reference standard. In one single comparison set, the following standard reference samples are respectively used for the elements of N, P, K, Ca, Mg, S, Cu, Fe, Mn, Zn, B, Mo, and Se in all samples: ammonium sulfate for N, calcium phosphate monobasic for P, potassium chloride for K, calcium sulfate for Ca, magnesium sulfate for Mg, sulfur dioxide for S, copper sulfate for Cu, ferrous sulfate for Fe, manganese sulfate for Mn, zinc sulfate for Zn, boric acid for B, ammonium molybdate for Mo, and selenium dichloride for Se. In other words, in that single comparison set, there is a single reference standard for each of the elements, such as a single reference standard for N and a single reference standard for P.

Therefore, the relative energy-state value of an element indicates the relative value of the magnetic induction intensity of that element in a sample being measured in comparison with the magnetic induction intensity of that same element in a standard reference sample. A higher positive relative energy-state value, i.e., ratio, of an element indicates that element in the sample being measured has a higher potential than that same element in a standard reference sample in, for example, its ability to transfer energy and/or its ability to be absorbed by plants.

The relative energy-state value of an element may be measured using, for example, a quantum resonance spectrometer (QRS), such as the TJQQ-1 quantum resonance spectrometer or the TJQ-D quantum resonance spectrometer manufactured by and commercially available from Chongqing Tianjiquan Quantum Medical Development and Research Institute in China, and the J-1 quantum resonance spectrometer commercially available from Corporation Quantum Medical Research Institute of Japan. Each commercial source provides operating instructions for the machine sold, such as the J-1 quantum resonance spectrometer commercially available from Corporation Quantum Medical Research Institute of Japan and utilized for the experiments reported in Example 8. For the J-1 machine utilized herein, customized software is included along with the machine.

As previously mentioned, in some embodiments, the electromagnetic treatment may be performed for a period of time sufficient to increase the relative energy-state value of the at least one nutrient element to a relative energy-state value greater than the relative energy-state value of the at least one nutrient element in a preexisting state. Similarly, and as discussed in further detail below, in some embodiments, the electromagnetic treatment may be performed for a period of time sufficient to make the energy spectrum of the composition more positive than the energy spectrum of the composition in a preexisting state, with the more positive energy spectrum being enough more positive and lasting sufficiently in time to achieve at least one objective disclosed herein.

A "preexisting state" as used herein refers to a state in which the nutrient element, or the composition, or the soil, or the plant, or any part thereof, e.g., the seed, finds itself, with respect to relative energy-state value, prior to the treatment(s) disclosed in the present disclosure. It can also be the state in which a composition or the soil or the plant, or any part thereof, e.g., the seed, finds itself, with respect to energy spectrum, prior to the treatment(s) disclosed in the present disclosure.

"Energy spectrum" as used herein refers to a recording of the intensity of the electromagnetic wave measured on a sample versus frequency. The energy spectrum may be measured using, for example, the RSA6000 series spectrum analyzers manufactured by and commercially available from Tektronix or the QFS-3401 bio-organism weak magnetic field analyzer commercially available from Beijing Xianmai Quantum Scientific Applied Technology Development Co., Ltd., China, and shown in FIGS. 10A and 10B. Again, each commercial source provides operating instructions, and the QFS-3401 analyzer comes with customized software.

The present disclosure, in one aspect, relates to methods for making the compositions disclosed herein for improving soil, plant growth, seeds, and/or quality of plant products. In one embodiment, the present disclosure relates to a method of making a composition comprising performing an electromagnetic treatment on a composition in a preexisting state. In another embodiment, the present disclosure relates to a method of making a composition comprising performing an electromagnetic treatment on the at least one raw material comprising at least one nutrient element for a time sufficient to increase the relative energy-state value of the at least one nutrient element, compared to the relative energy-state value of the at least one nutrient in a preexisting state, and wherein the composition, perhaps because of the increased relative energy-state value of the at least one nutrient element, improves the ability of a soil, when combined with the composition, to support plant growth better than the soil, when not combined with the composition. In yet another embodiment, the present disclosure relates to a method of making a composition comprising performing an electromagnetic treatment on the at least one raw material comprising at least one nutrient element for a time sufficient to make an energy spectrum of the at least one raw material sufficiently more positive, compared to the energy spectrum of the at least one raw material in a preexisting state, such that the composition, perhaps because of the sufficiently more positive energy spectrum, improves the ability of a soil, when combined with the composition, to support plant growth better than the soil, when not combined with the composition.

The electromagnetic treatment may be performed on at least one raw material disclosed herein by applying an electromagnetic field to a space, such as a container, in which the at least one raw material is placed. The electromagnetic treatment may be performed for a period of time sufficient to increase the relative energy-state value of the at least one nutrient element in the at least one raw material so as to obtain the composition as disclosed herein. The composition so obtained, as disclosed herein, may be capable of improving a soil, when the soil is combined with the composition, to support plant growth better than the soil, when not combined with the composition. The composition disclosed herein may also be capable of improving the ability of a soil, when combined with the composition so disclosed, to be watered by seawater to support plant growth, compared to the soil, when not combined with the composition. The composition disclosed herein may also be capable of improving plant growth by being applied to plants, such as agricultural plants by, for example, spraying. And improved soils are also disclosed herein.

The electromagnetic treatment may be performed on at least one raw material containing the at least one nutrient element disclosed herein by applying an electromagnetic field, as described above, to a space, such as a container, in which the at least one raw material is placed. The electromagnetic treatment may be performed for a period of time sufficient to make an energy spectrum of the composition sufficiently more positive for a sufficient time and/or to increase sufficiently the relative energy-state value of selected nutrient elements for a sufficient time so as to obtain a composition useful to achieve at least one result as disclosed herein. And sufficient instructions and details are given herein so that one skilled in the art will routinely be able to assemble needed machinery and parts to determine how to perform, the electromagnetic treatment under specific conditions. The composition so obtained, as disclosed herein, may be capable of improving a soil, when the soil is combined with the composition, to support plant growth better than the soil, when not combined with the composition. The composition disclosed herein may also be capable of improving the ability of a soil, when combined with the composition so disclosed, to be watered by seawater, at least partially or exclusively, to support plant growth, compared to the soil, when not combined with the composition. The composition disclosed herein may also be capable of improving plant growth by being applied to plants, such as agricultural plants by, for example, spraying. And improved soils are also disclosed herein.

"Raw material" as used herein refers to an ingredient, prior to energy treatment, for making a composition as disclosed herein. "Composition" as used herein generally refers to a mixture of at least one raw material that is treated by an energy treatment, e.g., an electromagnetic treatment, as disclosed herein. "Composition in a preexisting state" as used herein generally refers to a mixture of at least one raw material as it exists prior to such energy treatment.

Figure 2:
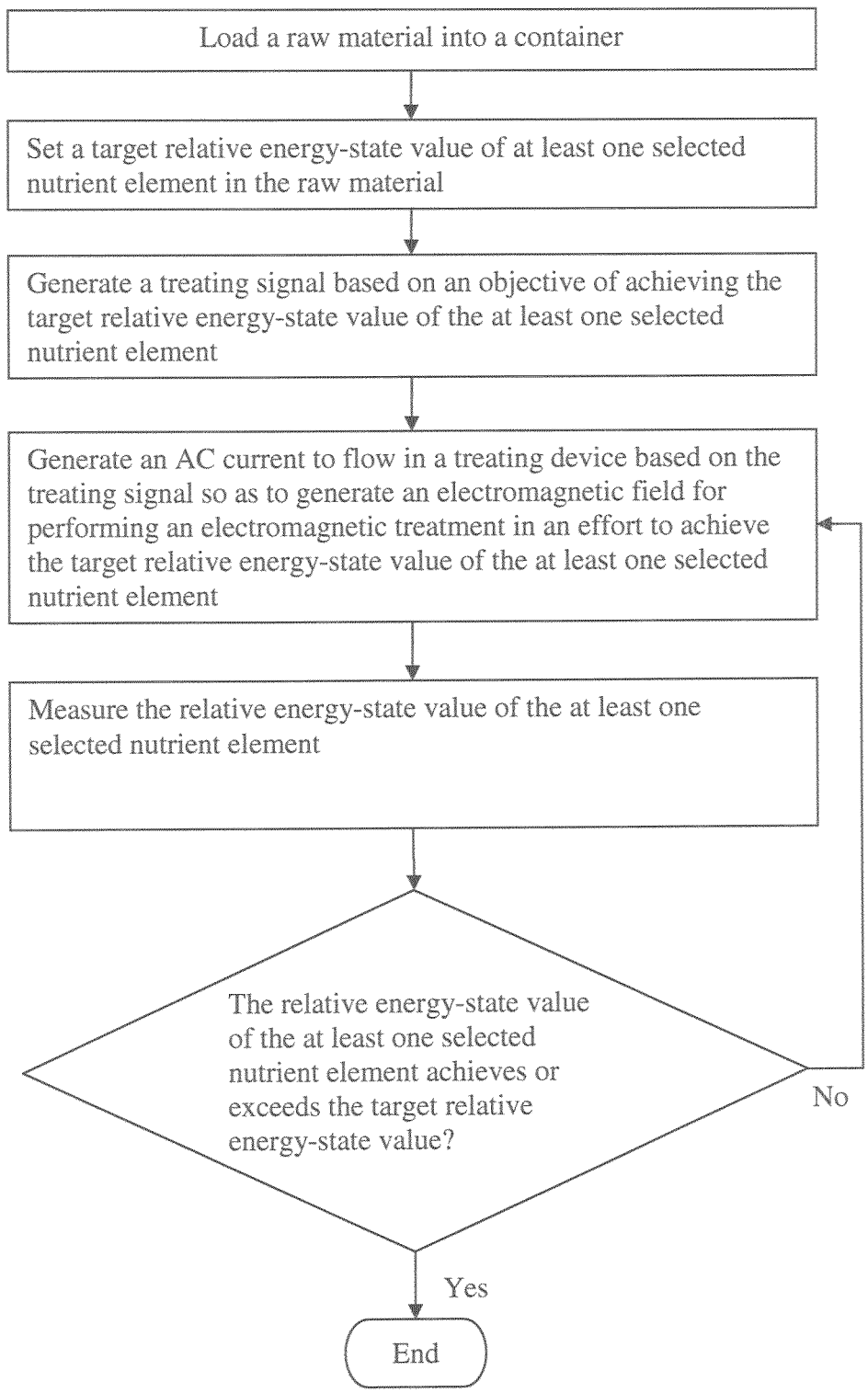
FIG. 2 shows a flow chart of a process for making a composition according to one embodiment of the present disclosure.

FIG. 2 schematically explains how the electromagnetic treatment is performed on the at least one raw material to make the composition as disclosed herein. First, the at least one raw material is loaded into a container. The container may comprise, for example, an insulating material. In one embodiment, the container is covered by an insulating outside layer. In some embodiments, the container may, for example, be closed or semi-closed, such as sealed or semi-sealed, further such as shielded or semi-shielded, after the at least one raw material is loaded. The electromagnetic treatment is then performed by generating an AC current to flow through a treating device so as to generate an electromagnetic field in a space in which the container (and the at least one raw material contained therein) is placed, as described above.

According to one embodiment disclosed herein, the treating device may be in the form of a coil. The coil may be wrapped around the container containing the at least one material to be treated. According to another embodiment disclosed herein, the treating device may be in the form of an antenna. The antenna may be placed near to the container holding the material to be treated, placed on the container holding the material to be treated, inserted into the container holding the material to be treated, or inserted into the material to be treated. In some embodiments, the treating device may comprise a plurality of coils. In some embodiments, the treating device may comprise a plurality of antennae. The antennae may be arranged surrounding the container holding the raw material.

In one embodiment, the electromagnetic treatment disclosed herein may involve setting a target relative energy-state value for at least one selected nutrient element in the at least one raw material, as shown in FIG. 2. The at least one selected nutrient element may, for example, be chosen from N, P, K, Ca, Mg, S, Cu, Fe, Mn, Zn, B, Mo, and Se. As a further example, the at least one selected nutrient element may be chosen from N, P, and K.

In some embodiments, the target relative energy-state value may be set based on a standard soil. In some embodiments, the target relative energy-state value may be set based on the target soil to which the composition as disclosed herein is to be applied. In one embodiment, experiments may be performed by observing the growth of various plants in the target soil to which the composition as disclosed herein is to be applied. In those experiments, compositions disclosed herein having different relative energy-state values for the selected nutrient element are studied, so as to determine a target relative energy-state value for each nutrient of interest that is more suitable for the target soil.

In some embodiments, before the energy treatment, a measurement may be performed on the at least one material to be treated to obtain the relative energy-state value of at least one selected nutrient element in the at least one material to be treated. In some embodiments, the measurement may be performed using a QRS machine as described above. The target relative energy-state value may, for example, be set further based on the relative energy-state value of the selected nutrient element in a preexisting state, such as when measured before the treatment.

A treating signal may then be generated, for example, by the machine performing the electromagnetic treatment, based on the target relative-energy state value. In some embodiments, the treating signal broadly includes information about the length of the treatment, and the frequency (Hz), voltage (V), and intensity (A (amperes)) of the treating AC current.

The AC current may be generated using an AC current generator to flow in the treating device based on the treating signal so as to generate an electromagnetic field for performing an electromagnetic treatment in an effort to achieve the target relative energy-state value of the at least one selected nutrient element. See FIG. 2. The AC current generator may be a single generator. Alternatively, the AC current generator may comprise a plurality of generators for generating AC current of different frequencies. For example, the AC current generator may comprise an ultra-low frequency generator for generating an AC current having a frequency of about 0.001 Hz to about 1 kHz, a low frequency generator for generating an AC current having a frequency of about 1 kHZ to about 1 MHz, a video frequency generator for generating an AC current having a frequency of about 20 Hz to about 10 MHz, a high frequency generator for generating an AC current having a frequency of about 200 kHz to about 30 MHz, a very-high frequency generator for generating an AC current having a frequency of about 30 MHz to about 300 MHz, and an ultra-high frequency generator for generating an AC current having a frequency of higher than about 300 MHz.

In some embodiments, the supply voltage applied to the AC current generator for generating the AC current may be set to the normal civil use voltage, such as from about 110 V to about 220 V. More particularly, in some embodiments, the supply voltage may be about 200 V or 240 V. In some embodiments, the supply voltage may be about 220 V. In some embodiments, the supply voltage may be about 110 V to about 120 V.

In some embodiments, the working voltage applied to the treating device may be about 5 V to about 220 V. For example, in some embodiments, the working voltage may be about 10 V to about 15 V.

In some embodiments, the intensity of the AC current may be chosen from about 0.02 A to about 40 A. More particularly, in some embodiments, the intensity of the AC current may be chosen from about 12 A to about 20 A. In some embodiments, the intensity of the AC current may be about 36 A. In some embodiments, the intensity of the AC current may be chosen from about 0.06 A to about 6 A.

In some embodiments, the AC current for the electromagnetic treatment has a frequency ranging from about 20 Hz to about 50,000 Hz, such as from about 25 Hz to about 10,000 Hz, and further such as from about 25 Hz to about 1000 Hz. In one embodiment, the AC current utilized for the electromagnetic treatment has a frequency of 900 Hz.

In some embodiments, during the electromagnetic treatment, the frequency of the AC current may be changed, for example, gradually from about 25 Hz to about 10,000 Hz, such as from about 25 Hz to about 1000 Hz, or such as from about 500 Hz to about 1500 Hz. In some embodiments, during the electromagnetic treatment, the frequency of the AC current may, for example, be fixed at 900 Hz, 600 Hz, 700 Hz, 800 Hz, and 1000 Hz. During the electromagnetic treatment, the voltage and intensity of the AC current may be kept constant or may be varied.

In some embodiments, the length of the electromagnetic treatment may be set based on the target relative energy-state value. In some embodiments, the length of the electromagnetic treatment may be set based also on the environmental temperature and/or humidity. For example, in general, the higher the temperature and/or humidity, the shorter the length of treatment may be. In some embodiments, the length of the electromagnetic treatment may be about 25 minutes to about 2 hours. In one embodiment, the length of the electromagnetic treatment may be about 1 hour. In one embodiment, the length of the electromagnetic treatment may be about 45 minutes. In one embodiment, the length of the electromagnetic treatment may be about 2 hours, and the treatment may be applied three times, with a four-hour pause between treatments.

In some embodiments, the electromagnetic treatment may be performed in two phases. In the first phase, the frequency of the AC current for the electromagnetic treatment may be changed gradually from about 25 Hz to about 1000 Hz while the voltage and intensity of the AC current are kept constant. In the second phase, the frequency of the AC current may be changed gradually from about 1000 Hz to about 10000 Hz while the voltage and intensity of the AC current are kept constant.

The length of the first phase may be from about 20 minutes to about 45 minutes. The length of the second phase may be the difference between the length of the treatment as set in the treating signal and the length of the first phase, and generally the length of the second phase may be from about 75 minutes to about 100 minutes. In one embodiment, there is no need to pause between completion of the first phase and initiation of the second phase.

As noted above, a composition in a preexisting state comprises at least one raw material. If there is only one such composition, the process may proceed to the next step, which may be the measurement of post-treatment relative energy-state value. If there is more than one composition, referenced herein as sub-compositions, the at least one raw material of at least one of the sub-compositions is treated, with the other(s) being optionally treated.

The relative energy-state value of the at least one selected nutrient element in the as-treated at least one raw material or in a mixture of sub-compositions that have been treated, may be measured using, for example, a QRS machine, as described above and as set forth in more detail in Example 8. That relative energy-state value may be compared with the target relative energy-state value to see if the relative energy-state value of the at least one selected nutrient element has been increased to achieve or exceed the target relative energy-state value, as shown in FIG. 2. If yes, it may be determined that the composition as disclosed herein, which possesses at least one of the capabilities noted herein, has been obtained, and the process ends. If no, the electromagnetic treatment may be repeated as described above, as many times as needed, until the relative energy-state value of the selected nutrient element has been increased to achieve or exceed the target relative energy-state value.

Figure 3:
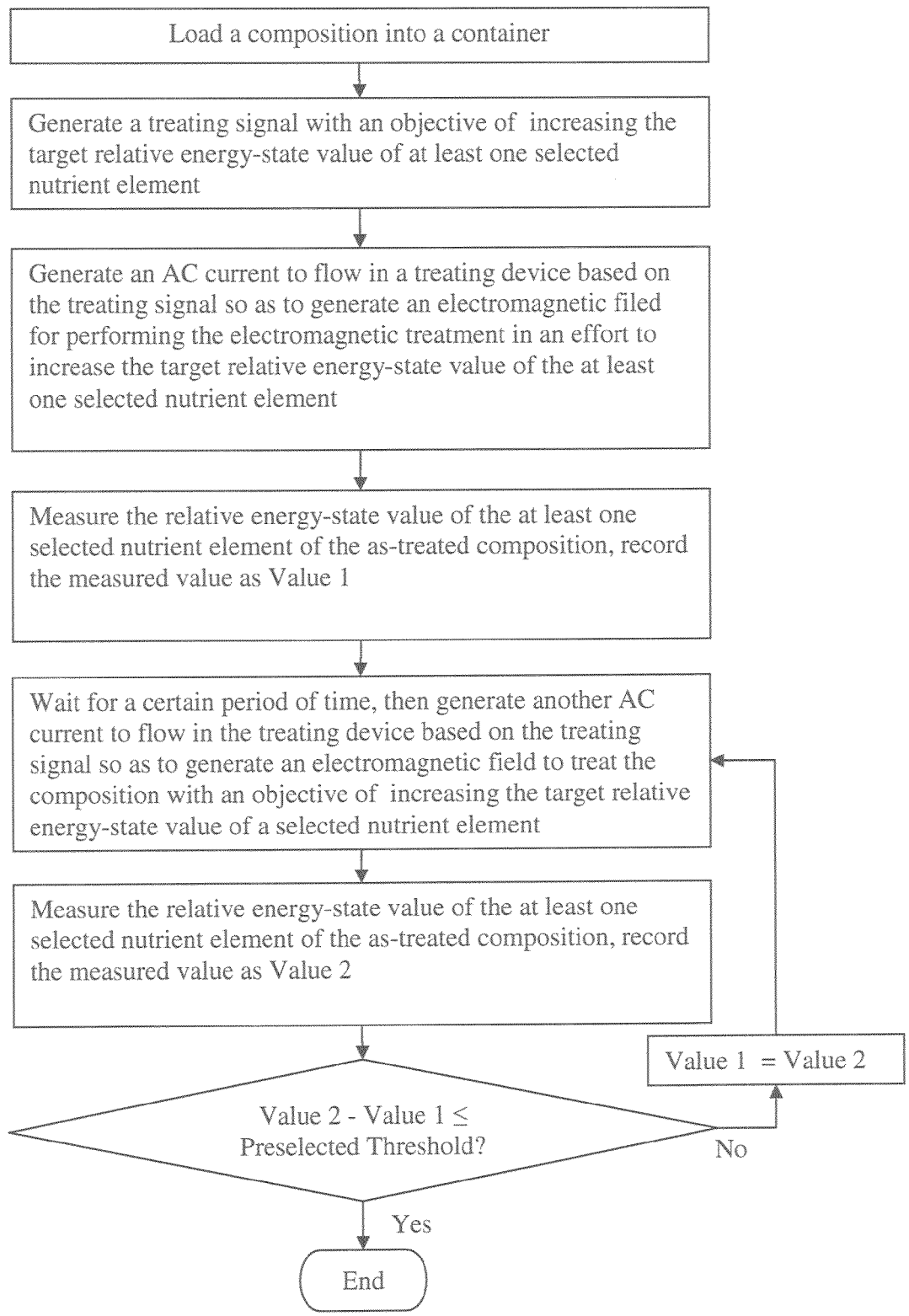
FIG. 3 shows a flow chart of a process for making a composition according to another embodiment of the present disclosure.

Alternatively, the method disclosed herein may not use a target relative energy-state value to determine when to stop repeating the electromagnetic treatment. In one embodiment, as shown in FIG. 3, two electromagnetic treatments may be performed successively. The relative energy-state value of the selected nutrient element may be measured after each treatment. The relative energy-state value of the selected nutrient element after two successive treatments may be compared to see whether the second treatment of the two successive treatments further increases the relative energy-state value of the selected nutrient element by a certain amount or by any amount. For example, the relative energy-state value of the selected nutrient element after the second treatment (Value 2 in FIG. 3) may be compared with the relative energy-state value of the selected nutrient element after the first treatment (Value 1 in FIG. 3) to see whether the condition Value $2 -$ Value $1 \le a$ preselected threshold is satisfied, wherein the preselected threshold is a non-negative value. If yes, it may be determined that the composition as disclosed herein, which possesses at least one of the capabilities noted herein, as noted above, has been obtained, and the process ends. If no, there may be a possibility that the relative energy-state value of the selected nutrient element may be further increased; thus the electromagnetic treatment may be repeated as many times as necessary until the desired result is achieved, or until it is determined that the desired result will not be achieved. The interval between two successive treatments may, for example, be about 2 hours to about 5 hours, such as about 4 hours.

In some embodiments, the composition as disclosed herein may comprise more than one sub-composition. In some embodiments, the raw material may comprise at least a first raw material for a first sub-composition for making the composition and a second raw material for a second sub-composition for making the composition. As noted above, the at least one raw material for each of the sub-compositions may or may not be electromagnetically treated. In one embodiment, the composition as disclosed herein may comprise three sub-compositions. The at least one raw material for the first, second, and third sub-compositions may be termed as the first, second, and third raw materials, respectively. The first and second raw materials, respectively, may be electromagnetically treated to obtain the first and second sub-compositions. The third raw material may not be treated and may be used directly as the third sub-composition, or it may also be treated.

Figure 4A:
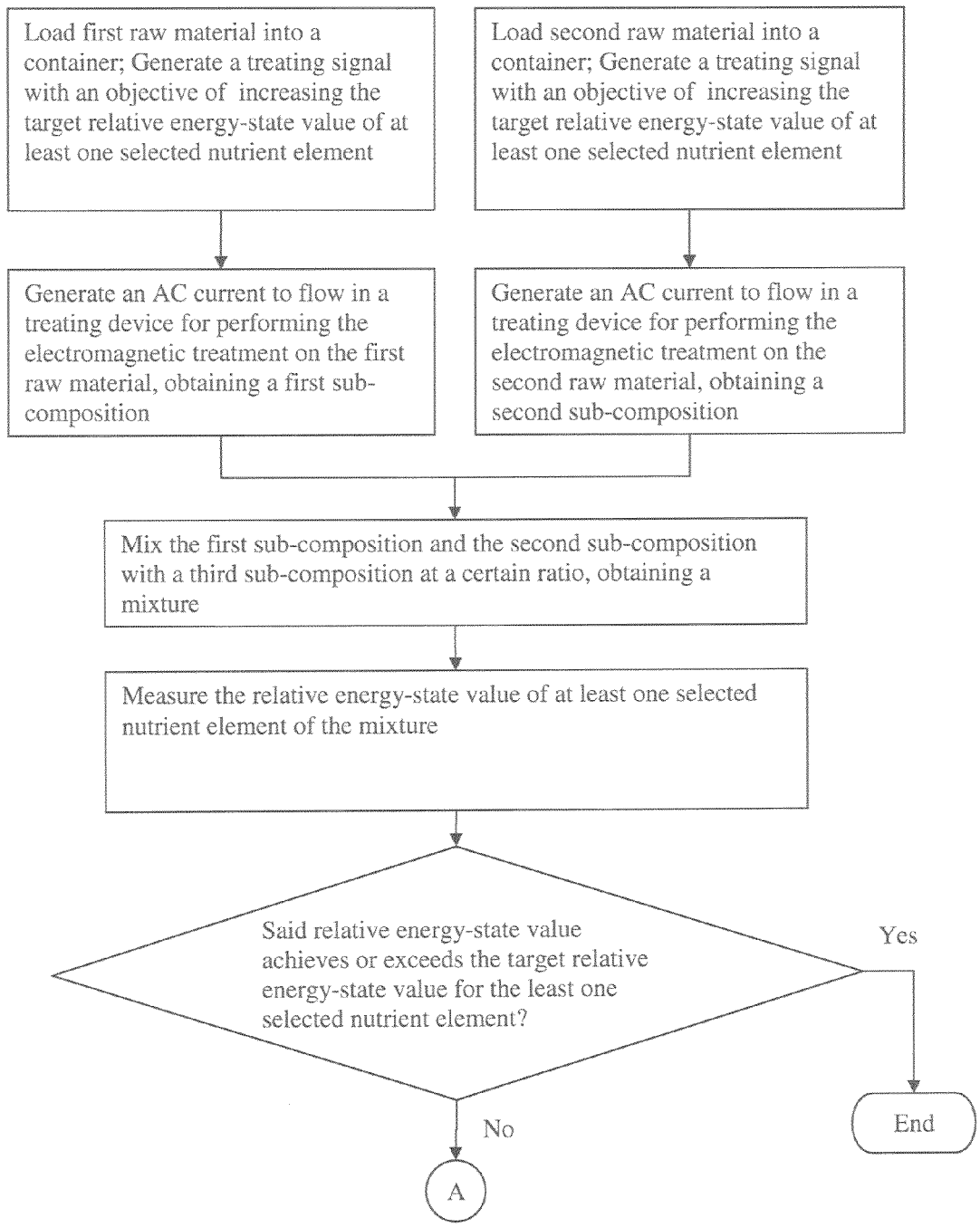
FIGS. 4A and 4B show a flow chart of a process for making a composition according to yet another embodiment of the present disclosure.
Figure 4B:
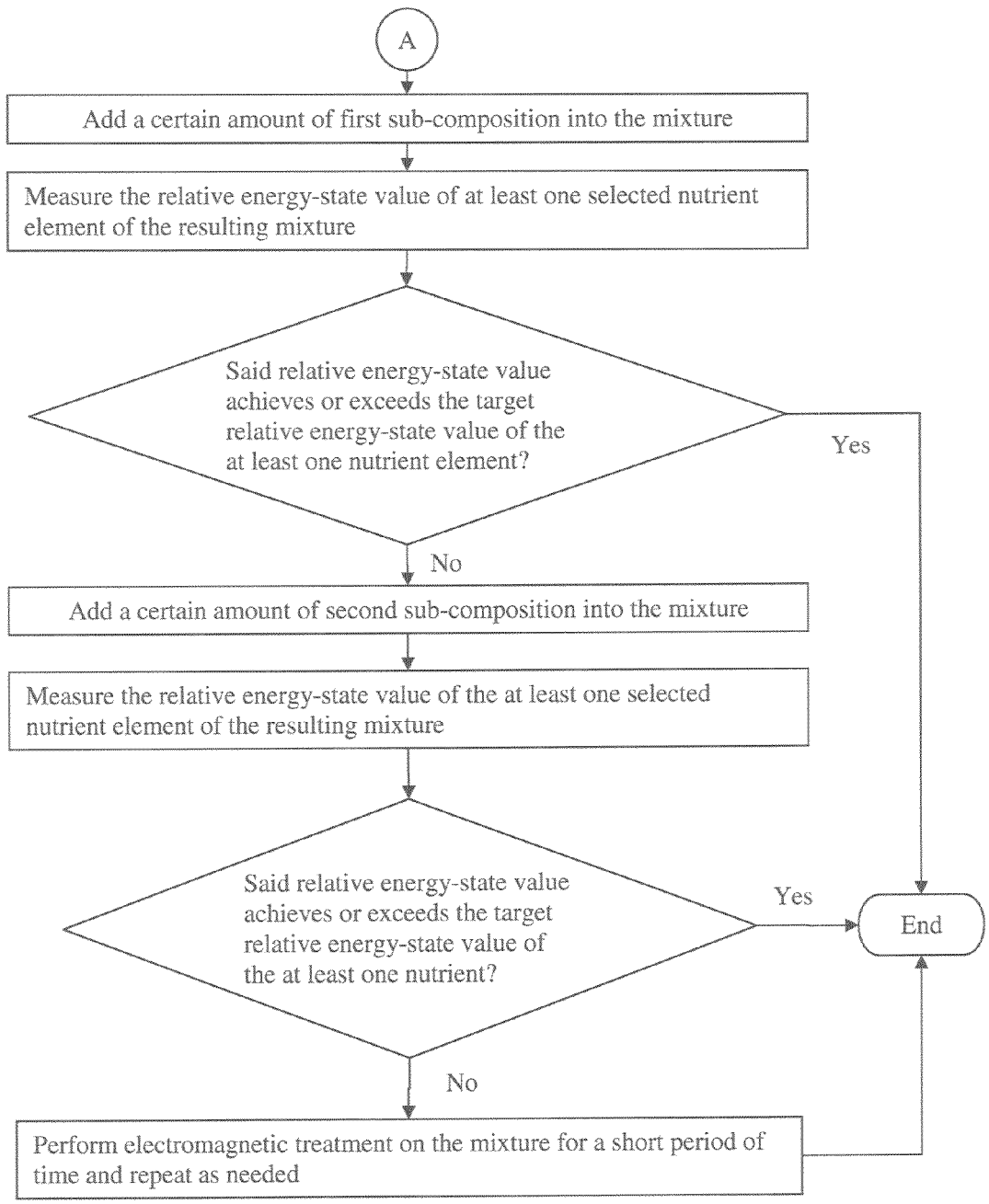

In one embodiment, as shown in FIGS. 4A and 4B, the first and second raw materials may be loaded into two containers, respectively, and electromagnetically treated, respectively, under the conditions as disclosed herein, so as to obtain the first and second sub-compositions, respectively. In some embodiments, the first raw material may be loaded into one container and electromagnetically treated so as to obtain the first sub-composition. Then the container may be emptied and the second raw material be loaded into the container and electromagnetically treated so as to obtain the second sub-composition. The first, second, and an untreated third sub-compositions may then be mixed at a certain ratio. For example, the weight percentage of the first, second, and third sub-compositions in the mixture may be 15%, 15%, and 70%, respectively, relative to the total weight of the composition. The relative energy-state value of a selected nutrient element of the mixture may be compared with a target relative energy-state value, which may be set as disclosed herein, to see whether said relative energy-state value achieves or exceeds the target relative energy-state value. If yes, it may be determined that the composition as disclosed herein, which possesses at least one of the capabilities noted herein, has been obtained, and the process ends. If no, a certain amount of first sub-composition, which may be obtained by performing electromagnetic treatment on the first raw material as disclosed herein, is added into the mixture, and the measurement and comparison are repeated as needed. If the relative energy-state value of the selected nutrient element achieves or exceeds the target relative energy-state value, it may be determined that the composition as disclosed herein, which possesses at least one of the capabilities noted herein, has been obtained, and the process ends. Otherwise, a certain amount of second sub-composition, which may be obtained by performing electromagnetic treatment on the second raw material as disclosed herein, is added into the mixture, and the measurement and comparison are conducted again. If the relative energy-state value of the selected nutrient element achieves or exceeds the target relative energy-state value, it may be determined that the composition as disclosed herein, which possesses at least one of the capabilities noted herein, has been obtained, and the process ends. Otherwise, a short period of electromagnetic treatment may be performed on the mixture for, e.g., 10 minutes, and measurements can again be taken to see if an objective as disclosed herein has been achieved.

In some embodiments, the raw material(s) may be in liquid form prepared by dissolving or suspending various ingredients in a solvent, such as water. The various ingredients may comprise, for example, agricultural grade amino acid, copper sulfate, zinc sulfate, manganese sulfate, boric acid, potassium sulfate, and 5-ALA. A mixer may be used to stir the solution while dissolving the ingredients. The mixer speed may be set at 10 r/min to 100 r/min (e.g., 50 r/min).

In some embodiments, the electromagnetic treatment may be performed while dissolving or suspending the ingredients in the solvent and stirring the solution. In some embodiments, the electromagnetic treatment may be performed after the dissolving process is finished. The electromagnetic treatment may be performed for about 10 minutes to about 1 hour (e.g., about 45 minutes). The frequency of the AC current may be changed, for example, gradually from about 25 Hz to about 10,000 Hz, such as from about 500 Hz to about 1500 Hz. The working voltage applied to the treating device may be about 5 V to about 220 V (e.g., about 10 V to about 15 V). The intensity of the AC current may be chosen from about 0.05 A to about 40 A (e.g., from about 0.06 A to about 6 A).

As described above, the relative energy-state value of a selected nutrient element may be used to determine the effectiveness of the electromagnetic treatment. In another embodiment, the relative energy-state values of a plurality of selected nutrient elements may be used to determine the effectiveness of the electromagnetic treatment. In some embodiments, the target relative energy-state values of the selected nutrient elements may be set, and the electromagnetic treatment may be repeated until the relative energy-state values of some or all of the selected nutrient elements after one treatment have been increased to achieve or exceed the respective target relative energy-state values. In other embodiments, the electromagnetic treatment may be repeated as needed until the differences between the respective relative energy-state values of some or all of the selected nutrient elements after two successive treatments are smaller than or equal to a predetermined threshold value.

In some embodiments, the electromagnetic treatment may be performed under a certain combination of conditions without determining when to stop the treatment; i.e., in other words, the treatment is simply run for a time certain without stopping to measure the effect of the treatment until the treatment is concluded. For example, the electromagnetic treatment may be performed at a working voltage of about 10 V to about 15 V, at an intensity of the AC current of about 0.06 A to about 6 A, and for a time period of about 45 minutes. During the treatment, the frequency of the AC current may be changed gradually from about 500 Hz to about 1500 Hz at an approximately constant rate of increase.

After the electromagnetic treatment, it may be determined using routine experimentation whether the composition, when applied to the target soil, improves the soil and/or plant growth in the soil. A portion of the composition may be mixed with a sample of the target soil at a selected ratio to obtain a mixture. Such ratio can also be determined by one of ordinary skill in the art using routine experimentation. For example, 2 g of the composition disclosed herein may be mixed with 10 g of the target soil to obtain a mixture; in that case, the weight ratio of the composition to the target soil in the mixture is 1:5. Further for example, the weight ratio of the composition to the target soil in the mixture may range from 1:5,000 to 1:1, such as, for example, 1:2,500, 1:1,000, 1:800, 1:500, 1:250, 1:100, 1:90, 1:80, 1:70, 1:60, 1:50, 1:40, 1:30, 1:20, 1:10, or 1:1. The energy spectrum of the mixture of soil and composition may then be measured using, for example, a spectrum analyzer, as described above, and evaluated to see if the energy spectrum of the mixture of soil and composition is more positive after treatment than the energy spectrum of the target soil before contact with the composition disclosed herein. See, e.g., FIGS. 7A and 7B and FIGS. 10A and 10B. If the energy spectrum obtained is more positive, it is more likely, based on the inventor's experience, that the treated soil will be a good candidate for improved plant growth.

In some embodiments, if the treated soil is a good candidate for improved plant growth, the composition disclosed herein may be applied, for example, in an amount measured in terms of weight of the composition to area of soil, such as, for example, kilograms of the composition per acre or per "mu" or per hectare (1 hectare is 10,000 m$^2$ or 15 mu) of soil, as further discussed below.

In some embodiments, the as-measured energy spectrum may be compared with a target energy spectrum, for example, of a standard soil, using the type of machine shown, for example, in FIGS. 10A and 10B, to see if they match with each other. "Match" as used herein means that the as-measured energy spectrum after combination of the composition and the target soil is substantially identical or similar to the target energy spectrum for the target soil or at the very least positively improved enough that at least one of the objectives disclosed herein, such as improving the soil and/or ability to improve plant growth in the treated soil, has been achieved. For example, if the as-measured energy spectrum of the treated mixture matches the target energy spectrum, e.g., if the total amount of area under the positive curves of the treated mixture is equal to or even exceeds the total amount of such area of the target energy spectrum for the target soil, it may be determined that the composition has effectively improved the target soil. One skilled in art can further refine the "match" by adjusting, through routine experimentation, the mixture weight ratio based on the measurement of the energy spectrum of the treated mixture in comparison with the energy spectrum of the target soil.

In some embodiments, the as-measured energy spectrum of the treated mixture may be compared with the energy spectrum of the target soil before mixing with the composition to see if the energy spectrum of the mixture has the same or more total amount of area under the positive curves as compared to the energy spectrum of the target soil before mixing with the composition. If yes, it may be determined that the composition has effectively improved the target soil, even if, as explained above, the two target spectra are not identical.

In other exemplary embodiments, instead of comparing the energy spectrum of the mixture with the target energy spectrum, the relative energy-state value of one or more selected nutrient element in the mixture may be measured and compared with a reference relative energy-state value to determine whether the composition should be able to improve the target soil. The reference relative energy-state value as used herein may be a relative energy-state value of the one or more selected nutrient elements in a standard soil or may be a value higher than the relative energy-state value of the one or more selected nutrient elements in a standard soil. Alternatively, in some embodiments, by observing the growth of a plant in a sample soil, effective relative energy-state values of the nutrient elements may be determined. The reference relative energy-state value may then be set based on one or more of the relative energy-state values empirically determined to be effective.

In some embodiments, instead of evaluating a relative energy-state value of one or more nutrient elements, an energy spectrum of the treated raw material may be used to determine the effectiveness of the electromagnetic treatment, and the above disclosed methods may be used. For example, in some embodiments, a target energy spectrum of the composition may be set based on the energy spectrum of a standard soil, of a target soil, of the raw material, or of the combination of any of them. Electromagnetic treatment is repeated as needed until the energy spectrum of the composition has been made as positive as or more positive, for example by measuring the total amount of area under the positive curves of the treated mixture, than the target energy spectrum, or at least enough more positive to be considered as a candidate for combination with a target soil to achieve desired improvement. In some embodiments, the electromagnetic treatment is repeated as needed until the difference of the energy spectrum of the composition after two successive treatments is smaller than or equal to a pre-determined value, similar to that discussed above with respect to the relative energy-state value.

In another aspect, the disclosure relates to a composition produced by performing an electromagnetic treatment as disclosed herein.

In some embodiments, the composition may be produced by performing an electromagnetic treatment on at least one a raw material for making the composition, using a method as disclosed herein. The at least one raw material for making the composition may comprise at least one nutrient element.

In some embodiments, the raw material may comprise at least a first raw material for a first sub-composition for making the composition and a second raw material for a second sub-composition for making the composition. The first raw material may comprise at least one organic acidic material, defined above, comprising at least one first nutrient element. The second raw material may comprise at least one photosensitive material, defined above, comprising at least one second nutrient element, the at least one photosensitive material being different from the at least one organic acidic material, wherein the at least one first and second nutrient elements can be the same or different. And the second raw material may further comprise at least one organic acidic material being different from the at least one photosensitive material.

The composition may be produced by performing an electromagnetic treatment on at least one of the first and second raw materials, i.e., chemical means for absorbing electromagnetic energy, using a method as disclosed herein, and then mixing them together.

In some embodiments, the raw material for making the composition may further comprise a third raw material for a third sub-composition for making the composition. The third raw material may comprise at least one organic base material, defined above, optionally comprising at least one third nutrient element, the at least one third nutrient-element being the same or different as the at least one first and second nutrient elements, and the at least one organic base material being different from the at least one organic acidic material and the at least one photosensitive material.

The composition may be produced by performing an electromagnetic treatment on at least one of the first, second, and third raw materials, i.e., chemical means for absorbing electromagnetic energy, using a method as disclosed herein, and then mixing them together to make the composition.

As mentioned above, the disclosure relates to a composition comprising at least one nutrient element, wherein the at least one nutrient element possesses a relative energy-state value greater than the relative energy-state value of the at least one nutrient element in a preexisting state, the greater relative energy-state value being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered in whole or in part by salted water. By "in part" or "partially" as used herein, is meant that a combination of salted water and non-salted water is used in a watering regime. For instance, salt water may be used as 10-90% of the total volume of water applied to the plants and may be applied alone or mixed with normal water in making the application.

The disclosure also relates to an improved soil produced by treating a soil with an effective amount of a composition comprising at least one nutrient element, wherein the at least one nutrient element possesses a relative energy-state value greater than the relative energy-state value of the at least one nutrient element in a preexisting state, the greater relative energy-state value being sufficient and lasting for a time effective to improve said soil, when combined with the composition, to support plant growth better than the soil, when not combined with the composition.

The disclosure also relates to an improved soil comprising at least one nutrient element, wherein the at least one nutrient element, i.e., chemical means that has absorbed electromagnetic energy, possesses a relative energy-state value sufficiently greater than the relative energy-state value of the at least one nutrient element in soil in a preexisting state and wherein that improved soil, perhaps because of the sufficiently greater relative energy-state value, has the ability to support plant growth better than said soil in said preexisting state.

The disclosure also relates to an improved plant by treating said plant with an effective amount of a composition comprising at least one nutrient element, i.e., chemical means that has absorbed electromagnetic energy, wherein the at least one nutrient element possesses a relative energy-state value greater than the relative energy-state value of the at least one nutrient element in a preexisting state, and wherein that composition, perhaps because of the sufficiently greater relative energy-state value, improves said plant treated with said composition compared to a plant not treated with said composition.

The disclosure also relates to an improved plant produced by treating said plant with an effective amount of a composition comprising at least one nutrient element, i.e., chemical means that has absorbed electromagnetic energy, wherein the composition possesses an energy spectrum more positive than the energy spectrum of the composition in a preexisting state, and wherein that composition, perhaps because of the more positive energy spectrum, improves said plant treated, with said composition compared to a plant not treated with said composition.

The disclosure also relates to an improved seed and/or improved plant product, including improved quality of plant products, produced from a plant grown in an improved soil treated with an effective amount of a composition comprising at least one nutrient element, i.e., chemical means that has absorbed electromagnetic energy, wherein the at least one nutrient element possesses a relative energy-state value greater than the relative energy-state value of the at least one nutrient element in a preexisting state, the greater relative energy-state value being sufficient and lasting for a time effective to improve said soil, when combined with the composition, to produce a plant grown therein providing an improved seed and/or improved plant product compared to that of a plant not grown in said improved soil.

The disclosure also relates to an improved seed and/or improved plant product produced from a plant treated with a composition comprising at least one nutrient element, wherein the composition possesses an energy spectrum more positive than the energy spectrum of the composition in a preexisting state, the more positive energy spectrum being sufficient to and lasting for a time sufficient to improve said composition sufficiently to produce a plant grown therein providing an improved seed and/or plant product compared to that of a plant not treated with said composition.

The disclosure also relates to a composition comprising at least one nutrient element, wherein the at least one nutrient element possesses a relative energy-state value greater than the relative energy-state value of the at least one nutrient element in a preexisting state, the greater relative energy-state value being sufficient to and lasting for a time sufficient to make the composition capable of improving a virgin soil, when combined with the composition, to support plant growth better than the virgin soil, when not combined with the composition, wherein the virgin soil, prior to being combined with the composition, is not capable of supporting plant growth. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water, in whole or in part.

The disclosure also relates to an improved virgin soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient to improve said soil, when combined with the composition, to improve plant growth relative to a virgin soil not treated with the composition.

The disclosure also relates to an improved virgin soil comprising at least one nutrient element, wherein the at least one nutrient element possesses a relative energy-state value sufficiently greater than the relative energy-state value of the at least one nutrient element in virgin soil in a preexisting state to improve plant growth better than said virgin soil in said preexisting state.

The disclosure also relates to an improved plant produced by growing said plant in an improved virgin soil treated with an effective amount of a composition comprising at least one nutrient element, i.e., chemical means that has absorbed electromagnetic energy, wherein the at least one nutrient element possesses a relative energy-state value greater than the relative energy-state value of the at least one nutrient element in a preexisting state, the greater relative energy-state value being sufficient to improve plant growth of said plant grown in said improved soil compared to that of a plant not grown in said improved virgin soil.

The disclosure also relates to an improved plant produced by growing said plant in an improved virgin soil comprising at least one nutrient element wherein the at least one nutrient element possesses a relative energy-state value sufficiently greater than the relative energy-state value of the at least one nutrient element in virgin soil in a preexisting state and lasting for a time sufficient to improve plant growth of said plant grown in said improved soil compared to that of a plant not grown in said improved virgin soil.

The disclosure also relates to an improved seed and/or improved plant product produced from a plant grown in an improved virgin soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient to and lasting for a time sufficient to produce a plant grown therein providing an improved seed and/or plant product compared to that of a plant not grown in said improved virgin soil.

The disclosure also relates to a composition comprising at least one nutrient element, wherein the at least one nutrient element possesses a relative energy-state value greater than the relative energy-state value of the at least one nutrient element in a preexisting state, the greater relative energy-state value being sufficient to make the composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water, in whole or in part.

The disclosure also relates to an improved soil chosen from sandy loam, loamy clay, clay loam, and loam treated with a composition comprising at least one nutrient element, wherein the at least one nutrient element possesses a relative energy-state value greater than the relative energy-state value of the at least one nutrient element in a preexisting state, the greater relative energy-state value being sufficient to make the composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the composition.

The disclosure also relates to an improved soil chosen from sandy loam, loamy clay, clay loam, and loam comprising at least one nutrient element, wherein the at least one nutrient element possesses a relative energy-state value sufficiently greater than the relative energy-state value of the at least one nutrient element in soil chosen from sand/loamy sand, heavy clay, clay, sandy clay, sandy clay loam, silty clay, silty clay loam, and silty loam in a preexisting state to support plant growth better than said soil chosen from sand/loamy sand, heavy clay, clay, sandy clay, sandy clay loam, silty clay, silty clay loam, and silty loam in said preexisting state.

The disclosure also relates to an improved plant produced by growing said plant in an improved soil chosen from sandy loam, loamy clay, clay loam, and loam treated with a composition comprising at least one nutrient element, wherein the at least one nutrient element possesses a relative energy-state value greater than the relative energy-state value of the at least one nutrient element in a preexisting state, the greater relative energy-state value being sufficient so that said plant grown in said improved soil is improved compared to a plant not grown in said improved soil.

The disclosure also relates to an improved plant produced by growing said plant in an improved soil chosen from sandy loam, loamy clay, clay loam, and loam comprising at least one nutrient element, wherein the at least one nutrient element possesses a relative energy-state value sufficiently greater than the relative energy-state value of the at least one nutrient element in soil chosen from sand/loamy sand, heavy clay, clay, sandy clay, sandy clay loam, silty clay, silty clay loam, and silty loam in a preexisting state so that said plant grown in said improved soil is improved compared to a plant not grown in said improved soil.

The disclosure also relates to an improved seed and/or improved plant product produced from a plant grown in an improved soil chosen from sandy loam, loamy clay, clay loam, and loam treated with a composition comprising at least one nutrient element, wherein the at least one nutrient element possesses a relative energy-state value greater than the relative energy-state value of the at least one nutrient element in a preexisting state, the greater relative energy-state value being, sufficient to make the composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the composition, and wherein the plant grown therein providing an improved seed and/or plant product compared to that of a plant not treated with, said composition.

The disclosure also relates to a composition comprising at least one nutrient element, wherein the at least one nutrient element possesses a relative energy-state value greater than the relative energy-state value of the at least one nutrient element in a preexisting state, the greater relative energy-state value being sufficient to make the composition capable of converting a soil, which is not a loam soil, into a loam soil, when the soil is combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to a composition comprising at least one nutrient element, wherein the at least one nutrient element possesses a relative energy-state value greater than the relative energy-state value of the at least one nutrient element in a preexisting state, the greater relative energy-state value being sufficient to make the composition capable of improving the ability of a soil, when combined with the composition, to be watered by salted water to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved loam soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient to convert said soil, which is not a loam soil, into a loam soil, when said soil is combined with the composition.

The disclosure also relates to an improved loam soil comprising at least one nutrient element, wherein the at least one nutrient element possesses a relative energy-state value greater than the relative energy-state value of the at least one nutrient element in a preexisting state, the greater relative energy-state value being sufficient to convert a soil, which is not a loam soil, into a loam soil, when said soil is combined with the composition.

The disclosure also relates to an improved soil produced by treating a soil with an effective amount of a composition comprising at least one nutrient element, wherein the at least one nutrient element possesses a relative energy-state value greater than the relative energy-state value of the at least one nutrient element in a preexisting state, the greater relative energy-state value being sufficient to improve said soil, when combined with the composition, to be watered in whole or in part by salted water to support plant growth, compared to said soil, when not combined with the composition.

The disclosure also relates to an improved soil comprising at least one nutrient element, wherein the at least one nutrient element possesses a relative energy-state value greater than the relative energy-state value of the at least one nutrient element in a preexisting state, the greater relative energy-state value being sufficient to improve said soil, when combined with the at least one nutrient, to be watered by salted water to support plant growth, compared to said soil, when not combined with the at least one nutrient.

The disclosure also relates to an improved plant produced by growing said plant in an improved loam soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient so that said plant grown in said improved soil is improved compared to a plant not grown in said improved soil.

The disclosure also relates to an improved plant produced by growing said plant with an improved loam soil comprising at least one nutrient element, wherein the at least one nutrient element possesses a relative energy-state value greater than the relative energy-state value of the at least one nutrient element in a preexisting state, the greater relative energy-state value being sufficient so that said plant treated with said improved soil is improved compared to a plant not grown in said improved soil.

The disclosure also relates to an improved plant produced by growing said plant in an improved soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient so that said plant treated with said improved soil and watered by salted water in whole or in part is improved compared to a plant not grown in said improved soil.

The disclosure also relates to an improved plant produced by growing said plant with an improved soil comprising at least one nutrient element, wherein the at least one nutrient element possesses a relative energy-state value greater than the relative energy-state value of the at least one nutrient element in a preexisting state, the greater relative energy-state value being sufficient so that said plant treated with improved soil and watered by salted water is improved compared to a plant not grown in said improved soil.

The disclosure also relates to an improved seed and/or improved plant product produced from a plant grown in an improved loam soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient so that the plant grown therein produces an improved seed and/or improved plant product compared to that of a plant not grown in said improved soil.

The disclosure also relates to an improved seed and/or improved plant product produced from a plant grown in an improved soil treated with an effective amount of a composition comprising at least one nutrient element, wherein the at least one nutrient element possesses a relative energy-state value greater than the relative energy-state value of the at least one nutrient element in a preexisting state, the greater relative energy-state value being sufficient so that the plant grown therein and watered by salted water in whole or in part produces an improved seed and/or plant product compared to that of a plant not grown in said improved soil.

The disclosure also relates to a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein at least one first nutrient element possesses a relative energy-state value greater than the relative energy-state value of the at least one first nutrient element in a preexisting state, the greater relative energy-state value of the at least one first nutrient element being sufficient to make the composition capable of improving a soil, when combined with the composition, to support plant growth better than the soil, when not combined with the composition.

The composition may further comprise a third sub-composition comprising at least one organic base material optionally comprising at least one third nutrient element, the at least one third nutrient element being the same as or different from the at least one first nutrient element, and the at least one organic base material being different from the at least one organic acidic material and the at least one photosensitive material. The at least one third nutrient element of the organic base material may possess a relative energy-state value greater than the relative energy-state value of the at least one third nutrient element in a preexisting state, the greater relative energy-state value of the at least one third nutrient element being sufficient, alone or in combination with the at least one first nutrient element to be capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water, in whole or in part.

The disclosure also relates to an improved soil produced by treating a soil with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein at least one first nutrient element possesses a relative energy-state value greater than the relative energy-state value of the at least one first nutrient element in a preexisting state, the greater relative energy-state value of the at least one first nutrient element being sufficient to improve a soil, when combined with the composition, to support plant growth better than the soil, when not combined with the composition.

The disclosure also relates to an improved soil comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein at least one first nutrient element possesses a relative energy-state value greater than the relative energy-state value of the at least one first nutrient element in a preexisting state, the greater relative energy-state value of the at least one first nutrient element being sufficient to make a soil, when comprising the sub-compositions, to support plant growth better than the soil, when not comprising the sub-compositions.

The disclosure also relates to an improved soil produced by treating a soil with an effective amount of a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to and lasting for a time sufficient to make the composition capable of improving said soil, when combined with the composition, to support plant growth better than the soil, when not combined with the composition.

The disclosure also relates to an improved soil comprising a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to and lasting for a time sufficient to make the composition capable of improving said soil, when combined with the composition, to support plant growth better than the soil, when not combined with the composition.

The disclosure also relates to an improved plant produced by growing said plant in an improved soil treated with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein at least one first nutrient element possesses a relative energy-state value greater than the relative energy-state value of the at least one first nutrient element in a preexisting state, the greater relative energy-state value of the at least one first nutrient element being sufficient so that said plant grown in said improved soil and watered by salted water in whole or in part is improved compared to a plant not grown in said improved soil.

The disclosure also relates to an improved plant produced by treating said plant with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein at least one first nutrient element possesses a relative energy-state value greater than the relative energy-state value of the at least one first nutrient element in a preexisting state, the greater relative energy-state value of the at least one first nutrient element being sufficient so that said plant treated with said composition is improved compared to a plant not treated with said composition.

The disclosure also relates to an improved seed and/or improved plant product produced from a plant treated with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein at least one first nutrient element possesses a relative energy-state value greater than the relative energy-state value of the at least one first nutrient element in a preexisting state, the greater relative energy-state value of the at least one first nutrient element being sufficient and lasting for a time sufficient so that the treated plant produces an improved seed and/or improved plant product compared to that of a plant not grown in said improved soil.

The disclosure also relates to an improved seed and/or improved plant product produced from a plant grown in an improved soil comprising a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient and lasting for a time sufficient so that the treated plant produces an improved seed and/or improved plant product compared to that of a plant not grown in said improved soil.

The disclosure also relates to an improved seed and/or improved plant product produced from a plant treated with a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient and lasting for a time sufficient so that the treated plant produces an improved seed and/or improved plant product compared to that of a plant not so treated.

The disclosure also relates to a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to make the composition capable of improving a soil, when combined with the composition, to support plant growth better than the soil, when not combined with the composition.

The composition may further comprise a third sub-composition comprising at least one organic base material optionally comprising at least one third nutrient element, the at least one third nutrient element being the same as or different from the at least one first and second nutrient elements, and the at least one organic base material being different from the at least one organic acidic material and the at least one photosensitive material. The at least one third nutrient element of the organic base material may possess a relative energy-state value greater than the relative energy-state value of the at least one third nutrient element in a preexisting state, the greater relative energy-state value of the at least one third nutrient element being sufficient, alone or in combination with the at least one of the first and second nutrient elements, to be capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water, in whole or in part.

The disclosure also relates to a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient to make the composition capable of improving the ability of a soil, when combined with the composition, to be watered by salted water in whole or in part to support plant growth, compared to the soil, when not combined with the composition.

The composition may further comprise a third sub-composition comprising at least one organic base material optionally comprising at least one third nutrient element, the at least one third nutrient element being the same or different as the at least one first nutrient element, and the at least one organic base material being different from the at least one organic acidic material and the at least one photosensitive material. The at least one third nutrient element of the organic base material possesses a relative energy-state value greater than the relative energy-state value of the at least one third nutrient element in a preexisting state, the greater relative energy-state value of the at least one third nutrient element being sufficient, alone or in combination with the at least one of the first and second nutrient elements, to be capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to improve said soil, when combined with the composition, to support plant growth better than said soil, when not combined with the composition.

The disclosure also relates to an improved soil comprising a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to make the composition capable of improving said soil, when combined with the composition, to support plant growth better than said soil, when not combined with the composition.

The disclosure also relates to an improved soil produced by treating a soil with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient to improve soil, when combined with the composition, to be watered by salted water in whole or in part to support plant growth, compared to said soil, when not combined with the composition.

The disclosure also relates to an improved soil comprising a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient to make the composition capable of improving the ability of said soil, when combined with the composition, to be watered by salted water in whole or in part to support plant growth, compared to said soil, when not combined with the composition.

The disclosure also relates to an improved plant produced by growing said plant in an improved soil treated with an effective amount of composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient so that said plant grown in said improved soil is improved compared to a plant not grown in said improved soil.

The disclosure also relates to an improved plant produced by treating said plant with a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient so that said plant grown treated with said composition is improved compared to a plant not treated with said composition.

The disclosure also relates to an improved plant produced by growing said plant in an improved soil treated with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient so that said plant grown in said improved soil is improved compared to a plant not grown in said improved soil.

The disclosure also relates to an improved plant produced by treating said plant with a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient so that said plant treated with said composition is improved compared to a plant not treated with said composition.

The disclosure also relates to an improved seed and/or improved plant product produced from a plant grown in an improved soil treated with an effective amount of composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient so that the plant grown in said improved soil produces an improved seed and/or improved plant product compared to that of a plant not grown in said improved soil.

The disclosure also relates to an improved seed and/or improved plant product produced from a plant treated with an effective amount of composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient so that the treated plant produces improved seed and/or improved plant product compared to that of a plant not resulting from said treatment.

The disclosure also relates to an improved seed and/or improved plant product produced from a plant grown in an improved soil treated with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient so that the plant grown in said improved soil and watered by salted water produces an improved seed and/or improved plant product compared to that of a plant not grown in said improved soil.

The disclosure also relates to an improved seed and/or improved plant product produced from a plant treated with an effective amount of a composition comprising a first sub-composition comprising at least one organic acidic material and a second sub-composition comprising at least one photosensitive material, wherein at least one of the first sub-composition and the second sub-composition comprises at least one first nutrient element, wherein the at least one photosensitive material is different from the at least one organic acidic material, and further wherein the at least one first nutrient element possesses a relative energy-state value greater than the relative energy-state value of the at least one first nutrient element in a preexisting state, the greater relative energy-state value of the at least one first nutrient element being sufficient so that the plant treated with said composition and watered by salted water in whole or part produces an improved seed and/or improved plant product compared to that of a plant not so treated.

The disclosure also relates to a composition comprising a first sub-composition comprising at least one organic acidic material comprising at least one first nutrient element, and a second sub-composition comprising at least one photosensitive material comprising at least one second nutrient element, wherein the at least one photosensitive material is different from the at least one organic acidic material, further wherein the at least one first and second nutrient elements can be the same or different, and even further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to make the composition capable of improving the ability of a soil, when combined with the composition, to be watered by salted water in whole or in part to support plant growth, compared to the soil, when not combined with the composition.

The composition may further comprise a third sub-composition comprising at least one organic base material optionally comprising at least one third nutrient element, the at least one third nutrient element being the same or different as the at least one first and second nutrient elements, and the at least one organic base material being different from the at least one organic acidic material and the at least one photosensitive material. The at least one third nutrient element of the organic base material possesses a relative energy-state value greater than the relative energy-state value of the at least one third nutrient element in a preexisting state, the greater relative energy-state value of the at least one third nutrient element being sufficient, alone or in combination with the at least one of the first and second nutrient elements, to be capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising at least one photosensitive material comprising at least one nutrient element, wherein the at least one nutrient element has a relative energy-state value greater than the relative energy-state value of the at least one nutrient element in a preexisting state, the greater relative energy-state value being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water.

The disclosure also relates to an improved soil produced by treating a soil with an effective amount of a composition comprising a first sub-composition comprising at least one organic acidic material comprising at least one first nutrient element, and a second sub-composition comprising at least one photosensitive material comprising at least one second nutrient element, wherein the at least one photosensitive material is different from the at least one organic acidic material, further wherein the at least one first and second nutrient elements can be the same or different, and even further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to and lasting for a time sufficient to improve said soil, when combined with the composition, to be watered by salted water in whole or in part to support plant growth, compared to said soil, when not combined with the composition.

The disclosure also relates to an improved soil comprising a composition comprising a first sub-composition comprising at least one organic acidic material comprising at least one first nutrient element, and a second sub-composition comprising at least one photosensitive material comprising at least one second nutrient element, wherein the at least one photosensitive material is different from the at least one organic acidic material, further wherein the at least one first and second nutrient elements can be the same or different, and even further wherein at least one of the first and second nutrient elements possesses a relative energy-state value greater than the relative energy-state value of the at least one of the first and second nutrient elements in a preexisting state, the greater relative energy-state value of the at least one of the first and second nutrient elements being sufficient to make the composition capable of improving the ability of said soil, when combined with the composition, to be watered by salted water in whole or in part to support plant growth, compared to said soil, when not combined with the composition.

The disclosure also relates to an improved soil produced by treating a soil with an effective amount of a composition comprising at least one photosensitive material comprising at least one nutrient element, wherein the at least one nutrient element has a relative energy-state value greater than the relative energy-state value of the at least one nutrient element in a preexisting state, the greater relative energy-state value being sufficient to improve said soil, when combined with the composition, to support plant growth better than said soil, when not combined with the composition.

The disclosure also relates to an improved soil comprising a composition comprising at least one photosensitive material comprising at least one nutrient element, wherein the at least one nutrient element has a relative energy-state value greater than the relative energy-state value of the at least one nutrient element in a preexisting state, the greater relative energy-state value being sufficient to make the composition capable of improving said soil, when combined with the composition, to support plant growth better than said soil, when not combined with the composition.

The disclosure also relates to an improved soil comprising at least one nutrient element having a relative energy-state value greater than the relative energy-state value of the at least one nutrient element in a preexisting state, the greater relative energy-state value being sufficient to improve said soil to support plant growth better than said soil not possessing said greater relative energy-state value.

The disclosure also relates to an improved soil having a higher energy than the energy in a preexisting soil state, the higher energy being sufficient so that said improved soil supports plant growth better than said soil not possessing said higher energy. For example, the higher energy can result from treating the soil with the compositions, i.e., chemical means that have absorbed energy, disclosed herein. The higher energy can, for example, be measured in terms of a higher relative energy-state value of a nutrient or an energy spectrum of the soil that is more positive, as disclosed herein.

The disclosure also relates to a composition comprising at least one photosensitive material comprising at least one nutrient element, wherein the at least one nutrient element has a relative energy-state value greater than the relative energy-state value of the at least one nutrient element in a preexisting state, the greater relative energy-state value being sufficient to make the composition capable of improving the ability of a soil, when combined with the composition, to be watered by salted water in whole or in part to support plant growth, compared to said soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising at least one organic acidic material comprising at least one nutrient element, wherein the at least one nutrient element has a relative energy-state value greater than the relative energy-state value of the at least one nutrient element in a preexisting state, the greater relative energy-state value being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising at least one photosensitive material comprising at least one nutrient element, wherein the at least one nutrient element has a relative energy-state value greater than the relative energy-state value of the at least one nutrient element in a preexisting state, the greater relative energy-state value being sufficient to improve the ability of said soil, when combined with the composition, to be watered by salted water in whole or in part to support plant growth, compared to a soil, when not combined with the composition.

The disclosure also relates to an improved soil comprising at least one photosensitive material comprising at least one nutrient element, wherein the at least one nutrient element has a relative energy-state value greater than the relative energy-state value of the at least one nutrient element in a preexisting state, the greater relative energy-state value improving the ability of said soil to be watered by salted water to support plant growth, compared to said soil not containing the at least one photosensitive material comprising at least one nutrient element, wherein the at least one nutrient element has a relative energy-state value greater than the relative energy-state value of the at least one nutrient element in a preexisting state.

The disclosure also relates to an improved soil produced by treating a soil with an effective amount of a composition comprising at least one organic acidic material comprising at least one nutrient element, wherein the at least one nutrient element has a relative energy-state value greater than the relative energy-state value of the at least one nutrient element in a preexisting state, the greater relative energy-state value being sufficient to improve said treated soil to support plant growth better than said soil, when not so treated.

The disclosure also relates to an improved soil comprising at least one organic acidic material comprising at least one nutrient element, wherein the at least one nutrient element has a relative energy-state value greater than the relative energy-state value of the at least one nutrient element in a preexisting state, the greater relative energy-state value being sufficient to improve said soil to support plant growth better than said soil, when not containing said at least one organic acidic material comprising at least one nutrient element, wherein the at least one nutrient element has a relative energy-state value greater than the relative energy-state value of the at least one nutrient element in a preexisting state.

The disclosure also relates to an improved soil produced, for example, by treating a soil with a composition disclosed herein, to an improved soil comprising a composition disclosed herein or comprising an altered form of a composition disclosed herein, to improved plants grown in an improved soil disclosed herein or treated with a composition disclosed herein, and to improved seeds and/or improved plant products produced, for example, from plants grown in an improved soil disclosed herein or treated with a composition disclosed herein. And the soil may be improved sufficiently that plants grown therein can be watered by salted water in whole or in part.

The disclosure also relates to a composition comprising at least one organic acidic material comprising at least one nutrient element, wherein the at least one nutrient element has a relative energy-state value greater than the relative energy-state value of the at least one nutrient element in a preexisting state, the greater relative energy-state value being sufficient to make the composition capable of improving the ability of a soil, when combined with the composition, to be watered by salted water in whole or in part to support plant growth, compared to said soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-amino levulinic acid ("5-ALA"), which is commercially available from Beijing Yushenghong Chemical Company, Ltd., China, relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving a soil, when combined with the composition, to support plant growth better than said soil, when not combined with the composition. The disclosure also relates to an improved soil produced, for example, by treating a soil with such a composition and to improved plants and/or improved seeds produced, for example, by being grown in such improved soil or treated with such a composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

For example, the disclosure also relates to an improved soil produced by treating a soil with an effective amount of a composition comprising at least one organic acidic material comprising at least one nutrient element, wherein the at least one nutrient element has a relative energy-state value greater than the relative energy-state value of the at least one nutrient element in a preexisting state, the greater relative energy-state value being sufficient to improve said soil, when combined with the composition, to be watered by salted water in whole or in part to support plant growth, compared to said soil, when not combined with the composition.

As a further example, the disclosure also relates to an improved soil comprising at least one organic acidic material comprising at least one nutrient element, wherein the at least one nutrient element has a relative energy-state value greater than the relative energy-state value of the at least one nutrient element in a preexisting state, the greater relative energy-state value improving the ability of said soil, when combined with the composition, to be watered by salted water to support plant growth, compared to said soil not containing the at least one organic acidic material comprising at least one nutrient element, wherein the at least one nutrient element has a relative energy-state value greater than the relative energy-state value of the at least one nutrient element in a preexisting state.

As yet a further example, the disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to support plant growth better than said soil, when not combined with the composition.

The disclosure also relates to an improved soil comprising at least one nutrient element, and straw powders, phosphate rock particles, agricultural grade amino acids, corn or potato starch, manganese sulfate, zinc sulfate, copper sulfate, and ferrous sulfate, and 5-ALA and wherein the at least one nutrient element possesses a relative energy-state value greater than the relative energy-state value of the at least one nutrient element in a preexisting state, the greater relative energy-state value of the at least one nutrient element being sufficient to and lasting for a time sufficient to improve said soil to support plant growth better than said soil, when not comprising the at least one nutrient element possessing a relative energy-state value greater than the relative energy-state value of the at least one nutrient element in a preexisting state.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first; second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving a soil, when combined with the composition, to support plant growth better than said soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to be watered by salted water in whole or in part to support plant growth, compared to said soil, when not combined with the composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to support plant growth better than said soil, when not combined with the composition.

The disclosure also relates to an improved plant produced by treating said plant with an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of said soil, when combined with the composition, to produce said improved plant capable of being watered with salted water in whole or in part, compared to a plant, when not so produced.

The disclosure also relates to an improved plant produced by treating said plant with an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve the ability of said soil, when combined with the composition, to produce said improved plant capable of being watered with salted water in whole or in part, compared to a plant, when not so produced.

The disclosure also relates to an improved plant produced by growing said plant in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to produce said improved plant, compared to a plant, when not so produced.

The disclosure also relates to an improved plant produced by growing said plant in an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to produce said improved plant, compared to a plant, when not so produced.

The disclosure also relates to an improved seed and/or improved plant product produced from a plant grown in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate; and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the treated plant is capable of being watered with salted water and produces an improved seed and/or improved plant product compared to a seed and/or plant product, when not so produced.

The disclosure also relates to an improved seed and/or improved plant product produced from a plant grown in an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA relative to the total weight of the second sub-composition, and the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the treated plant is capable of being watered with salted water and produces an improved seed and/or improved plant product compared to a seed and/or plant product, when not so produced.

The disclosure also relates to an improved seed and/or improved plant product produced from a plant grown in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the treated plant produces an improved seed and/or improved plant product compared to a seed and/or plant product, when not so produced.

The disclosure also relates to an improved seed and/or improved plant product produced from a plant grown in an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the treated plant produces an improved seed and/or improved plant product compared to a seed and/or plant product, when not so produced.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to be watered by salted water in whole or in part to support plant growth, compared to said soil, when not combined with the composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to support plant growth better than the soil, when not combined with the composition.

The disclosure also relates to an improved plant produced by growing said plant in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said plant grown in said improved soil and watered by salted water in whole or in part compared to a plant not grown in said improved soil.

The disclosure also relates to an improved plant produced by growing said plant in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said plant grown in said improved soil compared to a plant not grown in said improved soil.

The disclosure also relates to an improved seed and/or improved plant product produced from a plant grown in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the plant grown produces an improved seed and/or improved plant product compared to a seed and/or plant product, when not so produced.

The disclosure also relates to an improved seed and/or improved plant product produced from a plant grown in an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the plant grown produces an improved seed and/or improved plant product compared to a seed and/or plant product, when not so produced.

The disclosure also relates to an improved seed and/or improved plant product produced from a plant grown in an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient so that the plant grown produces an improved seed and/or improved plant product compared to a seed and/or plant product, when not so produced.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

For example, the disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil to be watered by salted water in whole or in part to support plant growth, compared to the soil not so treated.

As a further example, the disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil to support plant growth better than soil not so treated.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient, elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to be watered by salted water in whole or in part to support plant growth, compared to said soil, when not combined with the composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to support plant growth better than said soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to be watered by salted water in whole or in part to support plant growth, compared to said soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of said soil, when combined with the composition, to be watered by salted water in whole or in part to support plant growth, compared to said soil, when not combined with the composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient and lasting for a time sufficient to improve said soil, when combined with the composition, to support plant growth better than said soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to make the composition capable of improving the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the greater relative energy-state value of the at least one of the first, second, and third nutrient elements, alone or in combination, being sufficient to improve said soil, when combined with the composition, to be watered by salted water in whole or in part to support plant growth, compared to said soil, when not combined with the composition.

The disclosure also relates to a composition comprising at least one nutrient element, wherein the composition possesses an energy spectrum more positive than the energy spectrum of the composition in a preexisting state, the more positive energy spectrum being sufficient to make the composition capable of improving a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with a composition comprising at least one nutrient element, wherein the composition possesses an energy spectrum more positive than the energy spectrum of the composition in a preexisting state, the composition being effective to improve said soil to support plant growth better than said soil, when not combined with the composition.

The disclosure also relates to an improved soil comprising at least one nutrient element, wherein the soil possesses an energy spectrum more positive than the energy spectrum of the soil in a preexisting state, and wherein the soil supports plant growth better than said soil in a preexisting state.

The disclosure also relates to a composition comprising at least one nutrient element, wherein the composition possesses an energy spectrum more positive than the energy spectrum of the composition in a preexisting state, the more positive energy spectrum being sufficient to and lasting for a sufficient time to make the composition capable of improving a virgin soil, when combined with the composition, to support plant growth better than the virgin soil, when not combined with the composition, wherein the virgin soil, prior to being combined with the composition, is not capable of supporting plant growth. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved virgin soil treated with a composition comprising at least one nutrient element, wherein the composition possesses an energy spectrum more positive than the energy spectrum of the composition in a preexisting state, the more positive energy spectrum being sufficient to and lasting for a time sufficient to make the composition capable of improving a virgin soil, when combined with the composition, to support plant growth better than the virgin soil, when not combined with the composition, wherein the virgin soil, prior to being combined with the composition, is not capable of supporting plant growth.

The disclosure also relates to an improved virgin soil comprising a composition comprising at least one nutrient element, wherein the composition possesses an energy spectrum more positive than the energy spectrum of the composition in a preexisting state, the more positive energy spectrum being sufficient to improve the virgin soil to support plant growth better than the virgin soil, when not combined with the composition, wherein the virgin soil, prior to being combined with the composition, is not capable of supporting plant growth.

The disclosure also relates to a composition comprising at least one nutrient element, wherein the composition possesses an energy spectrum more positive than the energy spectrum of the composition in a preexisting state, the more positive energy spectrum being sufficient to make the composition capable of converting a soil chosen from sand/loamy sand, heavy clay, clay; sandy clay, sandy clay loam, silty clay, silty clay loam, and silty loam, into an improved soil chosen from sandy loam, loamy clay, clay loam, and loam, when the soil is combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising at least one nutrient element, wherein the composition possesses an energy spectrum more positive than the energy spectrum of the composition in a preexisting state, the more positive energy spectrum being sufficient to make the composition capable of converting a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the composition.

The disclosure also relates to an improved soil comprising at least one nutrient element, wherein the composition possesses an energy spectrum more positive than the energy spectrum of the composition in a preexisting state, the composition being effective to convert a soil chosen from sand/loamy sand, heavy clay, clay, sandy clay, sandy clay loam, silty clay, silty clay loam, and silty loam, into an improved soil chosen from sandy loam, loamy clay, clay loam, and loam, when the soil is combined with the composition.

The disclosure also relates to a composition comprising at least one nutrient element, wherein the composition possesses an energy spectrum more positive than the energy spectrum of the composition in a preexisting state, the composition being effective, perhaps, without being bound by theory, because of it more positive energy spectrum, to convert a soil, which is not a loam soil, into a loam soil, when the soil is combined with the composition. The disclosure also relates to a loam soil produced, for example, by treating a soil which is not a loam soil with such a composition and to improved plants and/or improved seeds produced, for example, by being grown in such loam soil or treated with such a composition. And the loam soil may be improved sufficiently that plants grown therein can be watered by salted water in whole or in part.

The disclosure also relates to an improved soil produced by treating a soil with an effective amount of a composition comprising at least one nutrient element, wherein the composition possesses an energy spectrum more positive than the energy spectrum of the composition in a preexisting state, and the composition converts the soil, which is not a loam soil, into a loam soil.

The disclosure also relates to an improved soil possessing an energy spectrum more positive than the energy spectrum of the soil in a preexisting state, the more positive energy spectrum being sufficient to make the improved soil a loam soil whereas the soil in the preexisting state is not a loam soil.

The disclosure also relates to a composition comprising at least one nutrient element, wherein the composition possesses an energy spectrum more positive than the energy spectrum of the composition in a preexisting state, the composition being effective, perhaps, without being bound by theory, because of its more positive energy spectrum, to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising at least one nutrient element, wherein the composition possesses an energy spectrum more positive than the energy spectrum of the composition in a preexisting state, the more positive energy spectrum being sufficient to improve the soil to be watered by salted water in whole or in part to support plant growth compared to the soil not so treated.

The disclosure also relates to an improved soil comprising a composition comprising at least one nutrient element, wherein the composition possesses an energy spectrum more positive than the energy spectrum of the composition in a preexisting state, the composition being effective, perhaps, without being bound by theory, because of the positive energy spectrum, to improve the ability of a soil, when combined with the composition, to be watered by salted water in whole or in part to support plant growth, compared to the soil, when not combined with the composition.

The disclosure also relates to a composition comprising a first sub-composition comprising at least one organic acidic material and a second sub-composition comprising at least one photosensitive material, wherein at least one of the first sub-composition and the second sub-composition comprises at least one first nutrient element, the at least one photosensitive material being different from the at least one organic acidic material, and further wherein the composition possesses an energy spectrum more positive than the energy spectrum of the composition in a preexisting state, the composition being effective, perhaps, without being bound by theory, because of its more positive energy spectrum, to improve the ability of a soil, when combined with the composition, to support plant growth better than the soil, when not combined with the composition. The composition may further comprise a third sub-composition comprising at least one organic base material optionally comprising at least one third nutrient element, the at least one third nutrient element being the same or different as the at least one first nutrient element, and the at least one organic base material being different from the at least one organic acidic material and the at least one photosensitive material. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising a first sub-composition comprising at least one organic acidic material and a second sub-composition comprising at least one photosensitive material, wherein at least one of the first sub-composition and the second sub-composition comprises at least one first nutrient element, the at least one photosensitive material being different from the at least one organic acidic material, and further wherein the composition possesses an energy spectrum more positive than the energy spectrum of the composition in a preexisting state, the composition being effective, perhaps, without being bound by theory, because of its more positive energy spectrum, to improve a soil, when combined with the composition, to support plant growth better than the soil, when not combined with the composition. The composition may further comprise a third sub-composition comprising at least one organic base material optionally comprising at least one third nutrient element, the at least one third nutrient element being the same or different as the at least one first nutrient element, and the at least one organic base material being different from the at least one organic acidic material and the at least one photosensitive material.

The disclosure also relates to a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein the composition possesses an energy spectrum more positive than the energy spectrum of the composition in a preexisting state, the composition, perhaps because of its more positive energy spectrum, being effective to improve a soil, when combined with the composition, to support plant growth better than the soil, when not combined with the composition. The composition may further comprise a third sub-composition comprising at least one organic base material optionally comprising at least one third nutrient element, the at least one third nutrient element being the same or different as the at least one first and second nutrient elements, and the at least one organic base material being different from the at least one organic acidic material and the at least one photosensitive material. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein the composition possesses an energy spectrum more positive than the energy spectrum of the composition in a preexisting state, the composition, perhaps because of its more positive energy spectrum, being effective to improve a soil, when combined with the composition, to support plant growth better than the soil, when not combined with the composition. The composition may further comprise a third sub-composition comprising at least one organic base material optionally comprising at least one third nutrient element, the at least one third nutrient element being the same or different as the at least one first and second nutrient elements, and the at least one organic base material being different from the at least one organic acidic material and the at least one photosensitive material.

The disclosure also relates to an improved soil comprising a composition comprising a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein the composition possesses an energy spectrum more positive than the energy spectrum of the composition in a preexisting state, the composition, perhaps because of its more positive energy spectrum, being effective to improve a soil, when combined with the composition, to support plant growth better than the soil, when not combined with the composition. The composition may further comprise a third sub-composition comprising at least one organic base material optionally comprising at least one third nutrient element, the at least one third nutrient element being the same or different as the at least one first and second nutrient elements, and the at least one organic base material being different from the at least one organic acidic material and the at least one photosensitive material.

The disclosure also relates to a composition comprising a first sub-composition comprising at least one organic acidic material, and a second sub-composition comprising at least one photosensitive material, wherein at least one of the first sub-composition and the second sub-composition comprises at least one first nutrient element, wherein the at least one photosensitive material is different from the at least one organic acidic material, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The composition may further comprise a third sub-composition comprising at least one organic base material optionally comprising at least one third nutrient element, the at least one third nutrient element being the same or different as the at least one first nutrient elements, and the at least one organic base material being different from the at least one organic acidic material and the at least one photosensitive material.

The disclosure also relates to an improved soil produced by treating a soil with an effective amount of a composition comprising a first sub-composition comprising at least one organic acidic material, and a second sub-composition comprising at least one photosensitive material, wherein at least one of the first sub-composition and the second sub-composition comprises at least one first nutrient element, wherein the at least one photosensitive material is different from the at least one organic acidic material, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water to support plant growth, compared to the soil, when not combined with the composition.

The disclosure also relates to an improved soil comprising a composition comprising a first sub-composition comprising at least one organic acidic material, and a second sub-composition comprising at least one photosensitive material, wherein at least one of the first sub-composition and the second sub-composition comprises at least one first nutrient element, wherein the at least one photosensitive material is different from the at least one organic acidic material, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water to support plant growth, compared to the soil, when not combined with the composition.

The disclosure also relates to a composition comprising a first sub-composition comprising at least one organic acidic material comprising at least one first nutrient element, and a second sub-composition comprising at least one photosensitive material comprising at least one second nutrient element, wherein the at least one photosensitive material is different from the at least one organic acidic material, further wherein the at least one first and second nutrient elements can be the same or different, and even further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The composition may further comprise a third sub-composition comprising at least one organic base material optionally comprising at least one third nutrient element, the at least one third nutrient element being the same or different as the at least one first and second nutrient elements, and the at least one organic base material being different from the at least one organic acidic material and the at least one photosensitive material.

The disclosure also relates to an improved soil produced by treating a soil with an effective amount of a composition comprising a first sub-composition comprising at least one organic acidic material comprising at least one first nutrient element, and a second sub-composition comprising at least one photosensitive material comprising at least one second nutrient element, wherein the at least one photosensitive material is different from the at least one organic acidic material, further wherein the at least one first and second nutrient elements can be the same or different, and even further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising a first sub-composition comprising at least one organic acidic material comprising at least one first nutrient element, and a second sub-composition comprising at least one photosensitive material comprising at least one second nutrient element, wherein the at least one photosensitive material is different from the at least one organic acidic material, further wherein the at least one first and second nutrient elements can be the same or different, and even further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to a composition comprising at least one photosensitive material comprising at least one nutrient element, wherein the composition possesses an energy spectrum more positive than the energy spectrum of the composition in a preexisting state, the composition, perhaps because of its more positive energy spectrum, being effective to improve a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising at least one photosensitive material comprising at least one nutrient element, wherein the composition possesses an energy spectrum more positive than the energy spectrum of the composition in a preexisting state, the composition, perhaps because of its more positive energy spectrum, being effective to improve the soil, when combined with the composition, to support plant growth better than the soil, when not combined with the composition.

The disclosure also relates to an improved soil comprising a composition comprising at least one photosensitive material comprising at least one nutrient element, wherein the composition possesses an energy spectrum more positive than the energy spectrum of the composition in a preexisting state, the composition, perhaps because of its more positive energy spectrum, being effective to improve the soil, when combined with the composition, to support plant growth better than the soil, when not combined with the composition.

The disclosure also relates to a composition comprising at least one photosensitive material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising at least one photosensitive material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising at least one photosensitive material comprising at least one nutrient element, wherein the composition possesses an energy spectrum more positive than the energy spectrum of the composition in a preexisting state, the composition; perhaps because of its more positive energy spectrum, being effective to improve the ability of a soil, when combined with the composition, to be watered by salted water to support plant growth, compared to the soil, when not combined with the composition.

The disclosure also relates to a composition comprising at least one organic acidic material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising at least one organic acidic material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to an improved soil comprising a composition comprising at least one organic acidic material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising at least one organic acidic material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising at least one organic acidic material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising at least one organic acidic material comprising at least one nutrient element, wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA by weight relative to the total weight of the second sub-composition, and the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA by weight relative to the total weight of the second sub-composition, and the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate; about 1% of zinc sulfate, about 0.5% of copper sulfate, and about 1% of ferrous sulfate, by weight relative to the total weight of the second sub-composition and the second sub-composition further comprises about 1.5 ppm of 5-ALA by weight relative to the total weight of the second sub-composition, and the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA by weight relative to the total weight of the second sub-composition, and the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA by weight relative to the total weight of the second sub-composition, and the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA by weight relative to the total weight of the second sub-composition, and the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 1.5 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 15% of agricultural grade amino acids, about 5% of corn or potato starch, about 5% of water absorbent, about 1% of manganese sulfate, about 1% of zinc sulfate, about 1% of copper sulfate, about 1.5% of ferrous sulfate, about 0.1% of ammonium molybdate, and about 0.4% of borax, by weight relative to the total weight of the first sub-composition, wherein the second sub-composition comprises about 60% of straw powders, about 8% of phosphate rock particles, about 15% of agricultural grade amino acids, about 6% of corn or potato starch, about 5% of water absorbent, about 1% of manganese sulfate, about 1% of zinc sulfate, about 1% of copper sulfate, about 2% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water to support plant growth, compared to the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil treated with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 12% of phosphate rock particles, about 15% of agricultural grade amino acids, about 6% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 57% of straw powders, about 13% of phosphate rock particles, about 16% of agricultural grade amino acids, about 7% of corn or potato starch, about 1.5% of manganese sulfate, about 1.5% of zinc sulfate, about 1% of copper sulfate, about 2% of ferrous sulfate, and about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate; about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate by weight relative to the total weight of the second sub-composition, and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate by weight relative to the total weight of the second sub-composition, and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate by weight relative to the total weight of the second sub-composition, and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate by weight relative to the total weight of the second sub-composition, and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate by weight relative to the total weight of the second sub-composition, and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not, combined with the composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 8% of phosphate rock particles, about 15% of agricultural grade amino acids, about 5% of fatty acids, about 5% of corn or potato starch, about 1.5% of manganese sulfate, about 1.5% of zinc sulfate, about 1% of copper sulfate, about 2% of ferrous sulfate, about 0.2% of ammonium molybdate, and about 0.8% of borax, by weight relative to the total weight of the first sub-composition, wherein the second sub-composition comprises about 60% of straw powders, about 9% of phosphate rock particles, about 15% of agricultural grade amino acids, about 5% of fatty acids, about 6% of corn or potato starch, about 1% of manganese sulfate, about 1% of zinc sulfate, about 1% of copper sulfate, and about 2% of ferrous sulfate by weight relative to the total weight of the second sub-composition, and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water to support plant growth, compared to the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax by weight relative to the total weight of first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax by weight relative to the total weight of first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax by weight relative to the total weight of first sub-composition, wherein the second sub-composition comprises about 60% of straw powders, about 17% of phosphate rock particles, about 8% of agricultural grade amino acids, about 7% of corn or potato starch, about 1.5% of manganese sulfate, about 1.5% of zinc sulfate, about 1% of copper sulfate, about 3% of ferrous sulfate, about 0.2% of ammonium molybdate, and about 0.8% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition. And the soil may be improved sufficiently that plants grown therein can be watered by salted water in whole or in part.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a more positive energy spectrum being sufficient to make the composition capable of improving a soil, when combined with the composition, to support plant growth better than the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to support plant growth better than the soil, when not combined with the composition.

The disclosure also relates to a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition. The disclosure also relates to an improved soil produced, for example, by treating a soil with such a composition, to an improved soil comprising such a composition or comprising an altered form of such a composition, to improved plants grown in such improved soil or treated with such a composition, and to improved seeds and/or improved plant products produced, for example, from plants grown in such improved soil or treated with such a composition.

The disclosure also relates to an improved soil produced by treating a soil with an effective amount of a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

The disclosure also relates to an improved soil comprising a composition comprising about 15% of a first sub-composition comprising at least one first nutrient element, about 15% of a second sub-composition comprising at least one second nutrient element, and about 70% of a third sub-composition optionally comprising at least one third nutrient element, by weight relative to the total weight of the composition, wherein the first sub-composition comprises about 60% of straw powders, about 10% of phosphate rock particles, about 17% of agricultural grade amino acids, about 6% of corn or potato starch, about 1.5% of manganese sulfate, about 1.5% of zinc sulfate, about 1% of copper sulfate, about 2% of ferrous sulfate, about 0.5% of ammonium molybdate, and about 0.5% of borax, by weight relative to the total weight of the first sub-composition, wherein the second sub-composition comprises about 60% of straw powders, about 13% of phosphate rock particles, about 15% of agricultural grade amino acids, about 6% of corn or potato starch, about 1% of manganese sulfate, about 1% of zinc sulfate, about 1% of copper sulfate, about 2% of ferrous sulfate, about 0.5% of ammonium molybdate, and about 0.5% of borax, by weight relative to the total weight of the second sub-composition and the second sub-composition further comprises about 2 ppm of 5-ALA by weight relative to the total weight of the second sub-composition, wherein the third sub-composition comprises straw powders, and wherein the at least one first, second, and third nutrient elements can be the same or different, and further wherein the composition possesses an energy spectrum more positive than the energy spectrum of the composition in a preexisting state, the composition, perhaps because of its more positive energy spectrum, being effective to improve the ability of a soil, when combined with the composition, to be watered by salted water in whole or in part to support plant growth, compared to the soil, when not combined with the composition.

In another aspect, the disclosure relates to methods for using the compositions as disclosed herein for improving soil, plant growth, seeds, and/or quality of the plant products. The compositions disclosed herein may be used alone, or in combination, with other treatment for soil and/or plants, such as traditional, commercial fertilizers, with crop rotation, as well as with the use of non-commercial fertilizers, such as yard clippings, such as grass and shrub clippings, leaves, hay, straw, shredded bark, whole bark nuggets, sawdust, shells, wood chips, paper waste, such as shredded newspaper and cardboard, animal manure, compost, food waste, whole trees, tree branches or twigs, and/or tree stumps. For example, two raw materials, at least one of which has been treated as disclosed herein, may be mixed and applied to a soil and/or plants; or they can be used without being mixed beforehand, and can be applied to a soil and/or plants either sequentially or simultaneously.

The present disclosure provides a method for treating a soil comprising contacting the soil with an effective amount of a composition as disclosed herein to obtain improvement of the soil, plant growth, seeds, and/or quality of the plant products.

The present disclosure also provides a method for treating a soil comprising contacting the soil with an effective amount of a composition as disclosed herein to improve the ability of a soil to be watered by salted water in whole or in part to support plant growth.

The present disclosure also provides a method for treating a plant comprising contacting for a time sufficient the plant with an effective amount of a composition as disclosed herein for a time sufficient to improve plant growth, seeds, and/or quality of plant products.

The present disclosure also relates to a method for treating a soil comprising contacting the soil with an effective amount of a composition, wherein the composition comprises at least one nutrient element, wherein the at least one nutrient element possesses a relative energy-state value greater than the relative energy-state value of the at least one nutrient element in a preexisting state, the composition, perhaps because of the greater relative energy-state value, being effective to improve the ability of the soil, when combined with the effective amount of the composition, to support plant growth better than the soil, when not combined with the composition.

The present disclosure also relates to a method for treating a soil comprising contacting the soil with an effective amount of a composition, wherein the composition comprises at least one nutrient element, wherein the at least one nutrient element possesses a relative energy-state value greater than the relative energy-state value of the at least one nutrient element in a preexisting state, the composition, perhaps because of the greater relative energy-state value, being effective to improve the ability of the soil, when combined with the effective amount of the composition, to be watered by salted water in whole or in part to support plant growth, compared to the soil, when not combined with the composition.

The present disclosure also relates to a method for treating a soil comprising contacting the soil with an effective amount of a composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the composition, perhaps because of the greater relative energy-state value of the at least one of the first, second, and third nutrient elements, alone or in combination, being effective to improve the ability of the soil, when combined with the effective amount of the composition, to support plant growth better than the soil, when not combined with the composition.

The present disclosure also relates to a method for treating a soil comprising contacting the soil with an effective amount of a composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein at least one of the first, second, and third nutrient elements possesses a relative energy-state value greater than the relative energy-state value of the at least one of the first, second, and third nutrient elements in a preexisting state, the composition, perhaps because of the greater relative energy-state value of the at least one of the first, second, and third nutrient elements, alone or in combination, being effective to improve the ability of the soil, when combined with the effective amount of the composition, to be watered by salted water in whole or in part to support plant growth, compared to the soil, when not combined with the composition.

The present disclosure also relates to a method for improving the growth of a plant comprising contacting for a time sufficient the plant with an effective amount of a composition, wherein the composition comprises a first sub-composition comprising at least one organic acidic material comprising at least one first nutrient element, and/or a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second nutrient elements possesses a relative energy-state value greater than the relative energy-state value of the at least one of the first and second nutrient elements in a preexisting state.

The present disclosure also relates to a method for treating a soil comprising contacting the soil with an effective amount of a composition, wherein the composition comprises at least one nutrient element, and further wherein the composition possesses an energy spectrum more positive than the energy spectrum of the composition in a preexisting state, the composition, perhaps because of the more positive energy spectrum, being effective to improve the ability of a soil, when combined with the effective amount of the composition, to support plant growth better than the soil, when not combined with the composition.

The present disclosure also relates to a method for treating a soil comprising contacting the soil with an effective amount of a composition wherein the composition comprises at least one nutrient element, and further wherein the composition possesses an energy spectrum more positive than the energy spectrum of the composition in a preexisting state, the composition, perhaps because of the more positive energy spectrum, being effective to improve the ability of the soil, when combined with the effective amount of the composition, to be watered by salted water to support plant growth, compared to the soil, when not combined with the composition.

The present disclosure also relates to a method for treating a soil comprising contacting the soil with an effective amount of a composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein at least one of the first sub-composition, the second sub-composition, and the third sub-composition possesses an energy spectrum, either alone or in combination, sufficiently positive to be capable of improving the ability of a soil, when combined with the effective amount of the composition, to support plant growth better than the soil, when not combined with the composition.

The present disclosure also relates to a method for treating a soil comprising contacting the soil with an effective amount of a composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein at least one of the first sub-composition, the second sub-composition, and the third sub-composition possesses an energy spectrum, either alone or in combination, sufficiently more positive than the energy spectrum of the composition in a preexisting state to be capable of improving the ability of a soil, when combined with the effective amount of the composition, to able to be watered by salted water in whole or in part to support plant growth, compared to the soil, when not combined with the composition.

The present disclosure also relates to a method for treating a plant to improve the growth of the plant comprising contacting for a time sufficient the plant with an effective amount of a composition according to the present invention. In some embodiments, the composition comprises a first sub-composition comprising at least one organic acidic material comprising at least one first nutrient element, and/or a second sub-composition comprising at least one photosensitive material comprising at least one second nutrient element, the at least one photosensitive material being different from the at least one organic acidic material, wherein the at least one first and second nutrient elements can be the same or different, and further wherein at least one of the first and second sub-compositions possesses an energy spectrum more positive than the energy spectrum of at least one of the first and second sub-compositions in a preexisting state, the composition, perhaps because of the more positive energy spectrum, being effective to improve the growth of the plant, when combined with the effective amount of the composition.

The "time sufficient" needed for the composition disclosed herein to be capable of improving the growth of a plant, when the plant is contacted, for example by spraying, with the composition described herein, is a time of contact sufficient to achieve the improved plant growth. That time can be determined by routine experimentation.

To achieve successful treating, a composition as disclosed herein may be applied to a soil and/or plant one or more times, for example, about every month, every three months, about every year, or for further example, prior to, during, and/or after each growing season.

To determine the "effective amount of a composition," in the context of an energy-treated composition as disclosed herein, one observes whether at least one of the advantages disclosed herein is obtained for a soil and/or plant that has been treated with a composition that has enhanced energy characteristics as defined herein or grown in a soil treated with such a composition that has enhanced energy characteristics as defined herein. If at least one of those advantages was achieved, the composition was utilized in an effective amount.

In some embodiments, the composition disclosed herein may be applied to the soil in an amount ranging from about 300 kg per hectare (herein, "kg/ha"), i.e., 20 kg per mu of soil (herein "kg/mu") to about 15,000 kg/ha, i.e., 1000 kg/mu. An area measured in terms of "mu," as used herein "mu" is an area equivalent to about 666.7 square meters. For example, the composition may be applied in an amount such as 375 kg/ha (25 kg/mu), 750 kg/ha (50 kg/mu), 1500 kg/ha (100 kg/mu), 1800 kg/ha (120 kg/mu), 2250 kg/ha (150 kg/mu), 3000 kg/ha (200 kg/mu), 3750 kg/ha (250 kg/mu), 5250 kg/ha (350 kg/mu), 5400 kg/ha (360 kg/mu), 6000 kg/ha (400 kg/mu), 6750 kg/ha (450 kg/mu), or 12000 kg/ha (800 kg/mu). Of course, one of ordinary skill in the art will recognize that the minimum amount of the composition will be the amount that is effective, for example, for improvement of a soil and/or plant growth and/or for treating plants, and/or for achieving any other desirable result disclosed herein.

In some embodiments, the composition may be applied to the soil in an amount ranging from about 0.1 kg per tree or plant to about 20 kg/tree or plant. For example, the composition may be applied in an amount such as 1 kg/tree or plant, 1.5 kg/tree or plant, 2 kg/tree or plant, 2.5 kg/tree or plant, 3 kg/tree or plant, 3.5 kg/tree or plant, 4 kg/tree or plant, 4.5 kg/tree or plant, 10 kg/tree or plant, or 15 kg/tree or plant. Again, one of ordinary skill in the art will recognize that the minimum amount of the composition will be the amount that is effective, for example, for improvement of a soil and/or plant growth and/or for treating plants.

The composition as disclosed herein may be contacted with a soil in various ways. For example, the composition and the soil can be mixed together, or a layer of the composition can be placed on or within the soil. As a further example, the composition may be spread or sprayed on the top of a soil. As another example, the composition may be contacted with the soil in the vicinity of a plant. As a further example, the soil, whether there is plant growing in it or not, may be plowed to form ditches, such as ditches of about 10 cm to 50 cm in width, and about 5 cm to 30 cm in depth, or pits, which can be deeper than ditches and can be spaced apart from each other, whereas ditches tend to be continuous. The composition may be placed in the ditches in various ways, such as by spreading and spraying. And then the ditches may be covered by plowed-over soil or other things, such as top soil and mulches. For example, the plowing is effected to maximize homogeneity of the soil mixed with the composition disclosed herein. Irrigation may also assist in attempting to maximize the homogeneous mixture of soil and compositions. As a further example, the composition disclosed herein may be applied as a base application to the soil before planting occurs, such as in the spring. As yet another composition, the compositions disclosed herein may be applied, one or more times, after planting and before harvesting. When the compositions disclosed herein are applied more than once after planting, those applications can be referenced as "dressings."

The composition as disclosed herein may also be contacted with a plant. For example, the composition may be spread or sprayed onto any part of the plant, such as the leaves, roots, leaves, stems, stalks, branches, seeds, and/or flowers of the plant. As another example, the composition may be contacted with a plant when the composition is contacted with the soil in the vicinity of the plant.

The composition may be contacted with both the soil and the plant at the same time. For example, in addition to being directly contacted with a part of the plant, the composition may be contacted with the plant by mixing the composition with the soil in which the plant, or any part of the plant grows.

When using a composition comprising a first, a second, and a third sub-compositions as disclosed herein, any two or three of the first, the second, and the third sub-compositions may be combined prior to contacting with a soil and/or plant. The first, the second, and the third sub-compositions may also be separately contacted with a soil and/or a plant, simultaneously or sequentially. For example, the first and the second sub-compositions in a liquid form may be sprayed onto a plant, separately or premixed, while the third sub-composition is contacted with the soil in the vicinity of the plant.

The disclosure also relates to methods for producing improved soils, comprising contacting the soil with an effective amount of a composition disclosed herein. The disclosure also relates to methods for producing improved plants, such as improved plant products, and/or improved seeds, comprising treating plants and/or seeds with an effective amount of a composition disclosed herein for a time sufficient to improve said plants and/or seeds. The disclosure also relates to methods for producing improved seeds, comprising treating plants and/or seeds with an effective amount of a composition disclosed herein for a time sufficient to improve said seeds. The disclosure also relates to methods for producing plants that are capable of providing improved plant products, comprising treating plants with an effective amount of a composition disclosed herein for a time sufficient such that the plants are capable of providing improved plant products.

Without being bound by theory, a soil may be improved by the compositions and methods as disclosed herein as follows. For example, the materials in the first and second sub-compositions, after the electromagnetic treatment as disclosed herein, may retain the altered energy state long enough to assist in energy absorption, energy storage, and/or energy transfer, when applied to a soil and/or plant. Furthermore, for example, when the composition disclosed herein is mixed with a virgin soil, such as sand, it may retain the altered energy state long enough to assist in formation of microaggregates and/or flocculants, either of which can assist in improving the soil, or such formation may occur independently of altered energy state. It is possible that the at least one organic acidic material in the compositions disclosed herein cleans the surface of the virgin soil, such as sand, and may form a film surrounding soil particles, so that microaggregates can desirably form, possibly with the assistance of other ingredients, such as organic colloids, to improve the soil. Organic colloids may also be present in the compositions disclosed herein in amounts sufficient to serve as flocculants. The formation of microaggregates may possibly promote the energy absorption, energy storage, and/or energy transfer flowing from the altered energy state, as mentioned above. The formation of microaggregates may also desirably promote soil permeability, promote the entry of sunlight into the soil as a result of structural changes in the soil caused by the compositions disclosed herein, essentially rendering the treated soil more sunlight permeable to provide enhanced energy into the roots, and that enhanced energy can then be transferred into the leaves of the plant to increase the photosynthesis occurring in the plant, and maintain the nutrient and/or water levels of the soil, so that the treated soil could serve as a water reservoir. In one embodiment, salted water, such as seawater, could be used in whole or in part as the source to supply water and nutrition that plants need to grow in the soil that is mixed with a composition disclosed herein.

Therefore, in certain embodiments, soil, such as virgin soil, treated with the composition disclosed herein, advantageously does not require as much water, or as much non-salted water, as would be expected for plants to grow therein. Instead, too much water might destroy the advantageous microaggregate structures that the compositions disclosed herein may form in the treated soil. That aspect of the present disclosure could be advantageous in areas of the world where the water supply is insufficient. In one embodiment, for example, water content of the treated soil ranges from 25% to 35% by weight relative to the total weight of the soil. The desirable formation of microaggregates could also provide an environment suitable for the growth of bacteria, generally advantageous for the health of plant roots. And, of course, it is possible that the energy-treated compositions disclosed herein are advantageously altered when mixed with soil or applied to plants and/or seeds.

Furthermore, without being bound by theory, plant growth and/or food yield may be improved as follows. Nutrient elements, such as N, P, and/or K, in a composition disclosed herein, may be more readily absorbed by plants, perhaps because of the altered energy state effected by the present disclosure. For example, if a plant grows in a treated soil, the energy from an ingredient in the treated composition, such as a photosensitive material having an appropriate energy spectrum and/or relative energy-state value, may be transferred to the soil and/or the plant, causing a series of beneficial photochemical reactions on or within the plant, thus aiding the growth of the plant. As has been explained above, without being bound by theory, compositions disclosed herein can be designed to have energy spectra and/or relative energy-state values that mimic, either by themselves or when mixed with target soil, those of good soil. The treated soil and/or plant can then, under a further non-binding theory, attain those desired energy spectra and/or relative energy-state values, or at least sufficient improvement in the target soil's and/or plant's energy spectra and/or relative energy-state values to lead to improved soils and/or plant growth as disclosed herein.

Of course, one of ordinary skill in the art will recognize that unfavorable or harmful environmental conditions, for example, lack of sunshine, natural disasters such as flooding, and cold temperatures, can adversely affect the effect(s) of the compositions and methods disclosed herein, even if the energy spectra and/or relative energy-state values of the compositions disclosed herein are those sought.

As a further example, the electromagnetically treated photosensitive material may, for example, serve as an electron pump when combined with the target soil, providing the energy that is needed for photochemical reactions for the following molecular structure changes:

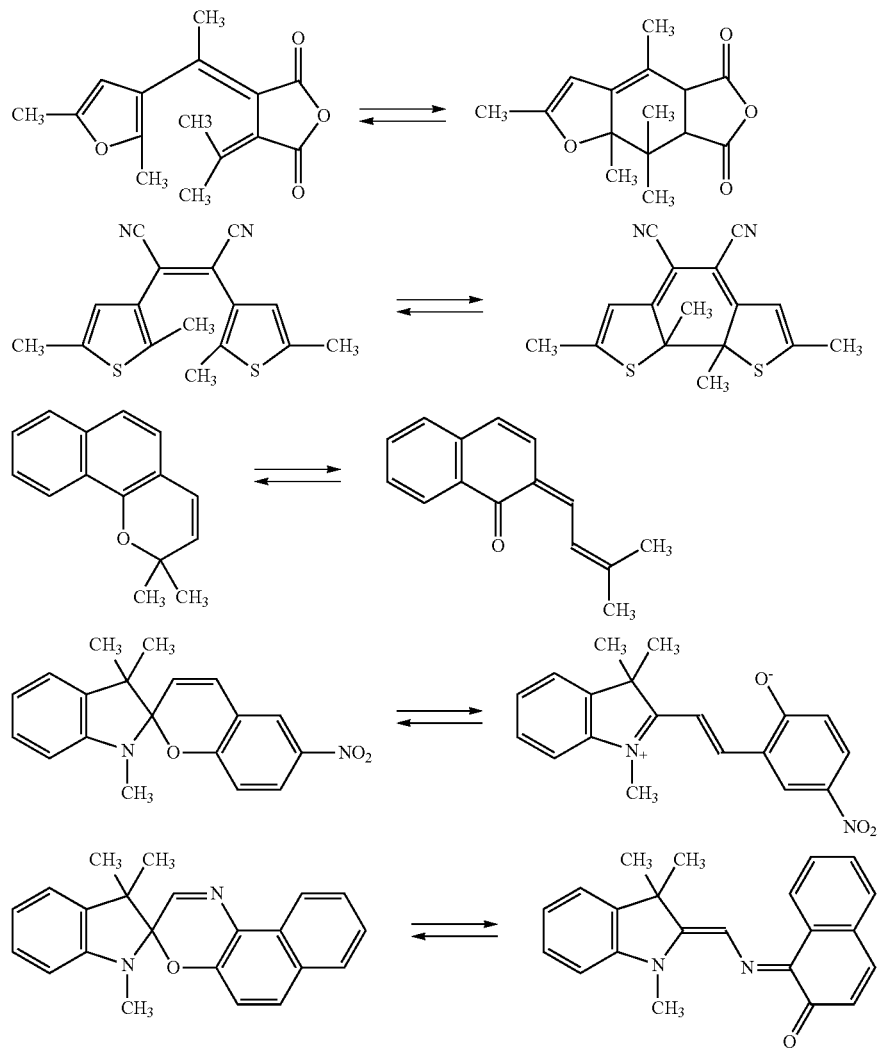

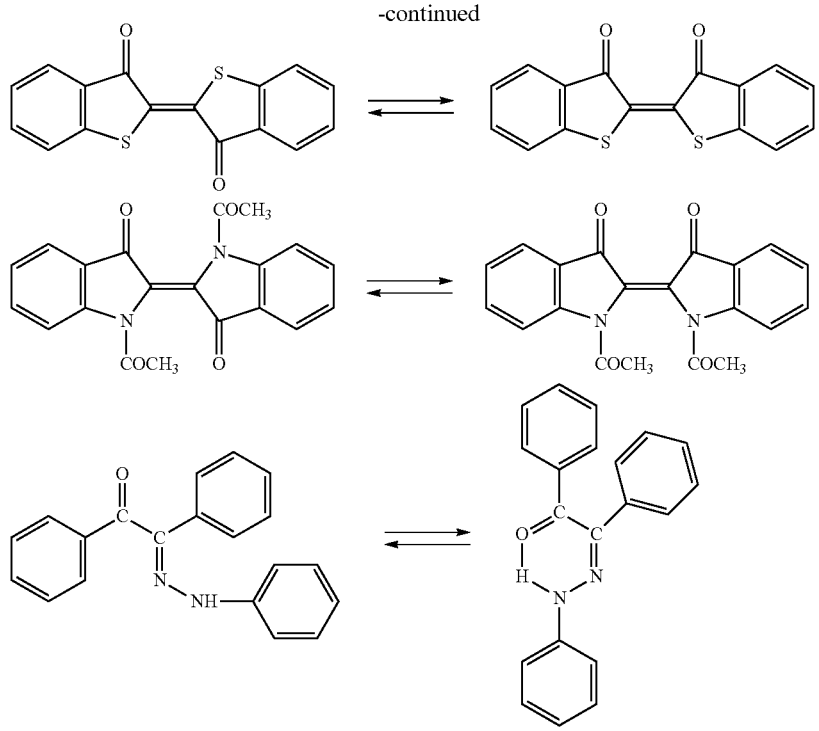

Those photochemical reactions may desirably increase the interface hydrophilic capability of the treated soil, making it more water absorbent and essentially transforming the soil into a condition more reminiscent of a water reservoir.

In addition, the compositions disclosed herein, having an appropriate energy spectrum and/or relative energy-state values of at least one nutrient, may possibly serve as an electron pump in treated plants, providing the energy needed for mitochondria of the plants to absorb $O_2$ in the air and convert it into water as shown below:

$4e^- + 4H^+ + O_2 + nH^+$ (inside of mitochondria) $\rightarrow 2H_2O +$
$nH^+$ (outside of mitochondria)

The composition as disclosed herein may also desirably increase biological reaction(s) of the plant roots if applied, for example, as a liquid, to the soil or plant leaves and/or barks and/or the roots themselves. That may enable plants to absorb more energy from sunlight and to increase plant cellular growth, producing more adenosine triphosphate (ATP), which provides chemical energy for plant growth. In addition, active biological reaction of the plants occasioned by the disclosure herein may desirably increase the cell size and strengthen the thickness of the plant cell wall, so that plant cells may hold more water inside the cell wall for growth purposes. As such, when the atmosphere becomes dry, the plant, in a camel-like fashion, may advantageously have sufficient water to sustain growth for a longer period of time.

The present disclosure also relates to a composition as disclosed herein in a preexisting state. Such a composition in a preexisting state may also achieve at least one result as disclosed herein, although the result may not be as favorable as that achieved by a composition having undergone energy treatment as disclosed herein but being otherwise identical. In other words, all the compositions having the ingredients disclosed above but not energy treated, may have practical utility in accord with the present disclosure, The present disclosure is further illustrated by the following non-limiting examples based on, but not necessarily being identical to, actual experiments performed.

EXAMPLES

Example 1

The raw materials of six compositions according to the present disclosure, as used in Examples 2-10 in energy treated form (BGA1-BGA6), are described as follows. Table 1 shows the percentage of raw materials for making BGA1-BGA6. The percentage of a certain raw material in Table 1 is relative to the weight of the corresponding first or second sub-composition, respectively.

BGA1 comprises 15% of a first sub-composition, 15% of a second sub-composition, and 70% of a third sub-composition by weight relative to the total weight of BGA1. As seen in the Table, the first sub-composition comprises 70% of straw powders, 10% of phosphate rock particles, 12% of agricultural grade amino acids, 4.5% of corn starch, 1% of manganese sulfate, 1% of zinc sulfate, 0.5% of copper sulfate, and 1% of ferrous sulfate by weight relative to the total weight of the first sub-composition. The second sub-composition comprises 70% of straw powders, 10% of phosphate rock particles, 12% of agricultural grade amino acids, 4.5% of corn starch, 1% of manganese sulfate, 1% of zinc sulfate, 0.5% of copper sulfate, and 1% of ferrous sulfate, by weight relative to the total weight of the second sub-composition and further comprises 1.5 ppm of 5-ALA by weight relative to the total weight of the second sub-composition. The third sub-composition comprises straw powders. The N content of BGA1 is about 2% by weight relative to the total weight of BGA1. BGA1 may be used to treat various types of soils to make them more suitable for plant growth.

TABLE 1

Raw Materials of First and Second Sub-Compositions

| | Raw Materials of First Sub-Composition | | | | | | Raw Materials of Second Sub-Composition | | | | | |
|---|---|---|---|---|---|---|---|---|---|---|---|---|
| | BGA1 | BGA2 | BGA3 | BGA4 | BGA5 | BGA6 | BGA1 | BGA2 | BGA3 | BGA4 | BGA5 | BGA6 |
| Straw powders | 70% | 60% | 60% | 60% | 60% | 60% | 70% | 60% | 57% | 60% | 60% | 60% |
| Phosphate rock particles | 10% | 10% | 12% | 8% | 17% | 10% | 10% | 8% | 13% | 9% | 17% | 13% |
| Amino acids | 12% | 15% | 15% | 15% | 8% | 17% | 12% | 15% | 16% | 15% | 8% | 15% |
| Stearic acid | 0 | 0 | 0 | 5% | 0 | 0 | 0 | 0 | 0 | 5% | 0 | 0 |
| Corn starch | 4.5% | 5% | 6% | 5% | 7% | 6% | 4.5% | 6% | 7% | 6% | 7% | 6% |
| APP | 0 | 5% | 0 | 0 | 0 | 0 | 0 | 5% | 0 | 0 | 0 | 0 |
| 5-ALA | 0 | 0 | 0 | 0 | 0 | 0 | 1.5 ppm | 2 ppm | 2 ppm | 2 ppm | 2 ppm | 2 ppm |
| Manganese sulfate | 1% | 1% | 1.5% | 1.5% | 1.5% | 1.5% | 1% | 1% | 1.5% | 1% | 1.5% | 1% |
| Zinc sulfate | 1% | 1% | 1.5% | 1.5% | 1.5% | 1.5% | 1% | 1% | 1.5% | 1% | 1.5% | 1% |
| Copper sulfate | 0.5% | 1% | 1% | 1% | 1% | 1% | 0.5% | 1% | 1% | 1% | 1% | 1% |
| Ferrous sulfate | 1% | 1.5% | 2% | 2% | 3% | 2% | 1% | 2% | 2% | 2% | 3% | 2% |
| Ammonium molybdate | 0 | 0.1% | 0.2% | 0.2% | 0.2% | 0.5% | 0 | 0.2% | 0.2% | 0 | 0.2% | 0.5% |
| Borax | 0 | 0.4% | 0.8% | 0.8% | 0.8% | 0.5% | 0 | 0.8% | 0.8% | 0 | 0.8% | 0.5% |

In an exemplary embodiment, the 5-ALA is first introduced into water, in a sufficient amount, for example, 1 liter to 3 liters of water per ton of the second sub-composition of the BGA1. The other components of the second sub-composition of the BGA1 can then be mixed while the 5-ALA/water mixture is sprayed onto the other components of the second sub-composition of the BGA1 during the mixing, and a uniform distribution of the 5-ALA may be obtained in the second sub-composition of the BGA1. Such a method can be used in other embodiments of the second sub-compositions of the BGAs described herein. The amount of water used to distribute the 5-ALA is not considered as part of the weight of the second sub-composition of the BGAs when the weight percentages and/or ppm of each component of the second sub-composition of the BGAs are calculated. The second sub-composition can then be mixed with the first and/or third sub-compositions, and a uniform distribution of the 5-ALA may be obtained in the resulting mixture.

BGA2 comprises 15% of a first sub-composition, 15% of a second sub-composition, and 70% of a third sub-composition by weight relative to the total weight of BGA2. As seen in the Table, the first sub-composition was made by mixing 60% of straw powders, 10% of phosphate rock particles, 15% of agricultural grade amino acids, 5% of corn starch, 5% of APP, 1% of manganese sulfate, 1% of zinc sulfate, 1% of copper sulfate, 1.5% of ferrous sulfate, 0.1% of ammonium molybdate, and 0.4% of borax, by weight relative to the total weight of the first sub-composition. The second sub-composition was made by mixing 60% of straw powders, 8% of phosphate rock particles, 15% of agricultural grade amino acids, 6% of corn starch, 5% of APP, 1% of manganese sulfate, 1% of zinc sulfate, 1% of copper sulfate, 2% of ferrous sulfate, 0.2% of ammonium molybdate, and 0.8% of borax, by weight relative to the total weight of the second sub-composition and further comprises 2 ppm of 5-ALA by weight relative to the total weight of the second sub-composition. The third sub-composition comprises straw powders only.

BGA2 may be suitable to treat various types of soils to make them more suitable for plant growth, for example, dry soils, such as desert sand soil.

BGA3 comprises 15% of a first sub-composition, 15% of a second sub-composition, and 70% of a third sub-composition by weight relative to the total weight of BGA3. The first sub-composition comprises 60% of straw powders, 12% of phosphate rock particles, 15% of agricultural grade amino acids, 6% of corn starch, 1.5% of manganese sulfate, 1.5% of zinc sulfate, 1% of copper sulfate, 2% of ferrous sulfate, 0.2% of ammonium molybdate, and 0.8% of borax, by weight relative to the total weight of the first sub-composition. The second sub-composition comprises 57% of straw powders, 13% of phosphate rock particles, 16% of agricultural grade amino acids, 7% of corn starch, 1.5% of manganese sulfate, 1.5% of zinc sulfate, 1% of copper sulfate, 2% of ferrous sulfate, and 0.2% of ammonium molybdate, and 0.8% of borax, by weight relative to the total weight of the second sub-composition and further comprises 2 ppm of 5-ALA by weight relative to the total weight of the second sub-composition. The third sub-composition comprises straw powders.

BGA3 may be suitable to treat various types of soils to make them more suitable for plant growth, for example, soils at a high elevation or soils that lack nutrients.

BGA4 comprises 15% of a first sub-composition, 15% of a second sub-composition, and 70% of a third sub-composition by weight relative to the total weight of BGA4. The first sub-composition comprises 60% of straw powders, 8% of phosphate rock particles, 15% of agricultural grade amino acids, 5% of stearic acid, 5% of corn starch, 1.5% of manganese sulfate, 1.5% of zinc sulfate, 1% of copper sulfate, 2% of ferrous sulfate, 0.2% of ammonium molybdate, and 0.8% of borax, by weight relative to the total weight of the first sub-composition. The second sub-composition comprises 60% of straw powders, 9% of phosphate rock particles, 15% of agricultural grade amino acids, 5% of stearic acid, 6% of corn starch, 1% of manganese sulfate, 1% of zinc sulfate, 1% of copper sulfate, and 2% of ferrous sulfate, by weight relative to the total weight of the second sub-composition and further comprises 2 ppm of 5-ALA by weight relative to the total weight of the second sub-composition. The third sub-composition comprises straw powders.

BGA4 may be suitable for treating various types of soils to make them more suitable for plant growth, for example, saline and/or alkaline soils.

BGA5 comprises 15% of a first sub-composition, 15% of a second sub-composition, and 70% of a third sub-composition by weight relative to the total weight of BGA5. The first sub-composition comprises 60% of straw powders, 17% of phosphate rock particles, 8% of agricultural grade amino acids, 7% of corn starch, 1.5% of manganese sulfate, 1.5% of zinc sulfate, 1% of copper sulfate, 3% of ferrous sulfate, 0.2% of ammonium molybdate, and 0.8% of borax, by weight relative to the total weight of the first sub-composition. The second sub-composition comprises 60% of straw powders, 17% of phosphate rock particles, 8% of agricultural grade amino acids, 7% of corn starch, 1.5% of manganese sulfate, 1.5% of zinc sulfate, 1% of copper sulfate, 3% of ferrous sulfate, 0.2% of ammonium molybdate, and 0.8% of borax, by weight relative to the total weight of the second sub-composition and further comprises 2 ppm of 5-ALA by weight relative to the total weight of the second sub-composition. The third sub-composition comprises straw powders.

BGA5 may be suitable for treating various types of soils to make them more suitable for plant growth, for example, acidic soils.

BGA6 comprises 15% of a first sub-composition, 15% of a second sub-composition, and 70% of a third sub-composition by weight relative to the total weight of BGA6. The first sub-composition comprises 60% of straw powders, 10% of phosphate rock particles, 17% of agricultural grade amino acids, 6% of corn starch, 1.5% of manganese sulfate, 1.5% of zinc sulfate, 1% of copper sulfate, 2% of ferrous sulfate, 0.5% of ammonium molybdate, and 0.5% of borax, by weight relative to the total weight of the first sub-composition. The second sub-composition comprises 60% of straw powders, 13% of phosphate rock particles, 15% of agricultural grade amino acids, 6% of corn starch, 1% of manganese sulfate, 1% of zinc sulfate, 1% of copper sulfate, 2% of ferrous sulfate, 0.5% of ammonium molybdate, and 0.5% of borax, by weight relative to the total weight of the second sub-composition and further comprises 2 ppm of 5-ALA by weight relative to the total weight of the second sub-composition. The third sub-composition comprises straw powders.

BGA6 may be suitable for treating various types of soils to make them more suitable for plant growth, for example, soils that are diseased, e.g., plagued with harmful viruses or bacteria.

The agricultural grade amino acids, comprising 47% to 51% of a mixture of 17 amino acids, were obtained from Penghengbo Biochemical Company in Nanhe County, Hebei Province, China. Copper sulfate and manganese sulfate were obtained from Zouping Yongxing Chemical Company, China. Zinc sulfate was obtained from Beijing Yushenghong Chemical Company, Ltd., China. Ferrous sulfate and borax were obtained from Tianjin Tongxin Chemical Company, China.

For each of the above-described BGA1-BGA6, the raw material for the first sub-compositions and the raw material for the second sub-compositions were respectively electromagnetically treated at room temperature in a plastic container wrapped with a coil or in an enclosed shielded room. In the following Examples 2-4, 6, 8, and 9, the AC current generator used to generate AC current to flow in the treating device so as to generate electromagnetic field to perform the electromagnetic treatments was operated at a supply voltage of 110 or 220 V and a current of 36 A. The treatments were performed for 1 hour with the frequency of the AC current gradually changing from 25 Hz to 10000 Hz at a constant rate of increase. In Examples 5, 7, and 10, the electromagnetic treatments were performed for 45 minutes with the frequency of the AC current gradually changing from 500 Hz to 1500 Hz at a constant rate of increase, at working voltage of 10-15 V and working current of 0.06-6 A in a coil. The supply voltage was at 110 or 220 V. In Example 5, the as-treated BGA2 and BGA4 were mixed, and the mixture were treated again under the same conditions used to electromagnetically treat individual BGA raw materials in Examples 7 and 10.

Example 2

BGA1 referenced above was used to treat soil samples collected from Langfang, China. The soil samples from Langfang were sandy loam. Specifically, the soil samples were mixed, respectively, in a 1:1 by weight, with
BGA1,
urea,
diammonium phosphate, and
Sierte brand sulfur-based high concentration compound fertilizer, commercially available from Anhui Sierte Fertilizer Company, Ltd., China, containing 15% each of N, P, and K by weight relative to the total weight of the fertilizer, respectively.

Immediately after mixing, the relative energy-state value of N was obtained as described above, using the same N standard for each evaluation, i.e., using the same machine. The relative energy-state value of N was obtained for:
a Langfang soil sample alone,
BGA1 alone,
urea alone,
diammonium phosphate alone,
the Sierte brand sulfur-based high concentration compound fertilizer alone,
the 1:1 mixture of the Langfang soil sample plus BGA1,
the 1:1 mixture of the Langfang soil sample plus urea,
the 1:1 mixture of the Langfang soil sample plus diammonium phosphate, and
the 1:1 mixture of the Langfang soil sample plus the fertilizer.

Figure 5A:
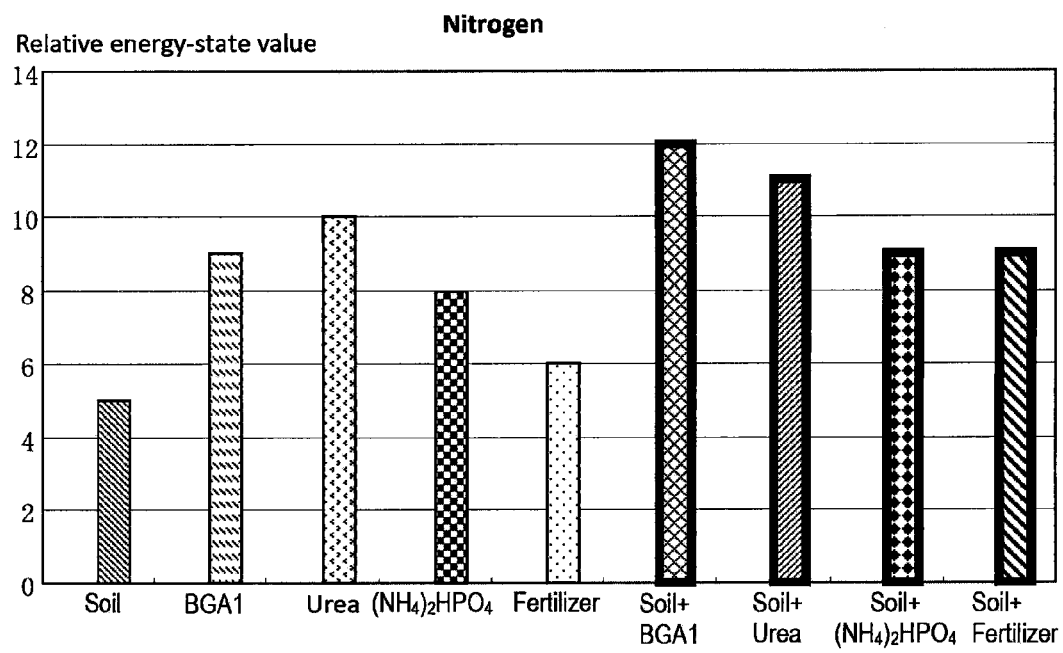
FIG. 5A shows the relative energy-state value of N in a Langfang soil sample alone (Soil), a composition according to the present disclosure alone (BGA1), urea alone (Urea), diammonium phosphate alone (($NH_4$)$_2$$HPO_4$), Sierte brand sulfur-based high concentration compound fertilizer alone (commercially available from Anhui Sierte Fertilizer Company, Ltd., China.) (fertilizer), a 1:1 by weight mixture of a Langfang soil sample plus BGA1 (Soil+BGA1), a 1:1 by weight mixture of a Langfang soil sample plus urea (Soil+Urea), a 1:1 mixture by weight of a Langfang soil sample plus diammonium phosphate (Soil+($NH_4$)$_2$$HPO_4$), and a 1:1 mixture by weight of a Langfang soil sample plus the high concentration compound fertilizer (Soil+fertilizer).

As shown in FIG. 5A, the relative energy-state value of N was 5 for the Langfang soil sample alone (denoted as "Soil" in FIG. 5A), 9 for BGA1 alone (denoted as "BGA1"), 10 for urea alone (denoted as "Urea"), 8 for diammonium phosphate alone, 6 for the Sierte fertilizer alone (denoted as the "fertilizer"), 12 for the 1:1 mixture of the Langfang soil sample and BGA1 (denoted as "Soil+BGA1"), 11 for the 1:1 mixture of the Langfang soil sample and urea, 9 for the 1:1 mixture of the Langfang soil sample and diammonium phosphate, and 9 for the 1:1 mixture of the Langfang soil sample and the fertilizer.

As shown in FIG. 5A, BGA1 increased the relative energy-state value of N in the Langfang soil sample more than was accomplished with any of the non-energy treated urea, diammonium phosphate, and the fertilizer.

Without being bound by theory, it appears based on that experimentation that the relative energy-state value of N may not be directly proportional to the nitrogen content in a composition. For example, the nitrogen content in BGA1 is only about 2% relative to the total weight of BGA1, whereas the nitrogen content in urea is 46.7%. However, notwithstanding the 23-fold increase in N in urea, the numerical relative energy-state value of N in urea is not so much higher than that of BGA1. But, as noted above, the relative energy-state value of N was increased more in the BGA1 treated Langfang soil sample than was the value of N in the soil treated with urea, and of course, the urea was not energy treated. Even though the relative energy-state value of N increases in soil plus urea, soil plus diammonium phosphate, and soil plus the fertilizer, those are comparative examples not within the soils disclosed herein because the urea, diammonium phosphate and fertilizer were not energy treated as disclosed herein. And as explained, the relative energy-state value of N in the soil plus BGA1 (energy treated as disclosed herein), an example of a soil disclosed herein, increases more than in the comparative examples, perhaps because of the energy treatment.

Similarly, the relative energy-state value of P was obtained as described herein for
  a Langfang soil sample alone,
  BGA1 alone,
  diammonium phosphate alone,
  the Sierte brand sulfur-based high concentration compound fertilizer,
  a 1:1 mixture of the Langfang soil sample plus BGA1,
  a 1:1 mixture of the Langfang soil sample plus diammonium phosphate, and
  a 1:1 mixture of the Langfang soil sample plus the fertilizer.

Figure 5B:
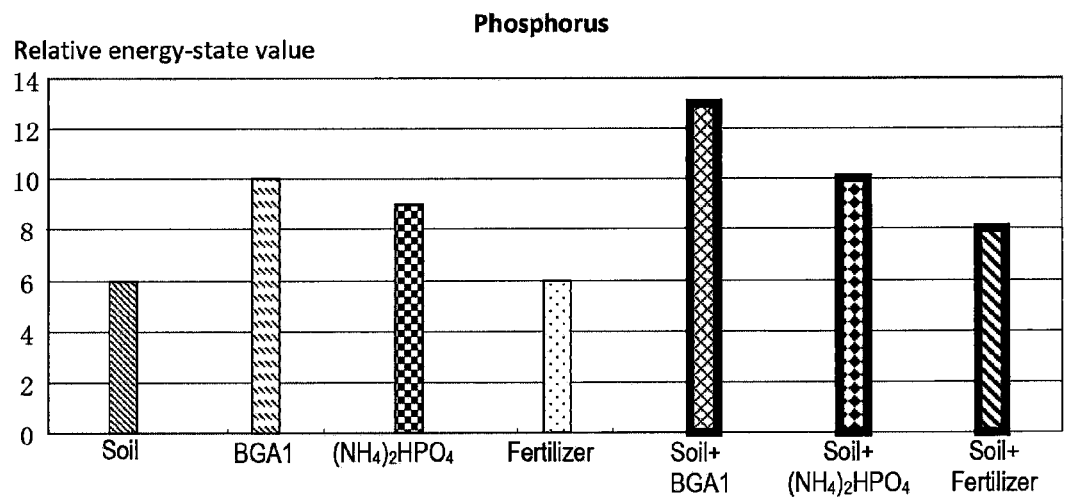
FIG. 5B shows the relative energy-state value of P in a Langfang soil sample alone (Soil), BGA1 alone (BGA1), diammonium phosphate alone (($NH_4$)$_2$$HPO_4$), the Sierte brand sulfur-based high concentration compound fertilizer, referenced above, alone (fertilizer), a 1:1 mixture by weight of a Langfang soil sample plus BGA1 (Soil+BGA1), a 1:1 mixture by weight of a Langfang soil sample plus diammonium phosphate (Soil+($NH_4$)$_2$$HPO_4$), and a 1:1 mixture by weight of a Langfang soil sample plus the high concentration compound fertilizer (Soil+fertilizer).
Figure 5C:
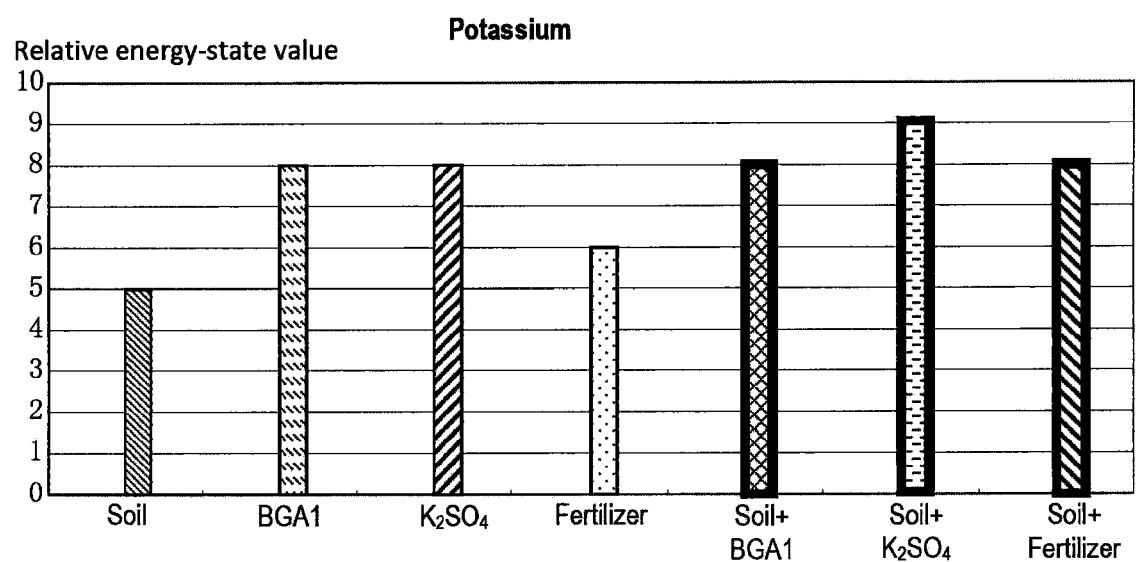
FIG. 5C shows the relative energy-state value of K in a Langfang soil sample alone (Soil), BGA1 alone (BGA1), potassium sulfate alone ($K_2SO_4$), the Sierte brand sulfur-based high concentration compound fertilizer, referenced above, alone (fertilizer), a 1:1 mixture by weight of a Langfang soil sample plus BGA1 (Soil+BGA1), a 1:1 mixture by weight of a Langfang soil sample plus potassium sulfate (Soil+$K_2SO_4$), and a 1:1 mixture by weight of a Langfang soil sample plus the high concentration compound fertilizer (Soil+fertilizer).

As shown in FIG. 5B, BGA1 increased the relative energy-state value of P in the Langfang soil sample more than either diammonium phosphate or the fertilizer.

Again, without being bound by theory, it appears based on that experimentation that the relative energy-state value of P may not be directly proportional to the phosphorous content in a composition. For example, the chemical content of P (in terms of $P_2O_5$) in BGA1, diammonium phosphate, and the fertilizer was 3%, 42%, and 15%, respectively. However, as shown in FIG. 5B, the numerical relative energy-state value of P in BGA1, diammonium phosphate and the fertilizer was respectively 10, 9, and 6, respectively. In that case, BGA1, having the least amount of P by 14-fold and 5-fold respectively, is more useful for increasing the relative energy-state value of P in the Langfang soil sample, than are diammonium phosphate and the fertilizer. Even though the relative energy-state value of P increases in soil plus diammonium phosphate and soil plus the fertilizer, those are comparative examples not within the soils disclosed herein because the diammonium phosphate and fertilizer were not energy treated as disclosed herein. And as explained, the relative energy-state value of P in the soil plus BGA1 (energy treated as disclosed herein), an example of a soil disclosed herein, increases more than in the comparative examples, perhaps because of the energy treatment.

Similarly, the relative energy-state value of K was also obtained as described herein for
  a Langfang soil sample alone,
  BGA1 alone,
  potassium sulfate alone,
  the Sierte brand sulfur-based high concentration compound fertilizer alone,
  a 1:1 mixture of the Langfang soil sample plus BGA1,
  a 1:1 mixture of the Langfang soil sample plus potassium sulfate, and
  a 1:1 mixture of the Langfang soil sample plus the fertilizer.

Yet again, without being bound by theory, it appears based on that experimentation that the relative energy-state value of K may not be directly proportional to the potassium content in a composition. The chemical content of K (in terms of $K_2O$) in the BGA1, potassium sulfate, and the fertilizer was 3%, 45%, and 15%, respectively. Yet, the numerical relative energy-state value of K in BGA1, potassium sulfate, and the fertilizer was 8, 8, and 6, respectively. The numerical relative energy-state value of K in the 1:1 mixture of the Langfang soil sample plus BGA1, the 1:1 mixture of the Langfang soil sample plus potassium sulfate, and the 1:1 mixture of the Langfang soil sample plus the fertilizer was 8, 9, and 8, respectively. So in terms of increasing the relative energy-state value of K in a soil, BGA1 is only a little bit numerically inferior to potassium sulfate, even when used in a 15-fold less amount in K content, but is comparable to the fertilizer, even though used in a 5-fold less amount. And again, without being bound by theory, it matters not how the electromagnetically treated BGA compositions disclosed herein function to achieve the desirable results obtained. The disclosure demonstrates how to make and use those compositions to achieve at least one desired result. Even though the relative energy-state value of K increases in soil plus potassium sulfate and soil plus the fertilizer, those are comparative examples not within the soils disclosed herein because the potassium sulfate and fertilizer were not energy treated as disclosed herein. And in this particular instance, the relative energy-state value of K in the soil plus BGA1 (energy treated as disclosed herein), an example of a soil disclosed herein, increases less than in the comparative examples.

Example 3

BGA5, having a total N, P, and K of 5% relative to the total weight of BGA5, was also used to treat a sugar cane field in Hainan, China. The soil in the sugar cane field was brick red and slightly acidic. About one month after planting of the sugar canes, the soil in one part of the sugar cane field, i.e. an area of about 200 $m^2$, was plowed to form ditches of about 15 cm to 20 cm in width and depth, between rows of sugar cane plants. BGA5 was applied to the ditches in the amount of about 750 kg/ha (50 kg/mu), and then covered by plowed-over soil. About two months after the first application, BGA5 was applied similarly in about the same amount to the same part of the field for a second time. About two months after the second application, BGA5 was applied again in about the same amount to the same part of the field for a third time.

Another part of the sugar cane field, i.e. also about 200 $m^2$, served as a control for determining the effects of BGA5. That part of the field was not treated with BGA1. Instead, in that part, a high Norwegian concentration compound fertilizer (commercially available from Hainan Agricultural Resources Company, Ltd., China, containing 45% total of N, P, and K by weight relative to the total weight of the fertilizer, respectively) in the amount of about 30 kg/mu, KCl in the amount of about 10 kg/mu, and urea in the amount of about 10 kg/mu were applied, in a similar fashion as the application of BGA5, i.e., for a total of three times, about every two months.

The yield of the sugar canes grown in the respective part of the field was measured in terms of sugar cane weight per mu after nearly 7 months of growth. The yield of the sugar canes grown in the soil treated with BGA5 was about 38.6% by weight numerically greater than that of the sugar canes grown in the control soil. To make the evaluation, sugar cane was harvested from 10 meters of a row, both in the BGA5-treated and control parts of the field. The weight of the stalks was measured and then averaged, resulting in the 38.6% value stated above.

Example 4

BGA2 was used in a testing field in the Herlinger desert area in China. Chinese pine and non-edible-fruit bearing Siberian apricot trees (600 each) were planted in the testing field. About half of the Chinese pine trees and half of the apricot trees were treated with BGA2. Specifically, the roots of the trees were treated with BGA2, in an amount about 1-1.5 kg/tree and wrapped, with agricultural plastic films to form lumps (about 15 cm×20 cm×30 cm in volume) that enclosed the mixture of BGA2 and sand from the desert (the Chinese pine trees also had some non-sand soil around the roots; the apricot trees did not) in a weight ratio of 1:50 (BGA2: soil) around the roots. The plastic films were removed right before planting, and no water was applied to the trees while planting. Another half of the two varieties of trees was not treated with BGA2 and thus served as controls for determining the effects of BGA2. Trees were watered naturally by rains; but without any additional watering schedule.

About six years after planting, the survival rate for the pine trees and apricot trees not treated with BGA2 is about zero. The survival rate for Chinese pine trees treated with BGA2 is about 73%, while the survival rate for the apricot trees treated with BGA2 is about 19%.

One year and half after planting of the trees as described above, soil samples were collected from the areas around the roots of the trees that were treated with BGA2, and of the trees that served as controls. Particle size analysis was performed on the soil samples using a Mastersizer instrument from Malvern Instrument, and the results are shown in graphical form in FIGS. 12A and 12B. FIG. 12A shows particle size distribution of sand/loamy sand not treated with BGA2. FIG. 12B shows particle size distribution of sandy loam obtained by treating sand/loamy sand with BGA2. Particles in the soil samples were analyzed in terms of clay, sand, and silt. For example, particles having a size of less than about 0.002 mm are in the category of clay, particles having a size of from about 0.02 mm to 0.002 mm are in the category of silt, and particles having a size from about 2 to 0.02 mm are in the category of sand. As shown in Table 2 below, the soil sample collected from the areas around the roots of the trees not treated with BGA2 (denoted as "Soil sample not treated with BGA2" in Table 2) had 1.19% of clay, 6.90% of silt, and 91.91% of sand by weight relative to the total weight of the untreated soil sample, and thus is sand/loamy sand according to the international soil texture triangle classification system as shown in FIG. 12C. The soil sample collected from the areas around the roots of the trees treated with BGA2 (denoted as "Soil sample treated with BGA2" in Table 2) had 3.68% of clay, 38.34% of silt, and 57.96% of sand by weight relative to the total weight of the treated soil sample, and thus is a sandy loam. See FIG. 12C. FIG. 12C shows, in the international soil texture triangle for soil classification, at point A the sand/loamy sand not treated with BGA2, and shows at point B the sandy loam obtained by treating sand/loamy sand with BGA2. Accordingly, the desert sand soil around the roots of the trees treated with BGA2 was advantageously transformed from a sand/loamy sand into a sandy loam after treatment using BGA2. And both the soil and plant growth, judging from the survival rates set forth above, were improved by treatment with BGA2.

Chemically, the sandy loam has different properties from the sand/loamy sand, as measured about one month after the samples were taken as shown below in Tables 3 and 4. In Table 3, all of the parameters that are reported come from soil samples taken about six years after planting. In Table 4, all of the parameters that are reported come from soil samples taken about one year after planting For example, the retained water in the sandy loam, as shown in Table 3, is 11.1%, whereas in the sand/loamy sand, the retained water is 0.9%. As a further example, the organic mass in the sandy loam is 0.997%, whereas the organic mass in the sand/loamy sand is 0.132%. As an even further example, total N in the sandy loam is 0.067%, whereas in the sand/loamy sand it is 0.007%. As yet a further example, the hydrolysable N in the sandy loam is 105 mg/kg, whereas in the sand/loamy sand, it is 5.51 mg/kg. Yet further, total P in the sandy loam is 0.041%, whereas in the sand/loamy sand it is 0.019%. Even yet further, the cation exchange capacity in the sandy loam is 15.2 cmol/kg, whereas in the sand/loamy sand it is 2.8 cmol/kg. As Table 4 shows, the bulk density of the soil sample treated with BGA2 was numerically lower than that of the soil sample not treated with BGA. The porosity of the soil sample treated with BGA2 was numerically higher than that of the soil sample not treated with BGA. The retained water content of the soil sample treated with BGA2 was numerically higher than that of the soil sample not treated with BGA. And the water permeability rate of the soil sample treated with BGA2 was numerically higher than that of the soil sample not treated with BGA.

As Table 4 also shows, in the aggregate content column, the BGA2 treated soil had higher amount of aggregates with a size of 1 mm or greater. In the water-stable aggregate content column, the BGA2 treated soil samples had higher amount of aggregates with a size of 0.25 mm or greater.

All of the data reported in Tables 3 and 4 were based on measurements made at the Research Institute of Agricultural Resources and Agricultural Regional Planning of China Agricultural Science Academy (formerly called "Research Institute of Soil Fertilizer") in Beijing, China, except for the data in the aggregate and the water-stable aggregate content columns of Table 4. Those data were based on measurements made at the University of Forestry in Beijing, China.

TABLE 2

| Sample | Clay <0.002 mm | Silt 0.02~0.002 mm | Sand 2~0.02 mm | Soil texture |
|---|---|---|---|---|
| Soil sample not treated with BGA2 | 1.19% | 6.90% | 91.91% | Sand/loamy sand |
| Soil sample treated with BGA2 | 3.68% | 38.34% | 57.96% | Sandy loam |

TABLE 3

| Subject of Measurement | Water content | pH | Organic mass | Cation exchange capacity | Total nitrogen (N) | Hydrolyzable nitrogen (N) | Total phosphorus (P) | Available phosphorus (P) | Total potassium (K) | Readily available potassium (K) |
|---|---|---|---|---|---|---|---|---|---|---|
| Unit | % | | % | cmol/kg | % | mg/kg | % | mg/kg | % | mg/kg |
| After BGA2 treatment | 11.1 | 8.1 | 0.997 | 15.2 | 0.067 | 105 | 0.041 | 13.7 | 2.02 | 120 |
| Before BGA2 treatment | 0.9 | 8.2 | 0.132 | 2.8 | 0.007 | 5.51 | 0.019 | 15.4 | 1.92 | 69.6 |
| Ratio of before and after BGA2 treatment | 12.3 | / | 7.6 | 5.4 | 9.6 | 19.1 | 2.2 | 0.9 | 1.1 | 1.7 |

TABLE 4

| Subject of measurement | | Physical property | | | | Aggregate content % (dry sieving method) | | | | | | | Water-stable aggregate content % (wet sieving method) | | | | | | |
|---|---|---|---|---|---|---|---|---|---|---|---|---|---|---|---|---|---|---|---|
| | | Bulk density g/cm³ | Porosity % | Water content % | Water permeability rate mm/min | 10~5 mm | 5~3 mm | 3~1 mm | 1~0.5 mm | 0.5~0.25 mm | <0.25 mm | >5 mm | 5~3 mm | 3~2 mm | 2~1 mm | 1~0.5 mm | 0.5~0.25 mm | <0.25 mm |
| Apricot trees | BGA2 | 0.577 | 77.9 | 27.0 | 5.8 | 0.4 | 1.6 | 2.4 | 5.8 | 3.4 | 86.4 | 2.0 | 1.3 | 0.3 | 1.6 | 2.6 | 0.9 | 91.3 |
| | Control | 1.35 | 49.3 | 4.8 | 4.0 | 0 | 0 | 0 | 0 | 0 | 100 | 0 | 0 | 0 | 0 | 0 | 0 | 100 |
| Pine trees | BGA2 | 0.697 | 73.2 | 21.2 | 12.5 | 0.3 | 2.2 | 4.0 | 3.3 | 4.1 | 86.2 | 0 | 0.3 | 0.8 | 2.5 | 3.2 | 1.5 | 91.7 |
| | Control | 1.47 | 44.7 | 2.3 | 5.4 | 0 | 0 | 0.1 | 19.1 | 16.3 | 64.5 | 0 | 0 | 0 | 0 | 0 | 0 | 100 |

About six years after planting of the trees as described above, relative energy-state values of various nutrient elements were also obtained for soil samples collected from the areas around the roots of the trees that were treated with BGA2, and soil samples from the areas around the roots of the trees that served as controls for determining the effects of BGA2. As shown in FIG. 6, except for Cu, Fe, and Mo, the relative energy state values of N, P, K, Ca, Mg, S, Mn, Zn, and B were all numerically increased for the soil samples from the areas around the roots of the trees that were treated with BGA2 (denoted as "treated" in FIG. 6) in comparison to that of the trees not treated with BGA2 (denoted as "untreated"). So, relative energy-state values of nine nutrient elements in the soil were numerically increased by treatment with BGA2, as measured about six years after that treatment. And those increases correlated with soil improvement, including improved particle size, chemical characteristics, and physical characteristics, and plant growth improvement, as noted above.

About six years after planting of the trees as described above, energy spectra were also obtained for a good soil sample from a forest in Altay, Xinjiang, China, to be used in this example as a standard soil for comparison purposes, a soil sample from the areas around the roots of the trees that were treated with BGA2, and a soil sample from the areas around the roots of the trees that served as controls for determining the effects of BGA2, As shown in FIG. 7A, the energy spectrum of the untreated soil sample comprises mainly negative peaks relative to the spectrum of the good soil, while the energy spectrum of the soil sample treated with BGA2 comprises mainly positive peaks as shown in FIG. 7B and the area under the positive curves is greater than the area under the positive curves of the good soil.

Example 5

In this example, a BGA mixture of BGA2 and BGA4 at a ratio of 1:1 by weight was prepared.

Electromagnetic treatment was again (see Example 1) performed in a greenhouse on the BGA mixture at room temperature. The previously-treated BGA was placed in plastic bags, wrapped in a coil, and the electromagnetic treatment was performed for 45 minutes with the frequency of the AC current gradually changing from 500 Hz to 1500 Hz at a constant rate of increase, at a working voltage of 10-15 V, and at a working current of 0.06-6 A in a coil. The supply voltage was 220 V.

That treated BGA mixture was applied to the white Abu Dhabi sand described in more detail below in an Abu Dhabi royal garden. The white Abu Dhabi sand samples were taken from a testing field in the Abu Dhabi royal garden, 20 cm deep as measured from the white Abu Dhabi sand surface where the plant roots were mostly concentrated. The relative energy-state values of various nutrient elements in
white Abu Dhabi seawater soaked sand that does not support plant growth (denoted as "White Abu Dhabi sand" in Table 5) and
the treated BGA mixture (denoted as "BGA mixture")
were measured as described herein, and the results are reported in Table 5.

The relative energy-state values of various nutrient elements were also measured for a mixture of the white Abu Dhabi sand and the BGA mixture. Specifically, 10 g of the white Abu Dhabi sand were mixed with 2 g of the BGA mixture. The relative energy-state values of the nutrient elements in the mixture of the white Abu Dhabi sand and BGA were measured on the day the mixture was first made (denoted as "Mixture (day 1)" in Table 5). The relative energy-state values were measured periodically to monitor changes of the relative energy-state values for the mixture. For this case, the relative energy-state values stabilized on the 7$^{th}$ day after the mixing of the white Abu Dhabi sand and the BGA mixture. The relative energy-state values measured on the 7$^{th}$ day are shown in Table 5, "Mixture (day 7)."

The BGA mixture was then applied to the testing field in an amount of 120 kg/mu wherein wheat seeds were planted. About one month after treatment, 10 g of the soil sample were collected from the white Abu Dhabi sand testing field treated with the BGA mixture (20 cm deep as measured from the soil surface), and were tested for relative energy-state values of various nutrient elements (denoted as "treated soil (large scale) one month" in Table 5).

TABLE 5

| Nutrient element | White Abu Dhabi Sand | Treated BGA mixture | Mixture (day 1) | Mixture (day 7) | Treated soil (large scale) one month |
|---|---|---|---|---|---|
| N | 1 | 47 | 23 | 20 | 19 |
| P | 1 | 47 | 23 | 20 | 19 |
| K | 1 | 47 | 23 | 20 | 19 |
| Ca | 0 | 11 | 10 | 8 | 9 |
| Mg | 0 | 11 | 10 | 8 | 9 |
| S | 0 | 11 | 10 | 8 | 9 |
| Cu | 0 | 11 | 10 | 8 | 9 |
| Fe | 0 | 11 | 10 | 8 | 9 |
| Mn | 0 | 11 | 10 | 8 | 9 |
| Zn | 0 | 11 | 10 | 8 | 9 |
| B | 0 | 11 | 10 | 8 | 9 |
| Mo | 0 | 11 | 10 | 8 | 9 |
| Se | 0 | 11 | 10 | 8 | 9 |

As reported in Table 5, even at a large scale, the relative energy-state values were numerically improved for all the elements in the BGA mixture-treated white Abu Dhabi sand compared to the non-BGA treated white Abu Dhabi sand. Furthermore, wheat growth was not observed in the white Abu Dhabi sand that was not treated with BGA mixture. Wheat growth was observed in the BGA-mixture treated white Abu Dhabi sand.

Example 6

BGA3 was used to treat a testing field in Tibet, China. The testing field was in a highly elevated area in Lhasa Tibet, and that field was barren. The testing field was about 1840 m² in size total. About 240 m² were devoted to cucumbers, divided into six sub-testing fields of about 40 m² each. In three of those sub-testing fields, BGA3 was applied to the soil in an amount of 250 kg/mu, and sheep manure was applied in an amount of 2500 kg/mu. In the other three sub-testing fields, no BGA3 was applied, only sheep manure in an amount of 2500 kg/mu was applied. About 600 m² were devoted to cherry tomatoes, divided into fifteen sub-testing fields of about 40 m² each. In five of those sub-testing fields, BGA3 was applied to the soil in an amount of 250 kg/mu. In another five of those sub-testing fields, BGA3 was applied to the soil in an amount of 350 kg/mu. In the other five sub-testing fields, no BGA3 was applied. About 600 m² were devoted to bitter melon, divided into fifteen sub-testing fields of about 40 m² each. In five of those sub-testing fields, BGA3 was applied to the soil in an amount of 250 kg/mu, and sheep manure was applied to the soil in an amount of 2500 kg/mu. In another five of those sub-testing fields, BGA3 was applied to the soil in an amount of 350 kg/mu, and sheep manure was applied to the soil in an amount of 2500 kg/mu. In the other five sub-testing fields, no BGA3 was applied, only sheep manure in an amount of 2500 kg/mu was applied. About 400 m² were devoted to watermelon, divided into ten sub-testing fields of about 40 m² each. In five of those sub-testing fields, BGA3 was applied to the soil in an amount of 300 kg/mu, and sheep manure was applied to the soil in an amount of 2500 kg/mu. In the other five sub-testing fields, no BGA3 was applied, only sheep manure in an amount of 2500 kg/mu was applied. In those experiments, the soil that was not treated with BGA3 served as a control. The yield for each type of plant was measured in terms of total weight of the fruits of the respective plants. The yield increases (denoted as Yield increase with the specific amount of BGA3 applied) in Table 6 below) was calculated as an average (sum of the measurements divided by the number of measurements) for the plants grown in the soil treated with the described amount of BGA3 relative to the corresponding control plants grown in the soil not treated with the BGA3. As shown in Table 6, for each plant product, BGA3 increased the plant yield in comparison with the control plants and thus showed numerically improved plant growth as a result of treating the soil with BGA3. And that was so even in the control experiments where sheep manure, a fertilizer, was used to treat the control soil.

TABLE 6

|  | Cucumber | Cherry tomato | Bitter melon | Watermelon |
|---|---|---|---|---|
| Yield increase (250 kg/mu BGA3 applied) | 45.1% | 201.5% | 103.6% | N/A |
| Yield increase (300 kg/mu BGA3 applied) | N/A | N/A | N/A | 71.1% |
| Yield increase (350 kg/mu BGA3 applied) | N/A | 252% | 181.7% | N/A |

Example 7

BGA4 was used to treat saline alkaline soil samples collected from Tianjin, China. Saline alkaline soil samples from Tianjin were mixed, in a 1:1 ratio by weight, with
BGA4,
Sierte brand sulfur-based high concentration compound fertilizer, commercially available from Anhui Sierte Fertilizer Company, Ltd., and
Sierte brand chlorine-based high concentration compound fertilizer, commercially available from Anhui Sierte Fertilizer Company, Ltd., respectively.

A saline alkaline soil sample from Tianjin was also mixed with BGA4 and the fertilizer with Cl such that the ratio of saline alkaline soil sample: BGA4: fertilizer was about 1:1:1. Immediately after making the mixtures, the relative energy-state value of Cl was obtained as described herein for
the saline alkaline soil sample,
BGA4,
the fertilizer without Cl,
the fertilizer with Cl,
the 1:1 mixture of the saline alkaline soil sample plus BGA4,
the 1:1 mixture of the saline alkaline soil sample plus the fertilizer without Cl,
the 1:1 mixture of the saline alkaline soil sample plus the fertilizer with Cl, and the 1:1:1 mixture of the saline alkaline soil sample plus the fertilizer with Cl plus BGA4.

As shown in FIG. 8, the relative energy-state value of Cl in the saline alkaline soil was numerically 8. When the saline alkaline soil was treated with BGA4, the relative energy-state value of Cl numerically decreased to 5. The fertilizer without Cl had no numerical effect on the relative energy-state value of Cl in the saline alkaline soil. The fertilizer with Cl numerically increased the relative energy-state value of Cl in the saline alkaline soil to 9. But when BGA4 and the fertilizer with Cl were both present in the saline alkaline soil, the relative energy-state value of Cl was numerically decreased to 6. Hence, BGA4 showed numerical improvement for the relative energy-state value of Cl in treating the soil, demonstrating a decrease in the harmful effect of excessive Cl in the soil.

Example 8

BGA5 was used in a testing field in Chongqing, the Three Gorges Area, in China. BGA5 was applied to a portion of a testing field of a size of 120 mu one time in the amount of 360 kg/mu. During a ten-year period after the one-time treatment with BGA5, farmers reported that the crops grown in the testing field treated with BGA5, even without application of any other fertilizer, had better yield than crops grown in the non-BGA5 treated portion of the testing field.

Some ten years after the BGA5 was applied, soil samples were collected from the portion of the testing field in the Three Gorges Area that had been treated with the one-time application of BGA5. Soil samples were also collected from the portion of the testing field in the Three Gorges Area that had been treated only with regular fertilizer.

Figure 9A:
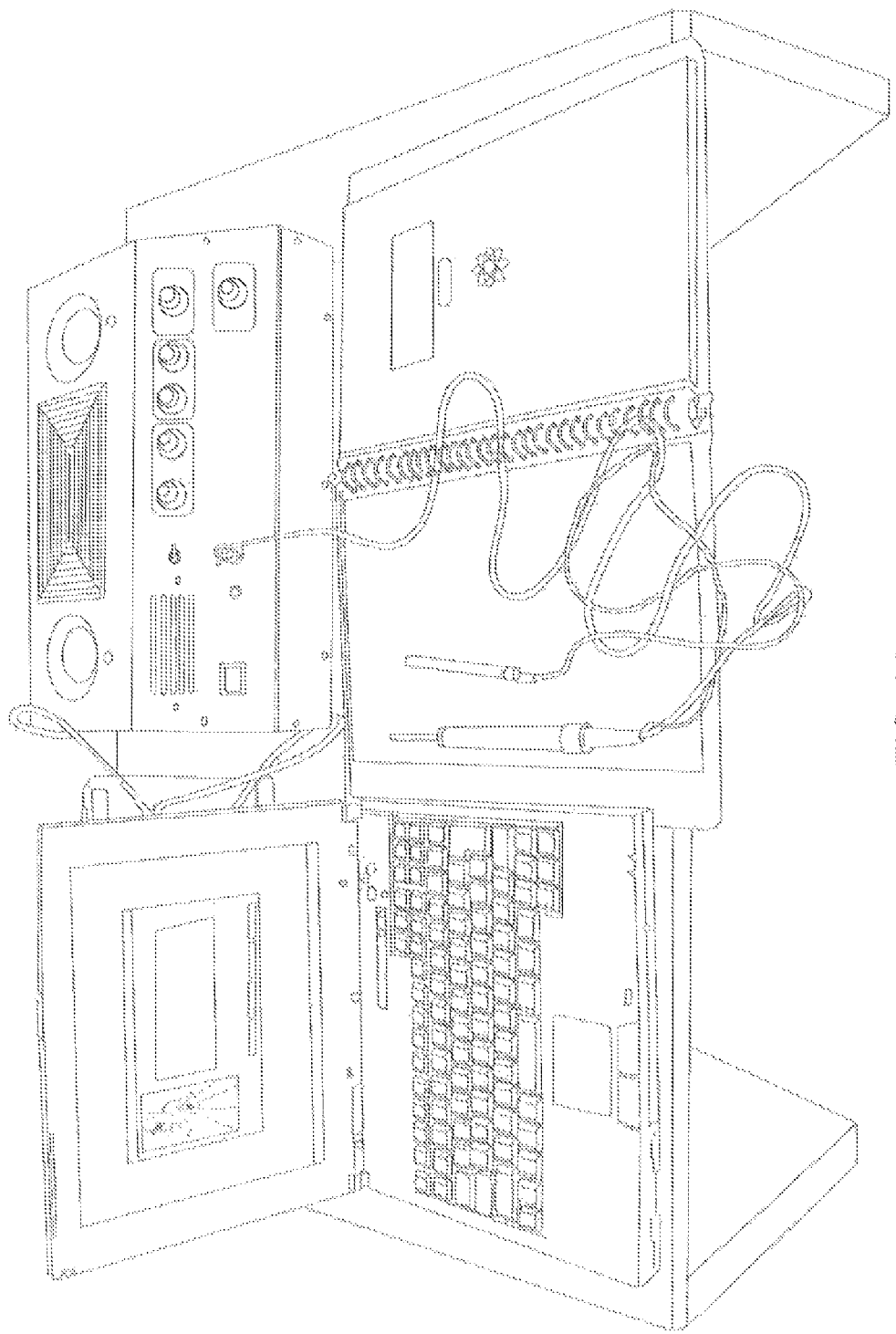
Figure 9B:
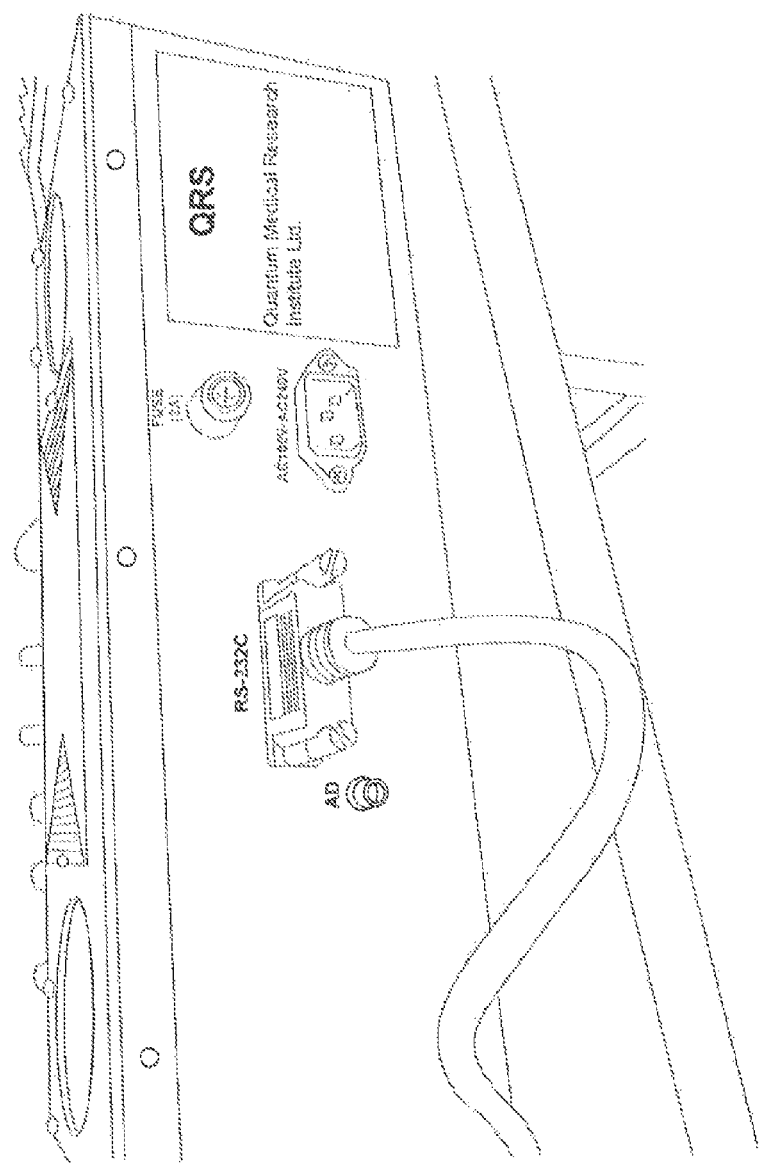

The relative energy-state values of N, P, and K were obtained for both the soil samples treated with BGA5 and the soil samples treated with regular fertilizer (Table 7). The relative energy-state values were measured by the J-1 quantum resonance spectrometer, which is commercially available from Corporation Quantum Medical Research Institute of Japan as described herein, and which is shown in FIGS. 9A, 9B, and 9E.

Figure 9C:
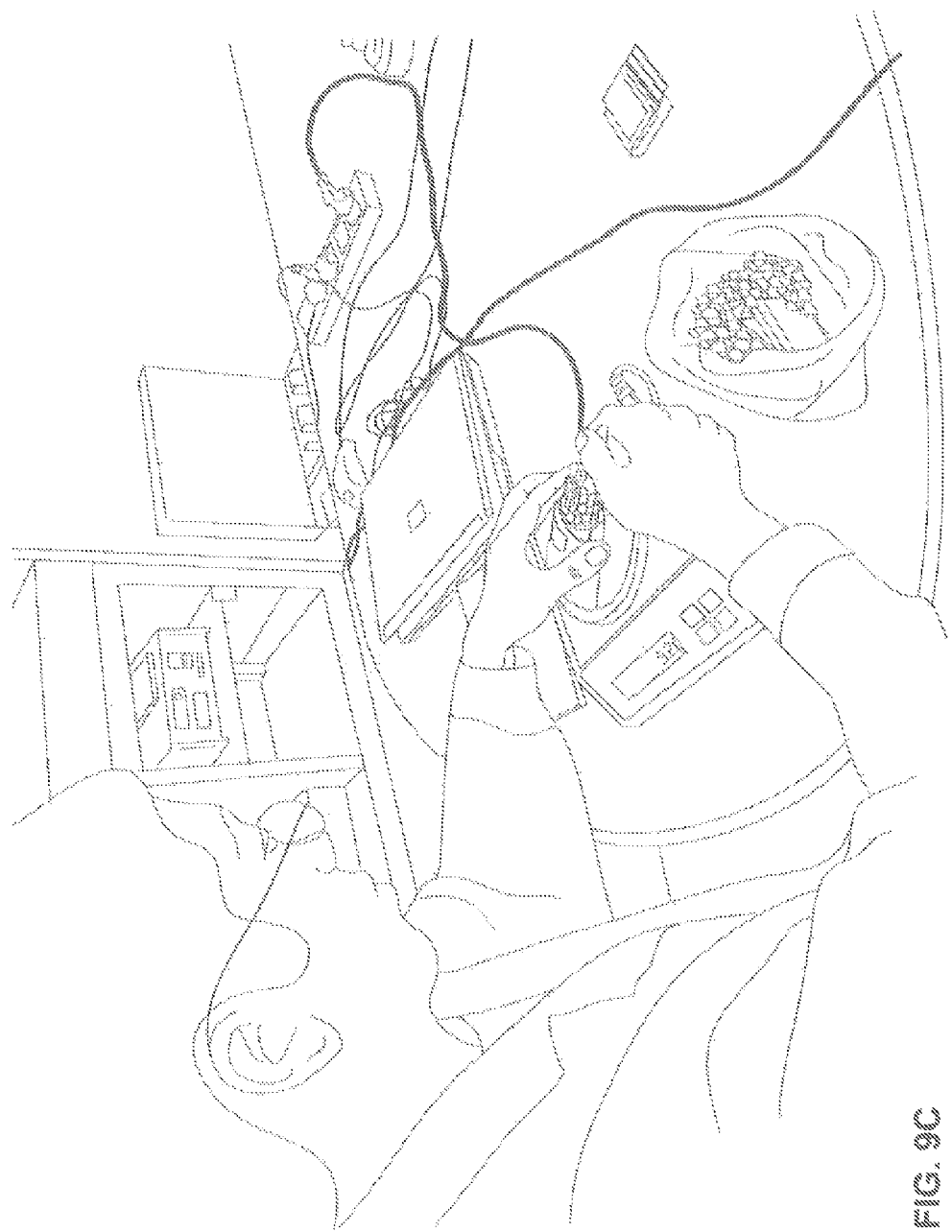
Figure 9D:
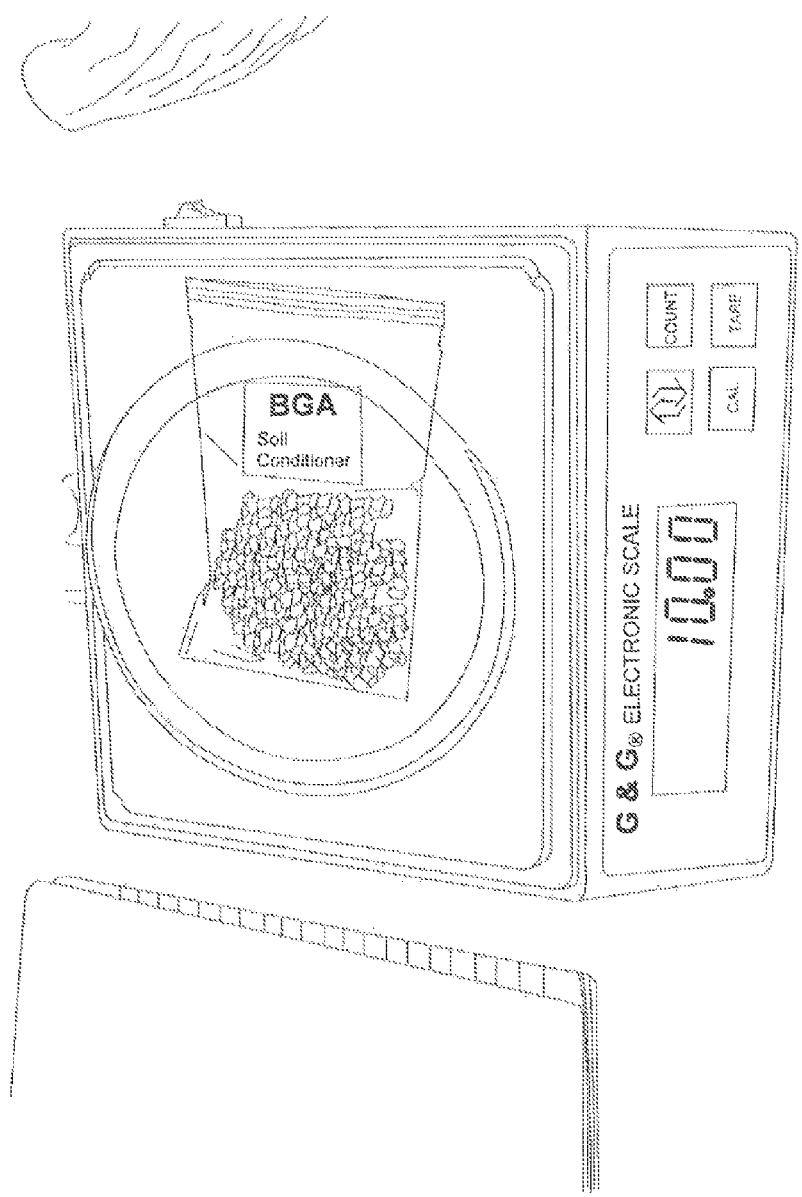
Figure 9E:
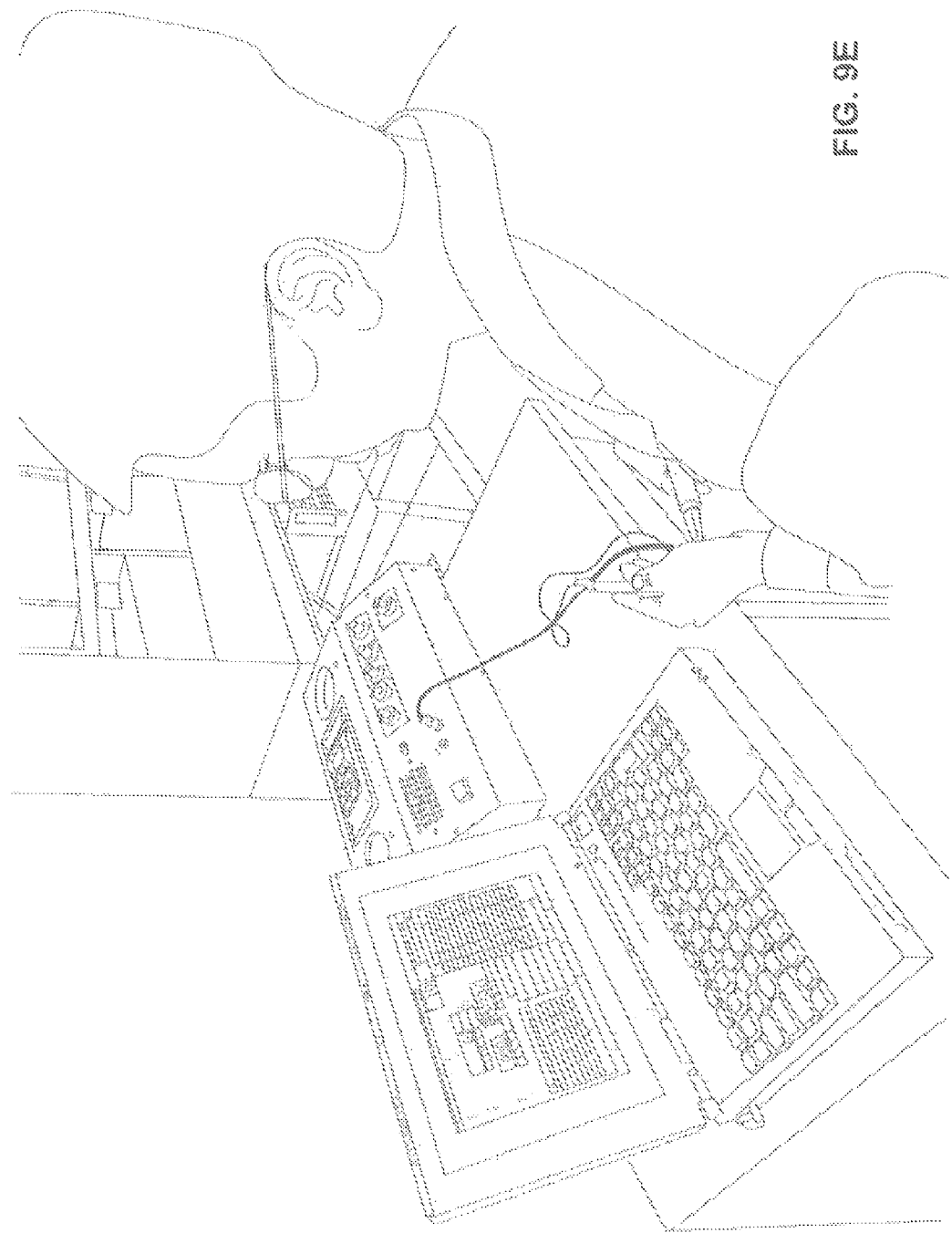
Figure 9F:
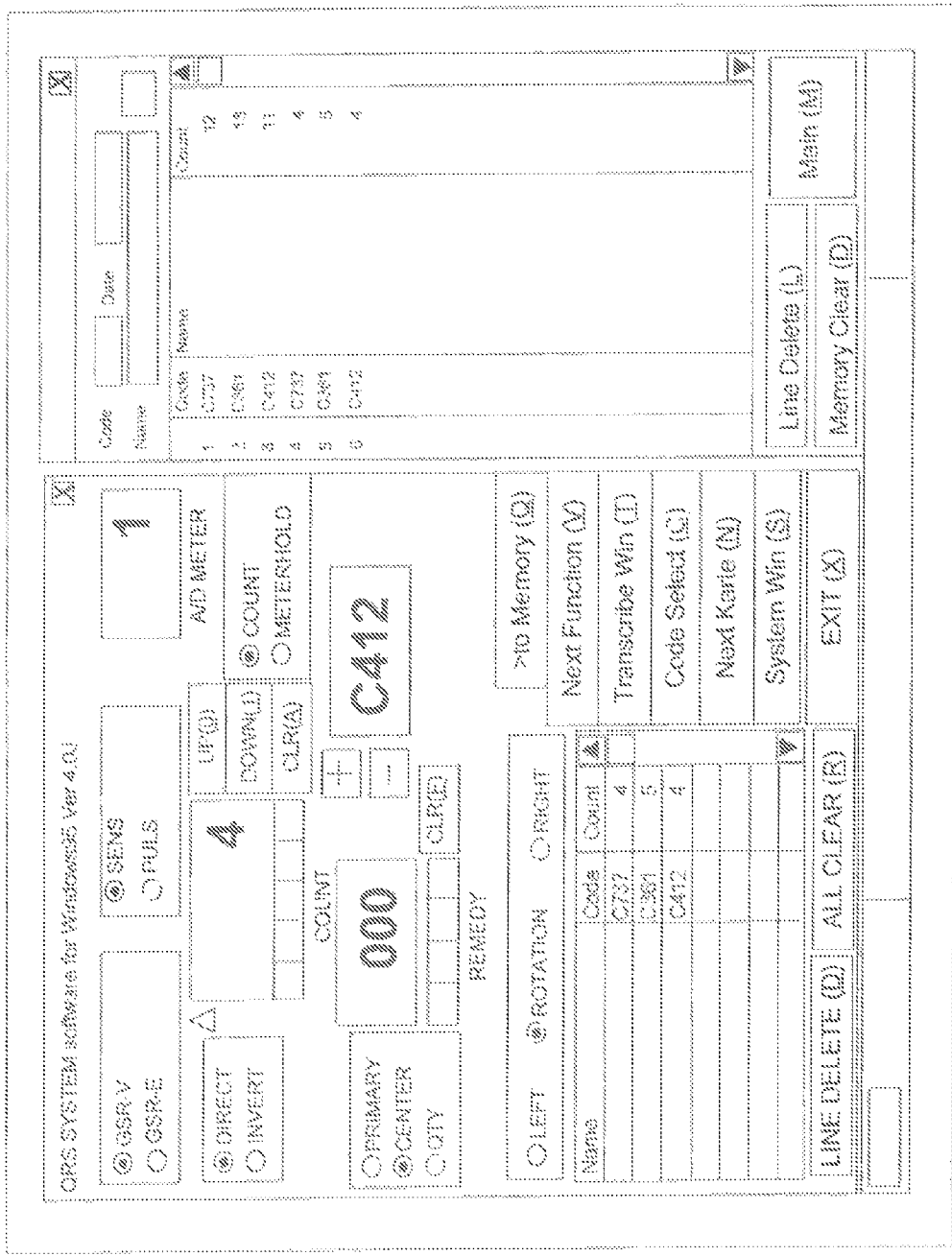

As shown in Table 7, and as pictured in FIG. 9F on the customized software provided with the commercially available J-1 machine, the relative energy-state values of N, P, and K in the soil that was treated with BGA5 over 10 years ago were still numerically higher than the relative energy-state values of N, P, and K in the soil that was treated using only regular fertilizer.

In an exemplary embodiment, 10 g of soil sample are weighed into a sample container, such as a plastic bag, as shown, for example, in FIGS. 9C and 9D. The sample and container are then placed on the QRS as shown in FIG. 9D. The user can operate the QRS according to manufacturer's instructions, as shown in FIG. 9E. Relative energy-state values of nutrient element(s) chosen by the user, for example, N, P, and K, can be measured (see FIG. 9E), and the currently measured values can be displayed on the screen of the attached computer (see values on left hand side of screen in FIG. 9F (values "4", "5", and "4"); see Table 7 below) and cumulatively stored into memory for the user's convenience, for example for comparing the relative energy-state values of selected nutrient elements of different soil samples (see values on right hand side of screen in FIG. 9F (values "12", "13", "11", "4", "5", and "4"); see Table 7 below). Such a method and machine can be used in other embodiments described herein.

TABLE 7

Relative Energy-State Values

|  | N | P | K |
|---|---|---|---|
| Soil treated with BGA5 | 12 | 13 | 11 |
| Soil treated with regular fertilizer | 4 | 5 | 4 |

Example 9

BGA6 was used to treat a Pinang tree field in Hainan, China, wherein the Pinang trees had been plagued by the Pinang yellow disease found in the soil. BGA6 was applied to the Pinang field soil in the amount of about 2 kg/tree.

Before the treatment with BGA6, the Pinang trees had dark brown roots. About one month after one application of BGA6, the Pinang trees started to grow white-colored new roots. Before the treatment with BGA6, the Pinang trees also had yellow leaves. Two months after one application of BGA6, most of the leaves of the Pinang trees turned green.

The relative energy-state values of various nutrient elements and harmful entities were also measured for:
- a sample of normal soil from the same Hainan area but not diseased,
- a diseased soil sample without treatment with BGA6, and
- a diseased soil sample treated with BGA6.

The results are shown in Table 8.

TABLE 8

|  | N | P | K | Ca | Mg | S | Cu | Fe | Mn | Zn | B | Mo |
|---|---|---|---|---|---|---|---|---|---|---|---|---|
| Normal soil | 6 | 6 | 5 | 2 | 2 | 1 | 2 | 3 | 2 | 2 | 3 | 2 |
| Diseased soil | 4 | 3 | 3 | 1 | 1 | 1 | 2 | 2 | 1 | 1 | 2 | 1 |
| Diseased soil treated with BGA6 | 12 | 12 | 11 | 4 | 4 | 3 | 3 | 5 | 4 | 4 | 5 | 4 |

|  | Cl | Al | Virus | Fungus | Bacteria toxin |
|---|---|---|---|---|---|
| Normal soil | 2 | 0 | 0 | 0 | 0 |
| Diseased soil | 3 | 3 | 3 | 0 | 0 |
| Diseased soil treated with BGA6 | 2 | 0 | 1 | 0 | 0 |

As can be seen in the top part of Table 8, the numerical relative energy-state values of the various nutrient elements in the diseased soil sample treated with BGA6 were increased compared to those of the diseased soil sample not treated with BGA6, and even that of the healthy soil. Furthermore, as seen in the bottom part of Table 8, the numerical relative energy state-values of the harmful entities in the diseased soil treated with the composition were lower than or equal to that of the diseased soil.

Example 10

A composition in water ("sBGA") as disclosed herein was prepared. First, a mixture was formed by dissolving various ingredients in water such that the mixture comprised 250 kg/m$^3$ agricultural grade amino acid, 20 kg/m$^3$ copper sulfate, 50 kg/m$^3$ zinc sulfate, 30 kg/m$^3$ manganese sulfate, 20 kg/m$^3$ boric acid, 20 kg/m$^3$ potassium sulfate, and 2 g/m$^3$ 5-ALA, by weight relative to the total volume of the mixture and was balanced to 100% with water to form the sBGA.

When dissolving the ingredients, the mixture was stirred using a mixer at a speed of 50-100 r/min in an enclosed, foil-shielded space, and at the same time the mixture was treated electromagnetically by a coil located within the space but remote from the mixer. The electromagnetic treatment was performed under the frequency of 500-1500 Hz, working voltage of 10-15 V, working current of 0.06-6 A, and supply voltage of 220 V for 45 minutes at room temperature. The relative energy-state values of N and K in the composition were respectively measured to be 23 and 24, prior to electromagnetic treatment, and 47 and 48 after electromagnetic treatment.

The sBGA was diluted by water in the ratio of 1:300 by volume. The relative energy-state values of various nutrient elements in the sBGA and in the 1:300 diluted sBGA were obtained as disclosed herein and are listed in Table 9, but no measurements were taken of the nutrient elements in the preexisting state, and hence none is reported.

TABLE 9

|  | N | K | Ca | Mg | S | Cu | Fe | Mn | Zn | B |
|---|---|---|---|---|---|---|---|---|---|---|
| sBGA | 56 | 55 | 28 | 27 | 28 | 27 | 27 | 28 | 28 | 28 |
| 1:300 diluted sBGA | 35 | 36 | 18 | 17 | 18 | 17 | 17 | 18 | 18 | 17 |

The following comparative test with three different treatments of wheat seeds and/or soil was conducted in white seawater soaked sand in Abu Dhabi:

Treatment 1: wheat seeds were soaked in water until germination; water covered the wheat seeds while soaking; and the water-soaked seeds were then planted in an amount of 14 kg/mu in the un-treated white seawater soaked sand.

Treatment 2: wheat seeds were soaked in diluted sBGA in a volume ratio of sBGA and water=1:10 until germination; the diluted sBGA covered the wheat seeds while soaking; the sBGA-soaked seeks were then planted in an amount of 14 kg/mu in un-treated white seawater soaked sand.

Treatment 3: wheat seeds were not soaked by water or any sBGA, but the white seawater soaked sand was sprayed with 1:300 (volume ratio) diluted sBGA in an amount of 75 kg/mu. The white seawater soaked sand was then treated with the BGA mixture of BGA2 and BGA4 in a weight ratio of 1:1 as described in Example 5 in an amount of 120 kg/mu, and the non-soaked seeds were then planted in an amount of 14 kg/mu in the treated white seawater soaked sand.

The relative energy-state values of various nutrient elements and harmful elements in the samples before and after Treatment 3 are reported in Table 10. As can be seen from Table 10, the relative energy-state value of various nutrient element numerically increased, and the relative energy-state value of harmful elements, such as Na and Cl, numerically decreased in the soil treated by the 1:300 (volume ratio) diluted sBGA and the BGA mixture of BGA2 and BGA4 in a weight ratio of 1:1 (Treatment 3) in comparison to the non-treated soil before Treatment 3. In other words, white seawater soaked sand samples were gathered from the same portion of a testing field before and after Treatment 3.

TABLE 10

|  | N | P | K | Ca | Mg | S | Cu | Fe | Mn | Zn | B | Mo | Na | Cl |
|---|---|---|---|---|---|---|---|---|---|---|---|---|---|---|
| White seawater soaked sand samples before Treatment 3 | 1 | 1 | 1 | 0 | 0 | 0 | 0 | 0 | 0 | 0 | 0 | 0 | 11 | 11 |
| White seawater soaked sand samples after Treatment 3 | 18 | 18 | 18 | 8 | 8 | 8 | 8 | 8 | 8 | 8 | 8 | 8 | 2 | 2 |

The growth data of the wheat plant and seed are reported in Tables 11 and 12.

TABLE 11

|  | Time for seed germination | Seed germination percentage | Emergence time of plant | Emergence percentage of plant |
|---|---|---|---|---|
| Treatment 1 (water soaked seeds in untreated white seawater soaked sand) | 20 hr | 8.2% | 60 hr | 7.2% |
| Treatment 2 (sBGA-soaked seeds in untreated white seawater soaked sand) | 8 hr | 99.4% | 47 hr | 98.2% |
| Treatment 3 (non soaked seeds in sBGA and mixture of BGA2 and BGA4-treated white seawater soaked sand) | N/A | N/A | 49 hr | 98.1% |

TABLE 12

|  | Average growth rate of plant height | Time from planting to harvest | Yield |
|---|---|---|---|
| Treatment 1 (water soaked seeds in untreated white seawater soaked sand) | N/A | N/A | N/A |
| Treatment 2 (sBGA-soaked seeds in untreated white seawater soaked sand) | 1.07 cm/day | 75 days | 385.4 kg/mu |
| Treatment 3 (non soaked seeds in sBGA and mixture of BGA2 and BGA4-treated white seawater soaked sand) | 1.04 cm/day | 77 days | 370.6 kg/mu |

As Table 11 shows, it took about 8 hours from the time of planting for the sBGA-soaked seeds to germinate, and about 47 hours from the time of planting to emerge with Treatment 2 in accord with the disclosure. In contrast, it took about 20 hours from the time of planting for the water-soaked seeds to germinate, and about 60 hours from the time of planting to emerge with Treatment 1, not in accord with the disclosure. And it took about 49 hours from the time of planting for the non-soaked seeds to emerge in the treated white seawater soaked sand with Treatment 3 in accord with the disclosure.

The "germination percentage" as used herein is calculated as:

(number of seeds that germinate/total number of the seeds)×100

The "emergence percentage" as used herein is calculated as:

(number of seeds that emerged out of the soil/total number of the seeds)×100

As Table 11 also shows, the germination percentage of the seeds under Treatment 2 in accord with the disclosure was 99.42%; while the germination percentage of the seeds under Treatment 1 not in accord with the disclosure was 8.21%. In addition, the emergence percentage of the seeds under Treatment 2 in accord with the disclosure was 98.25%, while the emergence percentage of the seeds under Treatment 1 not in accord with the disclosure was 7.22%. As can be seen, the emergence percentage of the seeds under Treatment 3 in accord with the disclosure was similar at 98.11% to that of the seeds under Treatment 2 in accord with the disclosure. In particular embodiments disclosed herein, the germination % in sand of seeds treated in accord with the present disclosure is at least 15%, 25%, 50%, 60%, 70%, 80%, 90%, or 95%. In particular embodiments disclosed herein, the emergence % in sand of seeds treated in accord with the present disclosure is at least 15%, 25%, 50%, 60%, 70%, 80%, 90%, or 95%.

Furthermore, as Table 12 shows, the average growth rate of plant height and the yield for the seeds under Treatment 2 or 3 in accord with the disclosure are reported but no values were reported in Table 12 for Treatment 1 plants because of the very low germination and emergence percentages reported in Table 11. Table 12 shows the times from planting to harvest for the seeds under Treatment 2 or 3 in accord with the disclosure. In particular embodiments disclosed herein, the yield and/or biomass (1) of plants grown in untreated sand, and being treated with a composition disclosed herein and/or (2) of plants grown in sand treated with a composition disclosed herein and/or (3) of plants treated with a composition disclosed herein and grown in sand treated with a composition disclosed herein is at least 5%, 25%, 50%, 100%, 200%, 300%, 400%, 500%, 600%, 700%, 800%, 900%, or 1000% greater than the yield and/or biomass of plants not so treated and/or not so grown in such treated sand.

Example 11

Effects of Energy Treatment on Relative Energy-State Values

The raw materials of BGA1, explained in detail in Example 1, were used in this example to evaluate the effects of various energy treatments of the raw materials. The raw materials of the first sub-composition, set forth in Example 1 (15% of the total weight of BGA1), and the raw materials of the second sub-composition, also set forth in Example 1 (15% of the total weight of BGA1), were combined. That combination is termed herein as "the Combination of the First Two Sub-Compositions."

The Combination of the First Two Sub-Compositions was energy treated (denoted as "YES" in Table 12) or not energy treated (denoted as "NO" in Table 12) to form a first intermediate, and the third sub-composition, set forth in Example 1 (70% of the total weight of BGA1), was energy treated or not energy treated to form a second intermediate. The two intermediates were then combined, and energy treated or not energy treated to form Samples 1-7, as reported in Table 12, wherein Sample 1 is a comparative example and Samples 2-7 are embodiments of the present invention. For example, as reported in Table 12, in creating Sample 1, none of the intermediates or the combination of the intermediates was energy treated, and hence both of the intermediates and the combination thereof are denoted as "NO."

Like in Example 1, each energy treatment in this example and in the Examples 12-14 described below was performed by treating the materials in an electromagnetic field generated by a treating device. An AC current generator was used to generate an AC current to flow in the treating device to generate the electromagnetic field. The energy treatments were each performed for about 2 hours with the frequency of the AC current gradually changing from 500 Hz to 1500 Hz at a constant rate of increase, at a working voltage of 10.7 V and a working current of 0.06-6 A in a coil. The supply voltage was 220 V.

TABLE 12

Energy Treatment Schedules for Creating Samples 1-7

| First Intermediate | Second Intermediate | Combination of First and Second Intermediates | Sample Created |
| --- | --- | --- | --- |
| NO | NO | NO | 1 |
| YES | NO | NO | 2 |
| NO | YES | NO | 3 |
| NO | NO | YES | 4 |
| YES | NO | YES | 5 |

TABLE 12-continued

Energy Treatment Schedules for Creating Samples 1-7

| First Intermediate | Second Intermediate | Combination of First and Second Intermediates | Sample Created |
| --- | --- | --- | --- |
| YES | YES | YES | 6 |
| YES | YES | NO | 7 |

The relative energy-state values of N, P, and K of each of Samples 1 to 7 were measured using a QRS J1 instrument as described herein and illustrated in FIG. 9F. The relative energy-state values obtained for N, P, and K, respectively listed in the columns of "N", "P," and "K," and the sum of the relative energy-state values obtained for N, P, and K, listed in the column of "N+P+K," for Samples 1 to 7 are reported below in Table 13.

Also reported below in Table 13 are the relative energy-state values of N, P, and K and the sum of the relative energy-state values of N, P, and K measured for the first intermediate and the second intermediate.

TABLE 13

Relative Energy-State Values of Samples 1-7 and First and Second Intermediates

|  | N | P | K | N + P + K |
| --- | --- | --- | --- | --- |
| Sample 1 | 13 | 12 | 12 | 37 |
| Sample 2 | 42 | 41 | 41 | 124 |
| Sample 3 | 16 | 15 | 15 | 46 |
| Sample 4 | 43 | 42 | 42 | 127 |
| Sample 5 | 50 | 49 | 49 | 148 |
| Sample 6 | 54 | 53 | 53 | 160 |
| Sample 7 | 44 | 43 | 43 | 130 |
| First Intermediate (Not Energy Treated) | 24 | 22 | 22 | 68 |
| First Intermediate (Energy Treated) | 55 | 53 | 53 | 161 |
| Second Intermediate (Not Energy Treated) | 4 | 3 | 2 | 9 |
| Second Intermediate (Energy Treated) | 7 | 6 | 5 | 18 |

Example 12

Planting Chinese Cabbages in Pots

Xiao Bai Cai, a type of Chinese Cabbage ("Chinese Cabbage") was used to evaluate the effects of Samples 1 to 7 as described in Example 11. 10.0 g of each of Samples 1 to 7 was combined with 1 kg of river sand to form potting soils. For each Sample, the potting soil was added to each of five pots and watered.

Two days later, two Chinese Cabbages were planted in each of the five pots for each Sample. One week later, a trench was dug in each of the pots and an additional 10.0 g of each Sample was added into the corresponding trench and mixed therein. Five days later, one of the two Chinese Cabbages in each pot that did not grow as well as the other was removed, leaving only one plant in each pot.

Approximately two weeks later, each Chinese Cabbage was removed from each pot for all Samples. For each removed Chinese Cabbage, the soil was removed from the roots with water, after which the water on each Chinese Cabbage was removed, following which each Chinese Cabbage was weighed. For each of Samples 1-7, the weight for each Chinese Cabbage (denoted as Plant 1 to Plant 5) and the average weight for the five Chinese Cabbages, calculated by adding the weights reported for each of Plants 1 to 5 together and dividing by 5, are reported in Table 14.

TABLE 14

Weights of Chinese Cabbages (g) for Samples 1 to 7

|  | Plant 1 | Plant 2 | Plant 3 | Plant 4 | Plant 5 | Average |
|---|---|---|---|---|---|---|
| Sample 1 | 59.8 | 57.4 | 79.4 | 96.1 | 105.8 | 79.7 |
| Sample 2 | 109.2 | 103.8 | 59.7 | 139.7 | 46.1 | 91.7 |
| Sample 3 | 84.5 | 134.4 | 101.7 | 61.4 | 69.8 | 90.4 |
| Sample 4 | 108.9 | 167.2 | 159.9 | 130.3 | 174.4 | 148.1 |
| Sample 5 | 85.2 | 192.7 | 147.6 | 147.1 | 157.9 | 146.1 |
| Sample 6 | 144.7 | 138.6 | 132.7 | 143.9 | 85.0 | 129.0 |
| Sample 7 | 108.7 | 115.5 | 109.0 | 117.6 | 98.2 | 109.8 |

For ease of comparison, the average weight of the five Chinese Cabbages planted for each of Samples 1 to 7 and the sum of the relative energy-state values of N, P, and K of Samples 1 to 7 are reported in Table 15. Using the average weight of the five Chinese Cabbages planted with Sample 1 as a reference, the percentage increase in average weight of the Chinese Cabbages planted with Samples 2-7 is also reported in Table 15.

TABLE 15

Relative energy-state Values of Samples 1 to 7 and Average Weights (g/plant) of Chinese Cabbages Planted with Samples 1 to 7

|  | N + P + K | Average Weight (g) | Percentage Increase in Weight |
|---|---|---|---|
| Sample 4 | 127 | 148.1 | 85.9% |
| Sample 5 | 148 | 146.1 | 83.3% |
| Sample 6 | 160 | 129.0 | 61.8% |
| Sample 7 | 130 | 109.8 | 37.8% |
| Sample 2 | 124 | 91.7 | 15.1% |
| Sample 3 | 46 | 90.4 | 13.4% |
| Sample 1 | 37 | 79.7 | 0.0% |

Example 13

Planting Experiments in Fields

Chinese Cabbages were also grown in fields to evaluate the effects of Samples 1 to 7 set forth in Example 11. Individual plots having an area of about 1.0 m² were prepared and labeled.

Then, 300 g of each of Samples 1-7 was combined with 0.1 m³ of river sand, and each combination was added to five plots designated for a particular sample and watered. Thus, there were 35 total plots. Each Sample is combined with the river sand and provided in 5 of those plots designated for that Sample. Two days later, 18 Chinese Cabbages were planted in each of the 35 plots. One week later, an additional 200 g of each of Samples 1-7 was added to each of the 5 plots designated for that Sample in a manner similar to that described for the pot experiments in Example 12, i.e., using a trench in each plot. Five days later, 9 Chinese Cabbages were removed from each of the 35 plots to leave 9 Chinese Cabbages in each plot. The basis for selection was to leave 9 plants having what was judged to be relatively consistent growth potential.

Approximately two weeks later, each Chinese Cabbage was removed from each plot. For each removed Chinese Cabbage, the soil was removed from the roots with water, after which the water on each Chinese Cabbage was removed, following which all nine Chinese Cabbages removed from a particular plot were weighed together to obtain a total weight of the nine Chinese Cabbages for each plot.

The total weight of the nine Chinese Cabbages from each plot and the average total weight for the Chinese Cabbages per plot are listed in Table 16. For example, in the row of Table 16 labeled as Sample 1, 18 Chinese Cabbages were planted in each of the five individual plots designated for that Sample, each plot containing the combination of Sample 1 and river sand described above. After removal of nine Chinese Cabbages from each individual plot designated for Sample 1, the remaining nine Chinese Cabbages were harvested and the total weight of those nine Chinese Cabbages was measured. That total weight is reported in the row labeled "Sample 1" in Table 16, in the column labeled "Plot 1." Similarly, the total weight of the harvested Chinese Cabbages from the other four plots designated for Sample 1 was measured and reported in the row labeled "Sample 1" in Table 16, in the columns respectively labeled as "Plot 2," "Plot 3," "Plot 4," and "Plot 5." The average total weight for Chinese Cabbages per plot was calculated by adding the weights reported for each of Plots 1 to 5 together in the Sample 1 row, and dividing by 5. That average total weight for Sample 1 is reported in Table 16 in the column "Average Weight (kg)/Plot."

TABLE 16

Weights of Chinese Cabbages (kg) for Samples 1 to 7

|  | Plot 1 | Plot 2 | Plot 3 | Plot 4 | Plot 5 | Average Weight (kg)/Plot |
|---|---|---|---|---|---|---|
| Sample 1 | 2.82 | 2.28 | 2.75 | 2.45 | 2.80 | 2.62 |
| Sample 2 | 2.86 | 2.55 | 3.51 | 3.20 | 3.35 | 3.09 |
| Sample 3 | 2.81 | 2.75 | 2.86 | 2.46 | 2.69 | 2.71 |
| Sample 4 | 3.06 | 3.83 | 3.23 | 3.70 | 4.09 | 3.58 |
| Sample 5 | 3.30 | 3.78 | 3.76 | 3.93 | 4.20 | 3.89 |
| Sample 6 | 3.43 | 3.50 | 4.05 | 4.20 | 4.43 | 4.00 |
| Sample 7 | 3.55 | 3.04 | 3.75 | 3.53 | 4.47 | 3.67 |

The average of the total weight of nine Chinese Cabbages in the five plots for each of Samples 1 to 7 and the sum of the relative energy-state values of N, P, and K of Samples 1 to 7 are reported in Table 17. Each average weight reported in Table 17 for Samples 2-7 was compared against the average weight for Sample 1, to calculate the percentage increase in average weight of the Chinese Cabbages per plot for each of Samples 2-7. Those percent increases are reported for Samples 2-7 in Table 17.

TABLE 17

Relative Energy-State Values, Average Weights, and Percentage Increase (Weight) for Samples 1 to 7

|  | N + P + K | Average Weight (kg/plot) | Percentage Increase (Weight) |
|---|---|---|---|
| Sample 6 | 160 | 4.00 | 52.7% |
| Sample 5 | 148 | 3.89 | 48.6% |
| Sample 7 | 130 | 3.67 | 39.9% |
| Sample 4 | 127 | 3.58 | 36.7% |
| Sample 2 | 124 | 3.09 | 18.0% |
| Sample 3 | 46 | 2.71 | 3.5% |
| Sample 1 | 37 | 2.62 | 0.0% |

Example 14

Energy Treatments and Plant Experiments

In this example, the effects on relative energy state values and plant growth were evaluated for (1) Samples 1 and 4, as set forth in Example 11, (2) urea sold as Liupanshan brand urea by Ningxia Yinchuan Fertilizer Co., and (3) a high concentration compound fertilizer (Sierte brand high concentration compound fertilizer, 15-15-15, commercially available from Anhui Sierte Fertilizer Company, Ltd., China, herein termed as "fertilizer"). The relative energy-state values of N, P, and K for Samples 1 and 4 are described in Example 11. The relative energy-state values of urea and the fertilizer before and after energy treatment were measured according to the procedure set forth in Example 11. The energy treatments were performed as described in Example 11. The results are reported below in Table 18, where the word "Before" means "before energy treatment," and the word "After" means "after energy treatment."

TABLE 18

Relative Energy-State Values of the Fertilizer, Urea, and Samples 1 and 4

|  | N Before | N After | P Before | P After | K Before | K After | N+P+K Before | N+P+K After |
|---|---|---|---|---|---|---|---|---|
| Fertilizer | 8 | 10 | 8 | 10 | 8 | 10 | 24 | 30 |
| Urea | 10 | 12 | / | / | / | / | 10 | 12 |
| Sample 1 | 13 | / | 12 | / | 12 | / | 37 | / |
| Sample 4 | / | 43 | / | 42 | / | 42 | / | 127 |

Chinese Cabbages were planted in pots to test the effects of Samples 1 and 4, and urea and the fertilizer before and after energy treatment. The results and procedures for Samples 1 and 4 are described in Example 12, and reported in Table 19.

Regarding the fertilizer and urea, the fertilizer energy treated (2.0 g), the fertilizer not energy treated (2.0 g), the urea energy treated (4.5 g), and the urea not energy treated (4.5 g) were combined respectively with 1 kg of river sand to form potting soils. For each of the fertilizer and urea samples, the potting soil was added to each of five pots and watered.

Two days later, two Chinese Cabbages were planted in each of the five pots for each of the fertilizer and urea samples. One week later, an additional 2.0 g of fertilizer (energy treated or not) and 4.5 g of urea (energy treated or not) were added to each of the five pots corresponding to fertilizer and urea samples in a manner similar to that in Example 11. Five days later, one of the two Chinese Cabbages in each pot that did not grow as well as the other was removed, leaving only one plant in each pot.

Approximately two weeks later, each Chinese Cabbage was removed from each pot for all the fertilizer and urea samples. For each removed Chinese Cabbage, the soil was removed from the roots with water, after which the water on each Chinese Cabbage was removed, following which each Chinese Cabbage was weighed. For each of the fertilizer and urea samples, the weight for each Chinese Cabbage (denoted as Plant 1 to Plant 5) and the average weight for the five Chinese Cabbages, calculated by adding the weights reported for each of Plants 1 to 5 together and dividing by 5, are listed in Table 19.

TABLE 19

Weights (g) of Chinese Cabbages for Samples 1 and 4, Urea, and the Fertilizer

|  | Plant 1 | Plant 2 | Plant 3 | Plant 4 | Plant 5 | Average Weight (g) |
|---|---|---|---|---|---|---|
| Sample 1 | 59.8 | 57.4 | 79.4 | 96.1 | 105.8 | 79.7 |
| Sample 4 | 108.9 | 167.2 | 159.9 | 130.3 | 174.4 | 148.1 |
| Fertilizer (Without energy treatment) | 123.5 | 52.0 | 58.7 | 61.1 | 61.5 | 71.4 |
| Fertilizer (With energy treatment) | 84.8 | 89.9 | 142.8 | 92.3 | 96.7 | 101.3 |
| Urea (Without energy treatment) | 17.0 | 56.5 | 67.3 | 64.7 | 53.5 | 51.8 |
| Urea (With energy treatment) | 62.7 | 83.6 | 106.8 | 170.1 | 57.0 | 96.0 |

The relative energy-state values of Samples 1 and 4, the fertilizer (energy treated or not), and urea (energy treated or not) and average weights of the Chinese Cabbages planted with the same are also listed in Tables 20, 21, and 22, respectively.

TABLE 20

Relative Energy-State Values of Sample 1 and 4 and Average Weights of Chinese Cabbages (g/plant)

|  | N + P + K | Average Weight (g) |
|---|---|---|
| Sample 1 | 37 | 79.9 |
| Sample 4 | 127 | 148.1 |

TABLE 21

Relative Energy-State Values of the Fertilizer and Average Weights of Chinese Cabbages (g/plant)

|  | N + P + K | Average Weight (g) |
|---|---|---|
| Fertilizer (Without energy treatment) | 24 | 71.4 |
| Fertilizer (With energy treatment) | 30 | 101.3 |

TABLE 22

Relative Energy-State Values of Urea and Average Weights of Chinese Cabbages (g/plant)

|  | N | Average Weight (g) |
|---|---|---|
| Urea (Without energy treatment) | 10 | 51.8 |
| Urea (With energy treatment) | 12 | 96.0 |

Independent from Example 14, further provided herein is a method for treating a soil comprising contacting the soil with an effective amount of an energy treated composition, wherein the composition comprises at least one nutrient element, the composition being effective to improve the ability of the soil, when combined with the effective amount of the energy treated composition, to support plant growth better than the soil, when not combined with the energy treated composition.

What is claimed:

1. A method for treating a soil comprising
contacting the soil with an effective amount of an energy treated composition,
wherein the composition comprises at least one photosensitive material and at least one nutrient element,
wherein the at least one nutrient element possesses a relative energy-state value greater than the relative energy-state value of the at least one nutrient element in a preexisting state, the composition being effective to improve the ability of the soil, when combined with the effective amount of the composition, to support plant growth better than the soil, when not combined with the composition.

2. The method of claim 1, wherein the soil prior to treatment is chosen from the group consisting of sand/loamy sand, heavy clay, clay, sandy clay, sandy clay loam, silty clay, silty clay loam, and silty loam.

3. A method for treating a soil comprising
contacting the soil with an effective amount of an energy treated composition,
wherein the composition comprises
a first sub-composition comprising at least one organic acidic material comprising at least one first nutrient element,
a second sub-composition comprising at least one photosensitive material comprising at least one second nutrient element, the at least one photosensitive material being different from the at least one organic acidic material, and
a third sub-composition comprising at least one organic base material optionally comprising at least one third nutrient element, the at least one organic base material being different from the at least one organic acidic material and the at least one photosensitive material,
wherein the at least one first, second, and third nutrient elements can be the same or different, and further wherein the first, and/or second, and/or third nutrient elements possess a relative energy-state value greater than the relative energy-state value of the first, and/or second, and/or third nutrient elements in a preexisting state, the composition being effective to improve the ability of the soil, when combined with the effective amount of the composition, to support plant growth better than the soil, when not combined with the composition.

4. The method of claim 3, wherein the at least one nutrient element is N, P, K, Ca, Mg, S, Cu, Fe, Mn, Zn, B, Mo, or Se.

5. The method of claim 3, wherein the at least one nutrient element is N, P, or K.

6. The method of claim 3, wherein the at least one organic acidic material is humic acids, alginic acid, nucleic acids, amino acids, or fatty acids.

7. The method of claim 3, wherein the at least one photosensitive material is 5-ALA.

8. The method of claim 3, wherein the at least one photosensitive material is an extract from plants.

9. The method of claim 3, wherein the at least one organic base material is fermented.

10. The method of claim 3, wherein the first, second, and third sub-compositions are not in contact with one another.

11. The method of claim 3, wherein at least two of the first, second, and third sub-compositions are combined.

12. The method of claim 3, wherein the composition comprises about 15% of a first sub-composition, about 15% of a second sub-composition, and about 70% of a third sub-composition.

13. The method of claim 12, wherein the first sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the first sub-composition, the second sub-composition comprises about 70% of straw powders, about 10% of phosphate rock particles, about 12% of agricultural grade amino acids, about 4.5% of corn or potato starch, about 1% of manganese sulfate, about 1% of zinc sulfate, about 0.5% of copper sulfate, and about 1% of ferrous sulfate, by weight relative to the total weight of the second sub-composition and the second sub-composition further comprises about 1.5 ppm of 5-ALA.

14. A method for treating a soil comprising
contacting the soil with an effective amount of an energy treated composition,
wherein the composition comprises at least one photosensitive material and at least one nutrient element,
wherein the at least one nutrient element possesses a relative energy-state value greater than the relative energy-state value of the at least one nutrient element in a preexisting state, the composition being effective to improve the ability of the soil, when combined with the effective amount of the composition, to be watered by salted water in whole or in part to support plant growth, compared to the soil, when not combined with the composition.

15. A method for treating a soil comprising
contacting the soil with an effective amount of an energy treated composition,
wherein the composition comprises
a first sub-composition comprising at least one organic acidic material,
a second sub-composition comprising at least one photosensitive material,
wherein the first sub-composition and/or the second sub-composition comprise at least one first nutrient element,
wherein the at least one photosensitive material is different from the at least one organic acidic material, and
a third sub-composition comprising at least one organic base material optionally comprising at least one third nutrient element, the at least one organic base material being different from the at least one organic acidic material and the at least one photosensitive material,
wherein the at least one first and third nutrient elements can be the same or different, and further wherein the first and/or third nutrient elements possess a relative energy-state value greater than the relative energy-state value of the first and/or third nutrient elements in a preexisting state, the composition being effective to improve the ability of the soil, when combined with the effective amount of the composition, to support plant growth better than the soil, when not combined with the composition.

16. A method for treating a soil comprising
contacting the soil with an effective amount of an energy treated composition,
wherein the composition comprises
a first sub-composition comprising at least one organic acidic material, a second sub-composition comprising at least one photosensitive material, wherein the first sub-composition and/or the second sub-composition comprise at least one first nutrient element, wherein the at least one photosensitive material is different from the at least one organic acidic material, and a third sub-composition comprising at least one organic base material optionally comprising at least one third nutrient element, the at least one organic base material being different from the at least one organic acidic material and the at least one photosensitive material, wherein the at least one first and third nutrient elements can be the same or different, and further wherein the first and/or third nutrient elements possess a relative energy-state value greater than the relative energy-state value of the first and/or third nutrient elements in a preexisting state, the composition being effective to improve the ability of the soil, when combined with the effective amount of the composition, to be watered by salted water in whole or in part to support plant growth, compared to the soil, when not combined with the composition.

17. A method for treating a soil comprising contacting the soil with an effective amount of an energy treated composition, wherein the composition comprises a first sub-composition comprising at least one organic acidic material comprising at least one first nutrient element, a second sub-composition comprising at least one photosensitive material comprising at least one second nutrient element, the at least one photosensitive material being different from the at least one organic acidic material, and a third sub-composition comprising at least one organic base material optionally comprising at least one third nutrient element, the at least one organic base material being different from the at least one organic acidic material and the at least one photosensitive material, wherein the at least one first, second, and third nutrient elements can be the same or different, and further wherein the first, and/or second, and/or third nutrient elements possess a relative energy-state value greater than the relative energy-state value of the first, and/or second, and/or third nutrient elements in a preexisting state, the composition being effective to improve the ability of the soil, when combined with the effective amount of the composition, to be watered by salted water to support plant growth, compared to the soil, when not combined with the composition.

18. A method for improving the growth of a plant comprising contacting for a time sufficient the plant with an effective amount of an energy treated composition, wherein the composition comprises a first sub-composition comprising at least one organic acidic material comprising at least one first nutrient element, and a second sub-composition comprising at least one photosensitive material comprising at least one second nutrient element, the at least one photosensitive material being different from the at least one organic acidic material, wherein the at least one first and second nutrient elements can be the same or different, and further wherein the first and/or second nutrient elements possess a relative energy-state value greater than the relative energy-state value of the first and/or second nutrient elements in a preexisting state.

19. A method for treating a desert sand incapable of supporting horticultural and/or agricultural plant growth to convert said sand into a soil capable of supporting horticultural and/or agricultural plant growth, comprising contacting the desert sand with an effective amount of an energy-treated composition, wherein the composition comprises at least one photosensitive material and at least one nutrient element, further wherein the at least one nutrient element possesses a relative energy-state value greater than the relative energy-state value of the at least one nutrient element in a preexisting state, the composition being effective to convert the desert sand, when combined with the effective amount of the composition, to the soil capable of supporting horticultural and/or agricultural plant growth.

20. A method for treating a soil comprising contacting the soil with an effective amount of an energy treated composition, wherein the composition comprises at least one photosensitive material and at least one nutrient element, the composition being effective to improve the ability of the soil, when combined with the effective amount of the energy treated composition, to support plant growth better than the soil, when not combined with the energy treated composition.

* * * * *